United States Patent [19]

Oowa et al.

[11] Patent Number: 4,809,176

[45] Date of Patent: Feb. 28, 1989

[54] SYSTEM FOR VEHICLE BODY ROLL CONTROL WITH OVERSHOOT PREVENTION

[75] Inventors: Nobutaka Oowa; Yasuji Arai; Osamu Yasuike; Hiroyuki Ikemoto, all of Toyota; Shunichi Doi, Aichi, all of Japan

[73] Assignees: Toyota Jidosha Kabushiki Kaisha; Toyota Central Research and Development Laboratories, Inc., both of Aichi, Japan

[21] Appl. No.: 921,468

[22] Filed: Oct. 22, 1986

[30] Foreign Application Priority Data

Oct. 22, 1985 [JP] Japan .................. 60-235655
Oct. 22, 1985 [JP] Japan .................. 60-235656
Oct. 22, 1985 [JP] Japan .................. 60-235657

[51] Int. Cl.$^4$ .................. B60G 17/00; G06G 15/50
[52] U.S. Cl. .................. 364/424; 280/707; 280/DIG. 1; 188/299
[58] Field of Search .................. 364/424, 426; 280/707, 280/714, 61, 6 R, 6 H; 188/279, 280, 299

[56] References Cited

U.S. PATENT DOCUMENTS

| 4,539,967 | 9/1985 | Nakajima et al. | 123/585 |
| 4,575,115 | 3/1986 | Tatemoto et al. | 280/707 |
| 4,593,931 | 6/1986 | Shiratori et al. | 280/714 |
| 4,610,462 | 9/1986 | Kumagai et al. | 280/707 |
| 4,624,476 | 11/1986 | Tanaka et al. | 280/707 |
| 4,647,069 | 3/1987 | Iijima | 280/707 |
| 4,693,493 | 9/1987 | Ikemoto et al. | 280/707 |

FOREIGN PATENT DOCUMENTS

| 0035330 | 9/1981 | European Pat. Off. . |
| 0115202 | 8/1984 | European Pat. Off. . |
| 0114757 | 8/1984 | European Pat. Off. . |
| 2844413 | 4/1980 | Fed. Rep. of Germany . |
| 2401037 | 8/1978 | France . |
| 60-67210 | 4/1985 | Japan . |
| 60-82420 | 5/1985 | Japan . |
| 60-203517 | 10/1985 | Japan . |
| 649506 | 9/1982 | Switzerland . |
| 2155207 | 9/1985 | United Kingdom . |
| 2155658 | 9/1985 | United Kingdom . |

Primary Examiner—Felix D. Gruber
Assistant Examiner—Thomas G. Black
Attorney, Agent, or Firm—Parkhurst, Oliff & Berridge

[57] ABSTRACT

In this system for vehicle roll control, a plurality of duty radio controlled actuator assemblies are provided, one corresponding to each one of the vehicle wheels, and resiliently suspended from the vehicle body. These actuator assemblies have pressure chambers, and each is adapted to increase or decrease the vehicle height at a location corresponding to its corresponding vehicle wheel as a result of the supplying or discharging of working fluid to or from its pressure chamber. Working fluid supplying and discharging means supply working fluid to and discharge working fluid from the pressure chambers of the actuator assemblies. The system further includes means for sensing the road speed of the vehicle, and means for sensing the steering angle of the vehicle. Vehicle height detection means are also provided for sensing the heights of the vehicle above the vehicle wheels. A means for computing and control calculates the deviations of the actual detected vehicle body heights from standard vehicle body heights; when a certain condition is satisfied, it controls the working fluid supplying and discharging means according to a first duty ratio according to the deviations of the actual vehicle body heights, so as to maintain the deviations of the actual vehicle body heights within predetermined ranges; and then it controls the working fluid supplying and discharging means in the reverse order according to a second duty ratio.

29 Claims, 22 Drawing Sheets

SYSTEM FOR VEHICLE BODY ROLL CONTROL WITH OVERSHOOT PREVENTION

BACKGROUND OF THE INVENTION

The present invention relates to a roll control system for an automotive vehicle, and more specifically relates to a vehicle roll control system of the vehicle height adjustment type which is particularly adapted for preventing suspension overshoot.

The present invention has been described in Japanese Patent Applications Ser. Nos. 60-235655 (1985) 60-235656 (1985), and 60-235657 (1985), all three of them filed by an applicant the same as the entity assigned or owed duty of assignment of the present patent application; and the present patent application hereby incorporates into itself by reference the texts of said Japanese Patent Applications and the claims and the drawings thereof; copies are appended to the present application.

Further, the present inventors wish hereby to attract the attention of the examining authorities to copending Patent Applications Ser. Nos. 921,138, 921,251, 921,450, and 921,451, which may be considered to be material to the examination of the present patent application.

In general, in the operational conditions where a vehicle such as an automobile turns at a speed not less than a particular determinate turning speed value, the body of the vehicle experiences rolling, i.e. the vehicle body inclines in the radially outward direction and tips towards the wheels on its radially outward edge, and this rolling can easily result in deterioration of the drivability of the vehicle.

In order to cope with the above problem, in the case where a vehicle is fitted with a suspension system which comprises shock absorber means and/or spring means whose damping effect and/or whose spring constant can be varied, as for example by an electronic control device therefor, it might be considered, during such a turn, to increase the damping effect of those of the shock absorber means which are fitted to said wheels on the radially outward edge of the vehicle, and/or to increase the spring constant of those of the spring means which are fitted to said wheels on the radially outward edge of the vehicle. Such a concept is outlined in Japanese Patent Laying Open Publication Ser. No. 59-120509 (1984) and in Japanese Patent Application Ser. No. Sho 59-172416 (1984), neither of which is it intended hereby to admit as prior art to the present patent application except to the extent in any case required by applicable law; and reference should also be made to Japanese Utility Model Laying Open Publication Ser. No. 59-35105 (1984), Japanese Patent Laying Open Publication Ser. No. 53-26021 (1978), Japanese Patent Laying Open Publication Ser. No. 58-167210 (1983), and Japanese Utility Model Laying Open Publication Ser. No. 56-147107 (1981), again none of which is it intended hereby to admit as prior art to the present patent application except to the extent in any case required by applicable law. However, with this concept, merely the suspension of the vehicle on the outer edge side thereof with respect to the turn is hardened, and thus the rolling of the vehicle body may be somewhat attenuated as compared with the case when such suspension hardening is not performed, but the rolling of the vehicle body cannot necessarily be adequately prevented. Accordingly, such a concept does not really resolve the problem.

Further, in the case where a vehicle is fitted with a vehicle height adjustment system comprising: a plurality of actuators which are provided for resiliently suspending the vehicle wheels from its body and are adapted to increase or decrease vehicle height at locations corresponding to the associated vehicle wheels as respective results of supplying or discharging working fluid to or from variable volume working fluid chambers of said actuators (such actuators are typically controlled by duty ratio control); a plurality of working fluid supplying and discharging means which are provided corresponding to the actuators and which serve to supply or discharge the working fluid to or from said actuators; a vehicle height detecting means for sensing vehicle height; and a control means for controlling the working fluid supplying and discharging means based upon the data sensed by the vehicle height detecting means in order to adjust the vehicle height to a predetermined vehicle height, (as proposed, for example, in the specifications of Japanese Patent Laying Open Publication Ser. No. Sho 60-85005 (1985) and Japanese Patent Laying Open Publication Ser. No. Sho 60-235654 (1985), both of which were filed by an applicant the same as one of the applicants or one of the assignees or one of the entities owed duty of assignment of the present application and which it is similarly not intended hereby to admit as prior art to the present patent application except to the extent in any case required by applicable law, it might be conceived of to actively achieve vehicle height adjustment during running of the vehicle around a curve, in order to thereby prevent completely the vehicle body from rolling, by controlling the working fluid supplying and discharging means based upon the differences between the actual vehicle heights and reference vehicle heights.

In a vehicle which was equipped with such a vehicle height adjustment system as described above, however, it would be necessary rapidly to supply or drain hydraulic fluid in quantity to the hydraulic fluid chamber of each actuator when the vehicle is travelling around a curve, as compared with the amount of hydraulic fluid which is required to be supplied or drained to the hydraulic fluid chamber of each actuator in the case that the vehicle is stationary or is substantially travelling in a straight line. Therefore, when using such a system for wheel height adjustment in such a manner to restrict the vehicle roll while travelling around a curve, it would become quite likely that the wheel height adjustment might come to exceed the standard wheel height and be excessive, causing so called overshoot, and, particularly in the case of a hydro-pneumatic type of suspension in which air springs were coupled to the hydraulic actuating chambers, because the internal pressure of the air springs would increase or would decrease excessively, after roll control of the vehicle was completed, the rise or fall of one side or the other of the vehicle might tend to fluctuate repeatedly until the pressure within the hydraulic actuation chamber or the pressure within the air spring reached its equilibrium pressure, and as a result the wheel height would repeatedly rise and fall beyond the standard desired wheel height. This could present a troublesome problem, and accordingly the viability of such an approach as described above is compromised.

SUMMARY OF THE INVENTION

The present invention considers the problem described above which arises in roll control through the use of such a vehicle height adjustment system, and has as its primary object to avoid the problems detailed above.

Another object of the present invention is the provision of an improved vehicle roll control system of vehicle height adjustment type which controls the working fluid supplying and discharging means so as to prevent the vehicle body from rolling, without any risk of overshoot occurring.

Another object of the present invention is to provide a vehicle roll control system which improves vehicle steering stability.

Yet another object of the present invention is to provide a vehicle roll control system which has, in addition to the above functions, the function of preventing repeated vertical fluctuations of the wheel heights from the standard wheel heights caused by fluctuations of the pressure within the hydraulic actuation chambers of the actuators while the vehicle is undergoing roll control, thereby allowing the wheel heights to be able to be effectively controlled to be the optimum wheel heights.

According to the most general aspect of the present invention, these and other objects are attained by, for a vehicle comprising a body and a plurality of wheels upon which said vehicle runs, a roll control system of vehicle height adjustment type, comprising: a plurality of actuator assemblies, one provided corresponding to each one of said vehicle wheels and resiliently suspending said one of said vehicle wheels from the vehicle body, said actuator assemblies comprising pressure chambers and each increasing and decreasing vehicle height at a location corresponding to its corresponding vehicle wheel as respective results of supply of working fluid to and discharge of working fluid from its said pressure chamber; a plurality of working fluid supplying and discharging means, which are provided corresponding to said actuator assemblies, for supplying working fluid to said working fluid chambers and for discharging working fluid from said working fluid chambers, and for being controlled by duty ratio control; a plurality of vehicle height detection means, which are provided corresponding to said vehicle wheels, for sensing parameters representative of the heights of the vehicle body over said vehicle wheels; a vehicle speed detecting means, for sensing the road speed of the vehicle; a steering angle detecting means, for sensing the steering angle of the vehicle; and: a computing and control means for: calculating the deviations of the actual wheel heights as detected by said vehicle height detection means from standard wheel heights; when a certain condition is satisfied, controlling said working fluid supplying and discharging means according to a first duty ratio according to said deviations of said actual wheel heights, so as to maintain said deviations of said actual wheel heights within determinate ranges; and then: at the completion of said height maintenance control, controlling said working fluid supplying and discharging means in the reverse sense of supply and drain and according to a second duty ratio in a certain manner.

Further, according to a particular basic specialization of the present invention, the above specified and other objects are more particularly attained by a system for vehicle roll control of the type specified above, wherein said certain condition is that: the vehicle speed as detected by said vehicle speed detecting means and the absolute value of said steering angle as detected by said steering angle detecting means are at least certain determinate values. Alternatively, according to another basic specialization of the present invention, the above specified and other objects are more particularly attained by a system for vehicle roll control of the type specified above, wherein said certain condition is that: said steering angle as detected by said steering angle detecting means is at least a certain determinate value and is decreasing.

And further, according to another more particular specialization of the present invention, the above specified and other objects are more particularly attained by a system for vehicle roll control of either of the two basic types specified above, wherein said certain manner of controlling said working fluid supplying and discharging means is: at said second duty ratio for a determinate time period.

According to the former such type of construction, when the vehicle speed and steering angle exceed certain values, the calculation control means controls the hydraulic fluid supply and drain means at a first duty ratio according to the variation in wheel height so as to control the wheel height variation within a certain range, and after completion of this adjustment control, controls in the opposite manner to the supply or draining of hydraulic fluid of that control the hydraulic fluid supply and drain means for a certain time interval at a certain constant second duty ratio, as a result of which even if the first duty ratio is set to a relatively large value in order to prevent effectively vehicle roll, an excessive wheel height increase or decrease adjustment is prevented from being carried out by the control at the second duty ratio, and therefore vehicle roll when the vehicle changes from straight line driving to driving around a curve can be positively prevented, and prevented without being accompanied by overshoot, and additionally vertical oscillation of the wheel height from the standard wheel height caused by repeated increases and decreases in the pressure within the hydraulic fluid chamber of each actuator is positively prevented and the wheel height can thereby be rapidly controlled at an optimum wheel height.

Again, according to the latter such type of construction, when the steering angle is decreasing in a range above a certain value, in other words when the vehicle is returning to travelling in a straight line from travelling around a curve, the calculation control means controls the hydraulic fluid supply and drain means at a first duty ratio according to the variation in wheel height, to control the variation in wheel height within a certain range, and after completion of this adjustment control, when the supply or drain of hydraulic fluid is in the opposite sense to that adjustment control, controls the hydraulic fluid supply and drain means at a certain constant second duty ratio for a certain time, and therefore even when the first duty ratio is set to a relatively large value so that vehicle roll can be effectively prevented when the vehicle is changing from travelling around a curve to travelling in a straight line, excessive increase or decrease adjustment of the wheel height is effectively prevented, as a result of which when the vehicle is changing from driving around a curve to driving in a straight line the vehicle roll can be positively prevented, and additionally vertical oscillation of the wheel height from the standard wheel height caused by fluctuations in the pressure within the hydraulic fluid chamber of each actuator is positively prevented and the wheel height can thereby be rapidly controlled at an optimum wheel height.

According to a more detailed aspect of the present invention, in the former above construction, said computing and control means is for not performing control of said working fluid supplying and discharging means at said first duty ratio or at said second duty ratio when the absolute values of said deviations of said actual wheel heights from said standard wheel heights are less than a first determinate value, but for, in such a case, controlling said working fluid supplying and discharging means according to a third duty ratio which is less than said first duty ratio, so as to reduce said deviations of said actual wheel heights from said standard wheel heights.

According to a more detailed aspect of the present invention, in the former above construction, said computing and control means is for not performing control of said working fluid supplying and discharging means at said third duty ratio when the absolute values of said deviations of said actual wheel heights from said standard wheel heights are less than a second determinate value which is less than said first determinate value.

According to a more detailed aspect of the present invention, in the former above construction, said computing and control means is for, when the absolute value of steering angle as detected by said steering angle detecting means is at least a second determinate value and is decreasing, terminating control of said working fluid supplying and discharging means.

And, according to a more detailed aspect of the present invention, in the latter above construction, said computing and control means is for not performing control of said working fluid supplying and discharging means at said first duty ratio or at said second duty ratio when the absolute values of said deviations of said actual wheel heights from said standard wheel heights are less than a first determinate value.

And further, according to another more particular specialization of the present invention, the above specified and other objects are more particularly attained by a system for vehicle roll control of either of the two basic types specified above, wherein said certain manner of controlling said working fluid supplying and discharging means is: at said second duty ratio according to the rate of change of wheel height at that time.

According to the former such type of construction, when the vehicle speed and steering angle exceed certain values, the calculation control means controls the hydraulic fluid supply and drain means at a first duty ratio according to the variation in wheel height so as to control the wheel height variation within a certain range, and after completion of this adjustment control, controls in the opposite manner to the supply or draining of hydraulic fluid of that control the hydraulic fluid supply and drain means at a second duty ratio according to the wheel height rate of change at that time, as a result of which even if the first duty ratio is set to a relatively large value in order to prevent effectively vehicle roll, an excessive wheel height increase or decrease adjustment is positively prevented from being carried out by the control at the second duty ratio, and therefore vehicle roll when the vehicle changes from straight line driving to driving along a curve can be positively prevented, and prevented without being accompanied by overshoot, and additionally vertical oscillation of the wheel height from the standard wheel height caused by repeated increases and decreases in the pressure within the hydraulic fluid chamber of each actuator is positively prevented and the wheel height can thereby be rapidly controlled at an optimum wheel height.

Again, according to the latter such type of construction, when the steering angle is decreasing in a range above a certain value, in other words when the vehicle is returning to travelling in a straight line from travelling along a curve, the calculation control means controls the hydraulic fluid supply and drain means at a first duty ratio according to the variation in wheel height, to control the variation in wheel height within a certain range, and after completion of this adjustment control, when the supply or drain of hydraulic fluid is in the opposite sense to that adjustment control, controls the hydraulic fluid supply and drain means at a second duty ratio according to the wheel height rate of change at that time, and therefore even when the first duty ratio is set to a relatively large value so that vehicle roll can be effectively prevented when the vehicle is changing from travelling along a curve to travelling in a straight line, excessive increase or decrease adjustment of the wheel height is positively prevented, as a result of which when the vehicle is changing from driving along a curve to driving in a straight line the vehicle roll can be positively prevented and prevented without the accompaniment of overshoot, and additionally vertical oscillation of the wheel height from the standard wheel height caused by the repeated increase and decrease of the pressure within the hydraulic fluid chamber of each actuator is positively prevented and the wheel height can thereby be rapidly controlled at an optimum wheel height.

According to a more detailed aspect of the present invention, in the former above construction, said computing and control means is for, when the rates of change of said actual wheel heights have fallen below determinate values, terminating said control of said working fluid supplying and discharging means at said second duty ratio.

According to a more detailed aspect of the present invention, in the former above construction, said computing and control means is for, when the absolute values of said deviations of said actual wheel heights from said standard wheel heights are less than first determinate values, not controlling said working fluid supplying and discharging means at said first duty ratio or at said second duty ratio, but instead for controlling said working fluid supplying and discharging means at a third duty ratio which is less than said first duty ratio, so as to reduce said deviations of said actual wheel heights from said standard wheel heights.

According to a more detailed aspect of the present invention, in the former above construction, said computing and control means is for, when the absolute values of said deviations of said actual wheel heights from said standard wheel heights are less than a second determinate value which is less than said first determinate value, not controlling said working fluid supplying and discharging means at said third duty ratio.

According to a more detailed aspect of the present invention, in the former above construction, said computing and control means is for, when the absolute value of said steering angle as detected by said steering angle detecting means is at least a second determinate value and is decreasing, terminating control of said working fluid supplying and discharging means.

According to a more detailed aspect of the present invention, in the latter above construction, said computing and control means is for, when the rate of change of said steering angle as detected by said steering angle detecting means has dropped below a determinate value, terminating control of said working fluid supplying and discharging means.

According to a more detailed aspect of the present invention, in the latter above construction, said computing and control means is for, when the deviations of said actual wheel heights from said standard wheel heights are less than first determinate values, not performing control of said working fluid supplying and discharging means at said first duty ratio or at said second duty ratio.

And further, according to another more particular specialization of the present invention, the above specified and other objects are more particularly attained by a system for vehicle roll control of either of the two basic types specified above, wherein said certain manner of controlling said working fluid supplying and discharging means is: at said second duty ratio according to the deviation in vehicle loading at that time.

According to the former such type of construction, when the vehicle speed and steering angle exceed certain values, the calculation control means controls the hydraulic fluid supply and drain means at a first duty ratio according to the variations in wheel height, so as to control the wheel height variations within a certain range, and after completion of this adjustment control, controls in the opposite sense to the supply or draining of hydraulic fluid of that control the hydraulic fluid supply and drain means for a certain time interval at a second duty ratio according to the deviation between the actual vehicle body support load and a standard support loading for each wheel at that time, as a result of which even if the first duty ratio is set to a relatively large value in order effectively to prevent vehicle roll, an excessive wheel height increase or decrease adjustment is positively prevented from being carried out by the control at the second duty ratio, and therefore vehicle roll when the vehicle changes from straight line driving to driving around a curve can be positively prevented, and prevented without being accompanied by overshoot, and additionally vertical oscillation of the wheel height from the standard wheel height caused by repeated increases and decreases in the pressure within the hydraulic fluid chamber of each actuator is positively prevented and the wheel height can thereby be rapidly controlled at an optimum wheel height.

Again, according to the latter such type of construction, when the steering angle is decreasing in a range above a certain value, in other words when the vehicle is returning to travelling in a straight line from travelling around a curve, the calculation control means controls the hydraulic fluid supply and drain means at a first duty ratio according to the variation in wheel height, to control the variation in wheel height within a certain range, and after completion of this adjustment control, when the supply or drain of hydraulic fluid is in the opposite sense to that adjustment control, controls the hydraulic fluid supply and drain means at a second duty ratio in response to the deviation of wheel support loading for each wheel at that time, and therefore even when the first duty ratio is set to a relatively large value so that vehicle roll can be effectively prevented when the vehicle is changing from travelling around a curve to travelling in a straight line, excessive increase or decrease adjustment of the wheel height is positively prevented, as a result of which when the vehicle is changing from driving around a curve to driving in a straight line the vehicle roll can be positively prevented and prevented without being accompanied by overshoot, and additionally vertical oscillation of the wheel height from the standard wheel height caused by repeated increases and decreases in the pressure within the hydraulic fluid chamber of each actuator is positively prevented and the wheel height can thereby be rapidly controlled at an optimum wheel height.

According to a more detailed aspect of the present invention, in the former above construction, said computing and control means is for beginning control of said working fluid supplying and discharging means at said first duty ratio when the absolute values of said deviations of said actual wheel heights from said standard wheel heights are at least certain first determinate values, and for terminating said control of said working fluid supplying and discharging means at said first duty ratio when said deviations of said actual wheel heights from said standard wheel heights have become less than second determinate values which are less than said first determinate values.

According to a more detailed aspect of the present invention, in the former above construction, said computing and control means is for, when the absolute value of the deviation in vehicle loading has become not more than said second determinate value, starting control of said working fluid supplying and discharging means at said second duty ratio.

According to a more detailed aspect of the present invention, in the former above construction, said computing and control means is for, when the absolute value of the deviation in vehicle loading has become not more than the sum of a determinate value and a load deviation determined by the vehicle speed and the vehicle steering angle, terminating control of said working fluid supplying and discharging means at said second duty ratio.

According to a more detailed aspect of the present invention, in the former above construction, said computing and control means is for, when the absolute value of the deviation in vehicle loading is less than said first determinate value, controlling said working fluid supplying and discharging means at a third duty ratio which is smaller than said second duty ratio, and for reducing said deviations of said actual wheel heights from said standard wheel heights.

According to a more detailed aspect of the present invention, in the former above construction, said computing and control means is for, when the absolute value of said deviations of said actual wheel heights from said standard wheel heights are less than second determinate values which are smaller than said first determinate values, not controlling said working fluid supplying and discharging means at said third duty ratio.

According to a more detailed aspect of the present invention, in the former above construction, said computing and control means is for, when said the absolute value of said steering angle as detected by said steering angle detecting means is at least a second determinate value and is decreasing, terminating said control of said working fluid supplying and discharging means based upon the deviations of said actual wheel heights from said standard wheel heights and the deviation in vehicle loading as calculated up to that point.

According to a more detailed aspect of the present invention, the former above construction may further comprise a means for detecting vehicle loading, which is a means for detecting the pressures in said pressure chambers of said working fluid supplying and discharging means as fluctuations corresponding to the support loads on the corresponding vehicle wheels.

According to a more detailed aspect of the present invention, in the latter above construction, said computing and control means is for beginning control of said working fluid supplying and discharging means at said first duty ratio when the absolute values of said deviations of said actual wheel heights from said standard wheel heights are at least certain first determinate values, and for terminating said control of said working fluid supplying and discharging means at said first duty ratio when said deviations of said actual wheel heights from said standard wheel heights have become less than second determinate values which are less than said first determinate values.

According to a more detailed aspect of the present invention, in the latter above construction, said computing and control means is for, when the absolute value of the deviation in vehicle loading has become not more than said second determinate value, starting control of said working fluid supplying and discharging means at said second duty ratio.

According to a more detailed aspect of the present invention, in the latter above construction, said computing and control means is for, when the absolute value of the deviation in vehicle loading has become not more than a determinate value, terminating control of said working fluid supplying and discharging means at said second duty ratio.

According to a more detailed aspect of the present invention, in the latter above construction, said computing and control means is for, when the absolute values of said deviations of said actual wheel heights from said standard wheel heights become less than certain first determinate values, not performing control of said working fluid supplying and discharging means at said first duty ratio or at said second duty ratio.

According to a more detailed aspect of the present invention, the latter above construction may further comprise a means for detecting vehicle loading, which is a means for detecting the pressures in said pressure chambers of said working fluid supplying and discharging means as fluctuations corresponding to the support loads on the corresponding vehicle wheels.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

Figure 1:
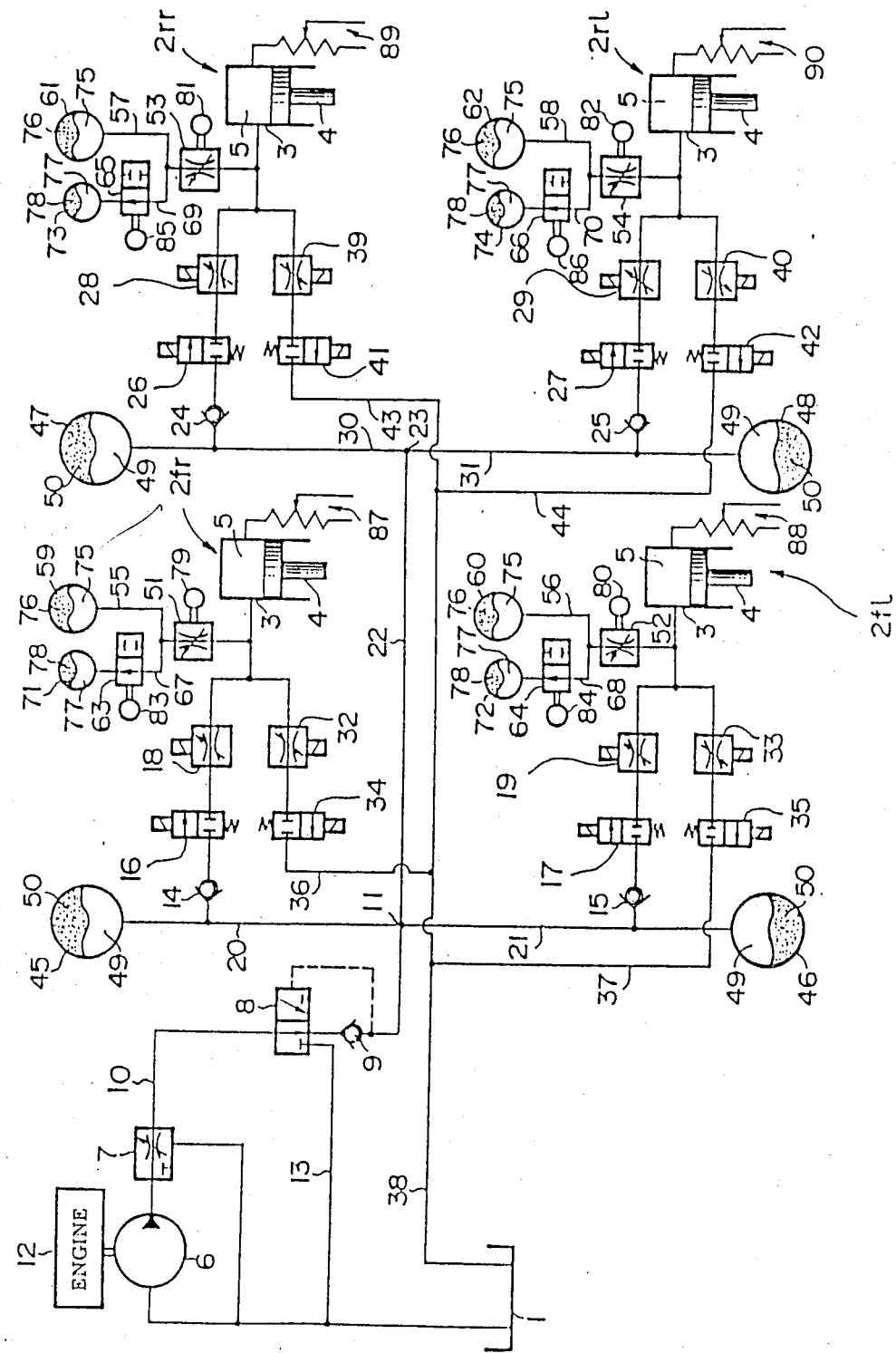
FIG. 1 is a schematic diagram showing major physical components of the first and the second preferred embodiments of the system for roll control for an automotive vehicle of the present invention which will be described.
Figure 2:
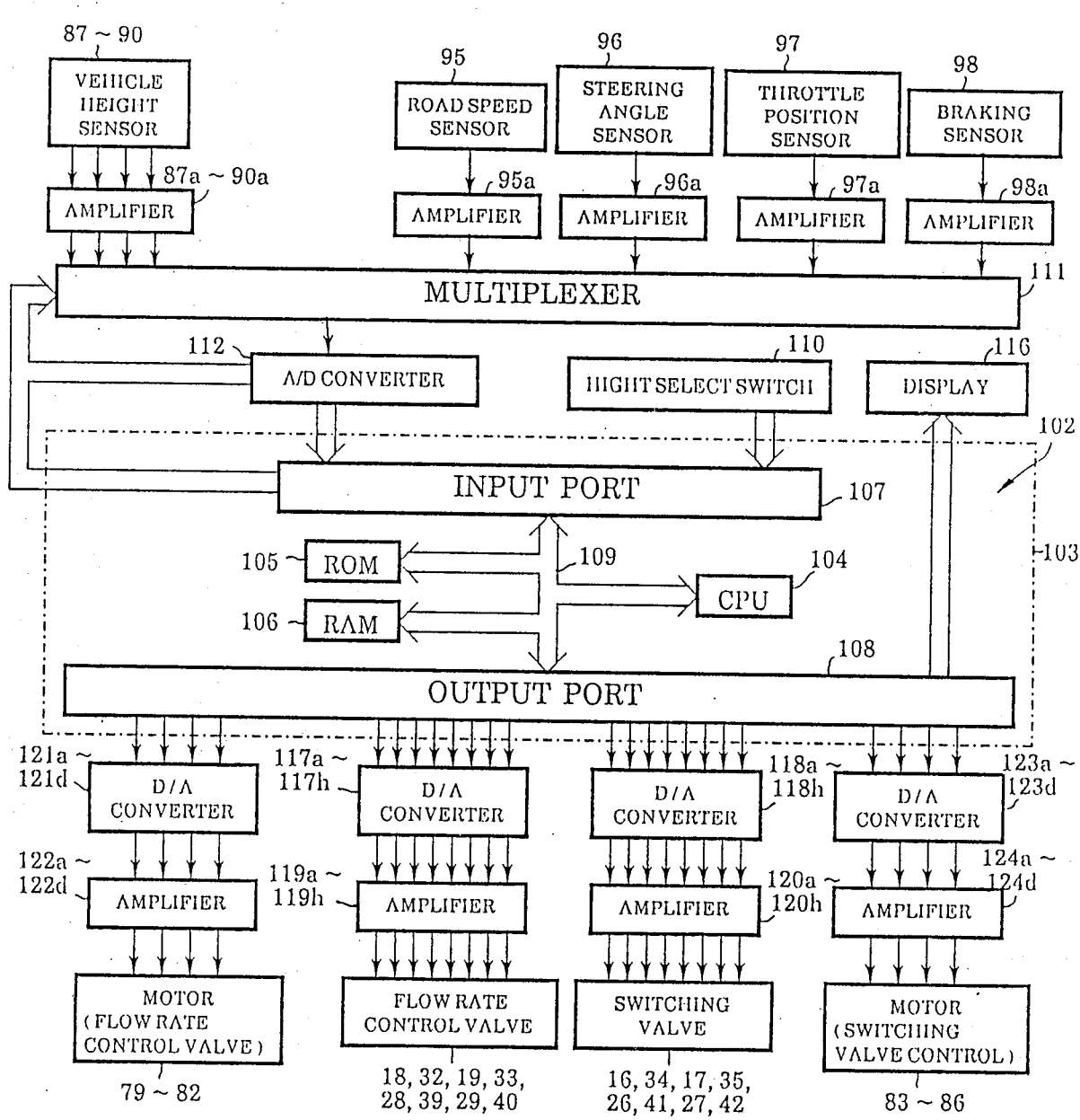
FIG. 2 is a block diagrammatical view showing the internal construction of an electrical control device, of a type incorporated in said first and said second preferred embodiments of the system for roll control for an automotive vehicle of the present invention, incorporating a micro computer.

The present invention will now be described with reference to the preferred embodiments thereof, and with reference to the figures. The overall construction of the suspension system incorporated in any one of the preferred embodiments of the system for roll control for an automotive vehicle of the present invention which will be described is very similar, and the construction of a micro computer incorporated therein is likewise very similar in all the preferred embodiments, while the control programs which control the operation of said micro computer incorporated in said various preferred embodiments, on the other hand, are substantially different. FIG. 1, therefore, is a schematic diagram showing major physical components of the first and the second said preferred embodiments of the system for automotive vehicle roll control of the present invention, and FIG. 2 is a block diagrammatical view showing the internal construction of an electrical control device incorporating a micro computer, incorporated in said first and said second preferred embodiments.

OVERALL SUSPENSION SYSTEM CONSTRUCTION

Referring first to FIG. 1 which shows the gross mechanical components incorporated in the first and second preferred embodiments of the vehicle roll control system of the present invention that are utilized for vehicle height and ride adjustment, in this figure the reference numeral 1 denotes a suspension working fluid reservoir or sump, while 2fl, 2fr, 2rl, and 2rr are actuator assemblies which are provided to, respectively the front left vehicle wheel, the front right vehicle wheel, the rear left vehicle wheel, and the rear right vehicle wheel; none of these vehicle wheels is particularly shown in any of the figures. And, in and for each of said actuator assemblies 2fl, 2fr, 2rl, and 2rr, the reference numeral 3 denotes a cylinder and the reference numeral 4 denotes a piston sliding in said cylinder and cooperating with a closed end thereof to define an actuating pressure chamber 5. Each of said vehicle wheels is rotationally mounted about a substantially horizontal axis to a member such as a suspension arm (not shown) or the like which is suspended from the body (also not shown) of the vehicle by means of a flexible linkage of some per se known sort, and each of said actuator assemblies 2fl, 2fr, 2rl, and 2rr is arranged to have one of its cylinder 3 and its piston 4 drivingly coupled to one of said vehicle body and said suspension arm, while the other of its said cylinder 3 and said piston 4 is drivingly coupled to the other of said vehicle body and said suspension arm. Thus, by pressurization by suspension working fluid (abbreviated hereinafter merely as "fluid") of the pressure chamber 5 defined by said cylinder 3 and said piston 4, each of said actuator assemblies 2fl, 2fr, 2rl, and 2rr serves for maintaining and adjusting the sprung height from the road surface of the portion of the vehicle body above its associated vehicle wheel, and for determining the characteristics of the springing of its said associated vehicle wheel. In other possible embodiments of the vehicle roll control system of the present invention, other constructions (such as hydraulic ram type devices) would be possible for these actuator assemblies 2fl, 2fr, 2rl, and 2rr, as long as each was capable of increasing and decreasing the sprung height of the portion of the vehicle body above its associated vehicle wheel, corresponding to the supply and the discharge of fluid to a working fluid chamber thereof or to some other control function exerted from a controller, and as long as the pressure in the working fluid chamber increased and decreased in response respectively to bound and rebound of said associated vehicle wheel (or the functional like).

Working fluid for the operation of this suspension system, such as a specialized type of oil or the like, is sucked up from the reservoir 1 by a fluid pump 6 rotationally driven by the engine 12 of the vehicle to which this suspension system is fitted, and a pressurized supply thereof is fed via a conduit 10 through, in order, a flow rate control valve 7, a load mitigating valve 8, and a one way check valve 9 to a conduit junction point 11, and from this junction point 11 via another conduit 22 said pressurized fluid is fed to another conduit junction point 23. This flow rate control valve 7 is constructed so as to control the flow rate of fluid in the conduit 10 according to a signal which it receives. The load mitigating valve 8 is constructed so as to be responsive to the pressure in the conduit 10 downstream of the one way check valve 9 and so as to vent a certain amount of the pressurized fluid in said conduit 10 via a conduit 13 back to a point in the conduit 10 upstream of the pump 6, so as to maintain said pressure in the conduit 10 downstream of the one way check valve 9 at no more than a determinate pressure value. An d the check valve 9 prevents the fluid from flowing backwards through the conduit 10 from the conduit junction points 11 and 23 towards the load mitigating valve 8.

The conduit junction point 11 is connected to the cylinder chamber 5 of the actuator 2fr for the front right vehicle wheel via a conduit 20 at intermediate points along which there are provided, in order, a one way check valve 14, an electrically controlled ON/OFF switching valve 16, and an electrically controlled flow rate control valve 18. Similarly, said conduit junction point 11 is connected to the cylinder chamber 5 of the actuator 2fl for the front left vehicle wheel via a conduit 21 at intermediate points along which there are provided, in order, a one way check valve 15, an electrically controlled ON/OFF switching valve 17, and an electrically controlled flow rate control valve 19. The other conduit junction point 23 is connected to the cylinder chamber 5 of the actuator 2rr for the rear right vehicle wheel via a conduit 30 at intermediate points along which there are provided, in order, a one way check valve 24, an electrically controlled ON/OFF switching valve 26, and an electrically controlled flow rate control valve 28. Similarly, said other conduit junction point 23 is connected to the cylinder chamber 5 of the actuator 2rl for the rear left vehicle wheel via a conduit 31 at intermediate points along which there are provided, in order, a one way check valve 25, an electrically controlled ON/OFF switching valve 27, and an electrically controlled flow rate control valve 29. Thus, the cylinder chambers 5 for the actuators 2fr, 2fl, 2rr, and 2rl are selectively supplied with pressurized fluid from the reservoir 1 via the conduits 10, 20 and 21, 22, and 30 and 31 with, as will be described in detail hereinbelow, such supply of pressurized fluid and the flow rate thereof being appropriately and properly controlled by the supply of electrical energy to the electrically controlled ON/OFF switching valves 16, 17, 26, and 27 and to the electrically controlled flow rate control valves 18, 19, 28, and 29.

To a point of the conduit 20 between the electrically controlled flow rate control valve 18 and the cylinder chamber 5 of the actuator 2fr for the front right vehicle wheel there is communicated one end of a conduit 36, the other end of which is connected to a drain conduit 38. At intermediate points on said conduit 36 there are provided an electrically controlled flow rate control valve 32 and an electrically controlled ON/OFF switching valve 34. Similarly, to a point of the conduit 21 between the electrically controlled flow rate control valve 19 and the cylinder chamber 5 of the actuator 2fl for the front left vehicle wheel there is communicated one end of a conduit 37, the other end of which is connected to said drain conduit 38, and at intermediate points on said conduit 37 there are provided an electrically controlled flow rate control valve 33 and an electrically controlled ON/OFF switching valve 35. And to a point of the conduit 30 between the electrically controlled flow rate control valve 28 and the cylinder chamber 5 of the actuator 2rr for the rear right vehicle wheel there is communicated one end of a conduit 43, the other end of which is connected to the drain conduit 38, and at intermediate points on said conduit 43 there are provided an electrically controlled flow rate control valve 39 and an electrically controlled ON/OFF switching valve 41, while also to a point of the conduit 31 between the electrically controlled flow rate control valve 29 and the cylinder chamber 5 of the actuator 2rl for the rear left vehicle wheel there is communicated one end of a conduit 44, the other end of which is connected to said drain conduit 38, and at intermediate points on said conduit 44 there are provided an electrically controlled flow rate control valve 40 and an electrically controlled ON/OFF switching valve 42. Thus, the cylinder chambers 5 for the actuators 2fr, 2fl, 2rr, and 2rl are selectively exhausted of pressurized fluid to the reservoir 1 via the conduits 36, 37, 43, 44, and 38, with, as will be described in detail hereinbelow, such exhausting of pressurized fluid and the flow rate thereof being appropriately and properly controlled by the supply of electrical energy to the electrically controlled ON/OFF switching valves 34, 35, 41, and 42 and to the electrically controlled flow rate control valves 32, 33, 29, and 40.

In this shown construction, although such constructional details should be understood as not limitative of the present invention, the electrically controlled ON/OFF switching valves 16, 17, 26, 27, 34, 35, 41, and 42 are constructed as normally closed switching valves incorporating such devices as solenoids (not particularly shown), and, when no actuating electrical energy is supplied to the coil (not shown either) of one of said solenoids, the respective one of said switching valves 16, 17, 26, 27, 34, 35, 41, and 42 is closed as schematically shown in the figure so as to intercept and to prevent flow of fluid in the conduit to which said switching valve is fitted, while on the other hand, when actuating electrical energy is supplied to said coil of said one of said solenoids, said respective one of said switching valves 16, 17, 26, 27, 34, 35, 41, and 42 is opened as also schematically shown in the figure so as to allow flow of fluid in said conduit to which said switching valve is fitted. Also, the electrically controlled flow rate control valves 18, 19, 28, 29, 32, 33, 39, and 40 are constructed so as to vary the degree of restriction which they apply according to the duty ratio of the current or the voltage of actuating pulse electrical signals which they receive, so as to thereby control the flow rate of fluid flowing through the conduits 20, 21, 30, 31, 36, 37, 43, and 44 respectively associated with said flow rate control valves.

To a point on the conduit 20 intermediate between the junction point 11 and the one way check valve 14, i.e. upstream of said one way check valve 14, there is connected an accumulator 45 which has a fluid chamber 49 and an air chamber 50 which are separated from one another by a diaphragm. This accumulator 45 serves to absorb fluctuations in pressure set up in the conduit 10 due to pulsations in the fluid supply provided by the pump 6 and due to the action of the load mitigating valve 8, and to accumulate pressure for the fluid in the conduit 20. Similarly, to a point on the conduit 21 intermediate between the junction point 11 and the one way check valve 15, i.e. upstream of said one way check valve 15, there is connected an accumulator 46 which has a fluid chamber 49 and an air chamber 50 which are separated from one another by a diaphragm. This accumulator 46 similarly serves to absorb fluctuations in pressure set up in the conduit 10 due to pulsations in the fluid supply provided by the pump 6 and due to the action of the load mitigating valve 8, and to accumulate pressure for the fluid in the conduit 21. And, likewise, to a point on the conduit 30 intermediate between the junction point 11 and the one way check valve 24, i.e. upstream of said one way check valve 24, there is connected an accumulator 47 which has a fluid chamber 49 and an air chamber 50 which are separated from one another by a diaphragm, and this accumulator 47 serves to absorb fluctuations in pressure set up in the conduit 22 due to pulsations in the fluid supply provided by the pump 6 and due to the action of the load mitigating valve 8, and to accumulate pressure for the fluid in the conduit 30; while, similarly, to a point on the conduit 31 intermediate between the junction point 11 and the one way check valve 25, i.e. upstream of said one way check valve 25, there is connected an accumulator 48 which has a fluid chamber 49 and an air chamber 50 which are separated from one another by a diaphragm; and this accumulator 48 similarly serves to absorb fluctuations in pressure set up in the conduit 22 due to pulsations in the fluid supply provided by the pump 6 and due to the action of the load mitigating valve 8, and to accumulate pressure for the fluid in the conduit 31.

To another point on the conduit 20 intermediate between the electrically controlled flow rate control valve 18 and the actuator 2fr for the front right vehicle wheel there is connected one end of a conduit 55, to the other end of which there is connected a main spring 59 which has a fluid chamber 75 and an air chamber 76 which are separated from one another by a diaphragm. At an intermediate point of said conduit 55 there is fitted a flow rate control valve 51 controlled by an electrically operated motor 79. And to a point on said conduit 55 between said flow rate control valve 51 and said main spring 59 there is connected one end of a conduit 67, to the other end of which there is connected a subspring 71 which has a fluid chamber 77 and an air chamber 78 which are separated from one another by a diaphragm. At an intermediate point of said conduit 67 there is fitted a normally open type ON/OFF switching valve 63 controlled by an electrically operated motor 83. Thus, as the volume of the cylinder chamber 5 of this actuator 2fr for the front right vehicle wheel varies in response to the bound and the rebound of said front right vehicle wheel and air compressed therein is squeezed and unsqueezed, the fluid in said cylinder chamber 5 and in the fluid chambers 75 and 77 of this main spring 59 and this subspring 71 flows to and fro therebetween through the flow rate control valve 51, and the flow resistance caused therby produces a vibratory damping effect. Similarly, to a point on the conduit 21 intermediate between the electrically controlled flow rate control valve 19 and the actuator 2fl for the front left vehicle wheel there is connected one end of a conduit 56, to the other end of which there is connected a main spring 60 which has a fluid chamber 75 and an air chamber 76 which are separated from one another by a diaphragm, and at an intermediate point of said conduit 56 there is fitted a flow rate control valve 52 controlled by an electrically operated motor 80. And to a point on said conduit 56 between said flow rate control valve 52 and said main spring 60 there is connected one end of a conduit 68, to the other end of which there is connected a subspring 72 which has a fluid chamber 77 and an air chamber78 which are separated from one another by a diaphragm. At an intermediate point of said conduit 68 there is fitted a normally open type ON/OFF switching valve 64 controlled by an electrically operated motor 84. Thus, as the volume of the cylinder chamber 5 of this actuator 2fl for the front left vehicle wheel varies in response to the bound and the rebound of said front left vehicle wheel and air compressed therein is squeezed and unsqueezed, the fluid in said cylinder chamber 5 and in the fluid chambers 75 and 77 of this main spring 60 and this subspring 72 similarly flows to and fro therebetween through the flow rate control valve 52, and the flow resistance caused thereby similarly produces a vibratory damping effect. And, with relation to the rear suspension for the vehicle, to a point on the conduit 30 intermediate between the electrically controlled flow rate control valve 28 and the actuator 3fr for the rear right vehicle wheel there is similarly connected one end of a conduit 57, to the other end of which there is connected a main spring 61 which likewise has a fluid chamber 75 and an air chamber 76 which are separated from one another by a diaphragm. At an intermediate point of said conduit 57 there is fitted a flow rate control valve 53 controlled by an electrically operated motor 81, and to a point on said conduit 57 between said flow rate control valve 53 and said main spring 61 there is connected one end of a conduit 69, to the other end of which there is connected a subspring 73 which also has a fluid chamber 77 and an air chamber 78 which are separated from one another by a diaphragm. And at an intermediate point of said conduit 69 there is likewise fitted a normally open type ON/OFF switching valve 65 controlled by an electrically operated motor 85. Thus, as the volume of the cylinder chamber 5 of this actuator 2fr for the rear right vehicle wheel varies in response to the bound and the rebound of said rear right vehicle wheel and air compressed therein is squeezed and unsqueezed, the fluid in said cylinder chamber 5 and in the fluid chambers 75 and 77 of this main spring 61 and this subspring 73 flows to and fro therebetween through the flow rate control valve 53, and the flow resistance caused thereby likewise produces a vibratory damping effect. Similarly, to a point on the conduit 31 intermediate between the electrically controlled flow rate control valve 29 and the actuator 2fl for the rear left vehicle wheel there is connected one end of a conduit 58, to the other end of which there is connected a main spring 62 which likewise has a fluid chamber 75 and an air chamber 76 which are separated from one another by a diaphragm, and at an intermediate point of said conduit 58 there is fitted a flow rate control valve 54 controlled by an electrically operated motor 82. And to a point on said conduit 58 between said flow rate control valve 54 and said main spring 62 there is connected one end of a conduit 70, to the other end of which there is connected a subspring 74 which has a fluid chamber 77 and an air chamber 78 which are separated from one another by a diaphragm. At an intermediate point of said conduit 70 there is fitted a similar normally open type ON/OFF switching valve 66 controlled by an electrically operated motor 86. Thus, as the volume of the cylinder chamber 5 of this actuator 2fl for the rear left vehicle wheel varies in response to the bound and the rebound of said rear left vehicle wheel and air compressed therein is squeezed and unsqueezed, the fluid in said cylinder chamber 5 and in the fluid chambers 75 and 77 of this main spring 62 and this subspring 74 similarly flows to and fro therebetween through the flow rate control valve 54, and the flow resistance caused thereby similarly produces a vibratory damping effect.

As will be particularly explained hereinafter, in all of the preferred embodiments of the vehicle roll control system of the present invention which will be described, the damping effect C for each of the four vehicle wheels is arranged to be switched between three levels—high, medium, and low—according to control of the flow resistance of the flow rate control valves 51, 52, 53, and 54 by the associated respective electric motors 79, 80, 81, and 82. Also, the springing effect or spring rate, i.e. the modulus of elasticity of springing, of each of the four vehicle wheels is arranged to be switched between two levels—high and low—according to control of the opening and closing of the ON/OFF switching valves 63, 64, 65, and 66 by the associated respective electric motors 83, 84, 85, and 86. And, as will be described shortly, the electric motors 79, 80, 81, and 82 and the electric motors 83, 84, 85, and 86 are selectively energized and controlled by an electrical control device 102, according to signals which said electrical control device 102 receives from a vehicle speed sensor 95, a steering angle sensor 96, a throttle position sensor 97, and a braking sensor 98, so as to minimize nose dive, squat, and roll of the vehicle. Furthermore, vehicle height sensors 87, 88, 89, and 90 (each schematically illustrated as a variable resistor although other constructions therefor are possible) are provided respectively to the actuator 2fr for the front right vehicle wheel, the actuator 2fl for the front left vehicle wheel, the actuator 2rr for the rear right vehicle wheel, and the actuator 2rl for the rear left vehicle wheel, each functioning so as to sense the displacement of the piston 4 of its associated actuator (or of the suspension arm associated therewith, not particularly shown) so as to produce an electrical output signal representative thereof, i.e. representative of the height of the generally corresponding portion of the vehicle body from the road surface; these electrical output signals are fed to the electrical control device 102.

THE CONSTRUCTION OF THE ELECTRICAL CONTROL DEVICE 102

Referring now particularly to FIG. 2, the construction of the electrical control device 102 of the first and the second preferred embodiments, and of the micro computer designated as 103 incorporated therein, will be explained. This micro computer 103 may, as suggested in FIG. 2, be of per se conventional construction, and in such an exemplary case incorporates a CPU (central processing unit) 104, a ROM (read only memory) 105, a RAM (random access memory) 106, an input port device 107, and an output port device 108, all of these elements being linked together by way a two way common bus 109.

A vehicle height selection switch 110 is provided in the passenger compartment of the vehicle, capable of being accessed by the vehicle driver. This vehicle height selection 110 is settable to any one of three positions, said three positions indicating that the driver desires the vehicle height to be either high (H), normal (N), or low (L), and outputs a signal representative of its setting to the input port device 107 and thus to the micro computer 103. The input port device 107 is also supplied, via a multiplexer 111 and an A/D converter 112, with signals representative of the actual current vehicle heights, designated hereinafter as Hfr, Hfl, Hrr, and Hrl, over the four vehicle wheels outputted by the aforementioned four vehicle height sensors 87, 88, 89, and 90 respectively therefor and amplified by respective amplifiers 87a, 88a, 89a, and 90a, and with a signal representative of the vehicle road speed V outputted from the vehicle speed sensor 95 and amplified by an amplifier 95a, with a signal representative of the steering angle alpha (considering turning to the right as positive) outputted from the steering angle sensor 96 and amplified by an amplifier 96a, with a signal representative of the throttle opening theta outputted by the throttle position sensor 97 and amplified by an amplifier 97a, and with a signal representative of whether or not the braking systems of the vehicle is being operated outputted by the braking sensor 98 and amplified by an amplifier 98a.

In the ROM 105 there are stored reference vehicle heights Hhf and Hhr, Hnf and Hnr, and Hlf and Hlr. Hhf and Hhr are respectively the desired vehicle body heights over the front wheels and over the rrear wheels when the vehicle height selection switch 110 is set to high (H); Hnf and Hnr are respectively the desired vehicle body heights over the front wheels and over the rear wheels when the vehicle height selection switch 110 is set to normal (N); and Hlf and Hlr are respectively the desired vehicle body heights over the front wheels and over the rear wheels when the vehicle height selection switch 110 is set to low (L). Thus Hhf>Hnf>Hlf and also Hhr>Hnr>Hlr. Also in the ROM 105 there are stored values representing maps corresponding to the graph shown in FIG. 5 which will be described hereinafter, as well as other constant values. The CPU 104 performs various calculations as will be described shortly, and based upon the results thereof selectively outputs control signals through the output port device 108 for controlling the drive motors 79 through 82 for the respective flow rate control valves 51 through 54 via respective D/A converters 121a through 121d and via respective amplifiers 122a through 122d, for controlling the flow rate control valves 18, 32, 19, 33, 28, 29, and 40 via respective D/A converters 117a through 117d and via respective amplifiers 119a through 119d, for controlling the ON/OFF switching valves 16, 34, 17, 35, 26, 41, 27, and 42 via respective D/A converters 118a through 118d and via respective amplifiers 120a through 120d, and for controlling the drive motors 83 through 86 for the respective ON/OFF switching valves through 66 via respective D/A converters 123a through 123d and via respective amplifiers 124a through 124d. Further, to the output port device 108 there is connected a display unit 116 which indicates to the vehicle driver whether or not the desired vehicle height set by said driver on the vehicle height selection switch 110 is currently high (H), normal (N), or low (L). This display unit 116 also indicates to the vehicle driver whether or not the damping effect control mode set by said driver on a damping effect control mode selection switch, not particularly shown but whose output is also fed to the micro computer 103 via the input port device 107 in the same way as in the output of the vehicle height selection switch 110, is currently (a) a manual normal mode (MN) in which the damping effect for the suspension system is fixedly set to be always low (normal), (b) a manual sports mode (MS) in which the damping effect for the suspension system is fixedly set to be always medium (sports), (c) an auto normal base mode (ANB) in which the damping effect for the suspension system is automatically adjusted to low (soft) or to high (hard) in accordance with the current values of various operational parameters of the vehicle, or (d) an auto sports base mode (ASB) in which the damping effect for the suspension system is automatically adjusted to medium or to high (hard) in accordance with the current values of various operational parameters of the vehicle.

THE FIRST PREFERRED EMBODIMENT

Figure 3:
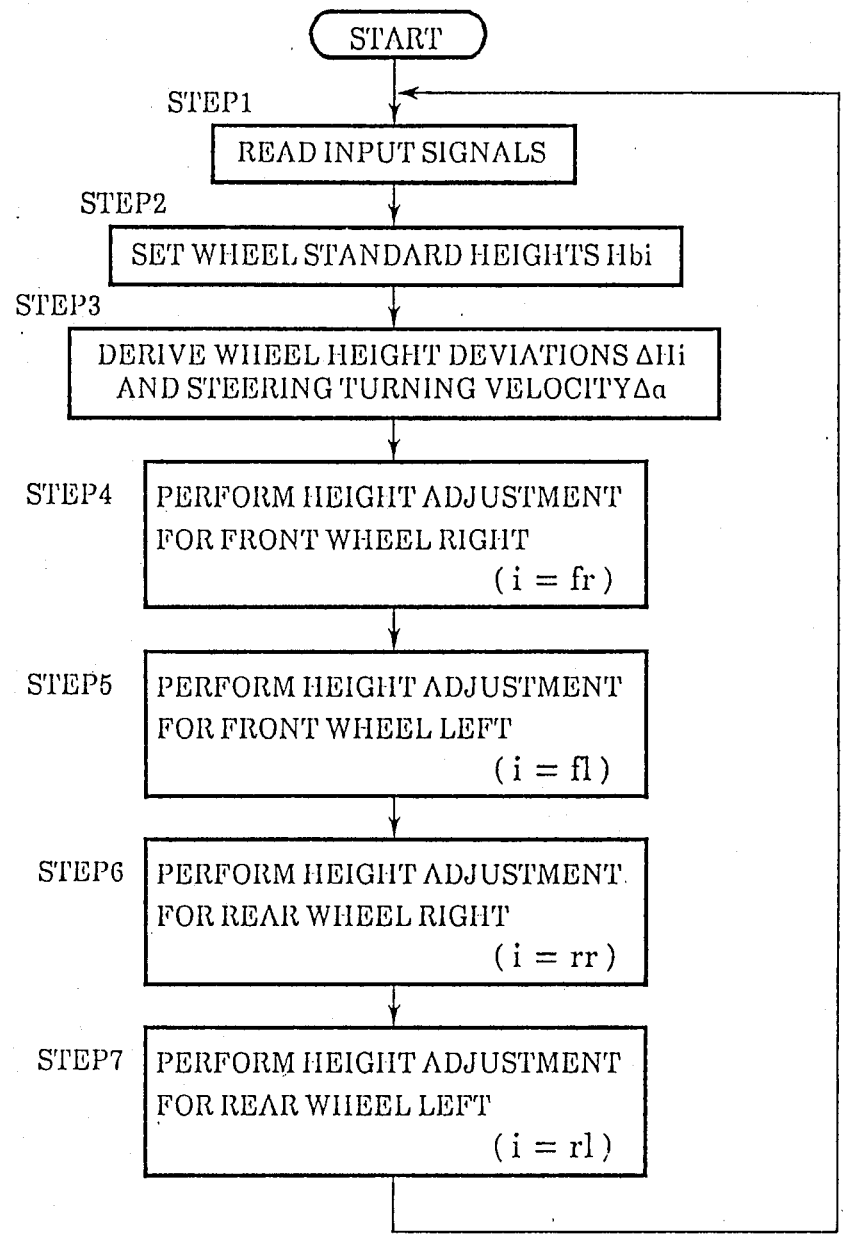
FIG. 3 is a flow chart showing the overall flow of a cyclical program which directs the operation of the said micro computers utilized in the first and the second preferred embodiments of the vehicle roll control system of the present invention, during normal operational processing.
Figure 4:
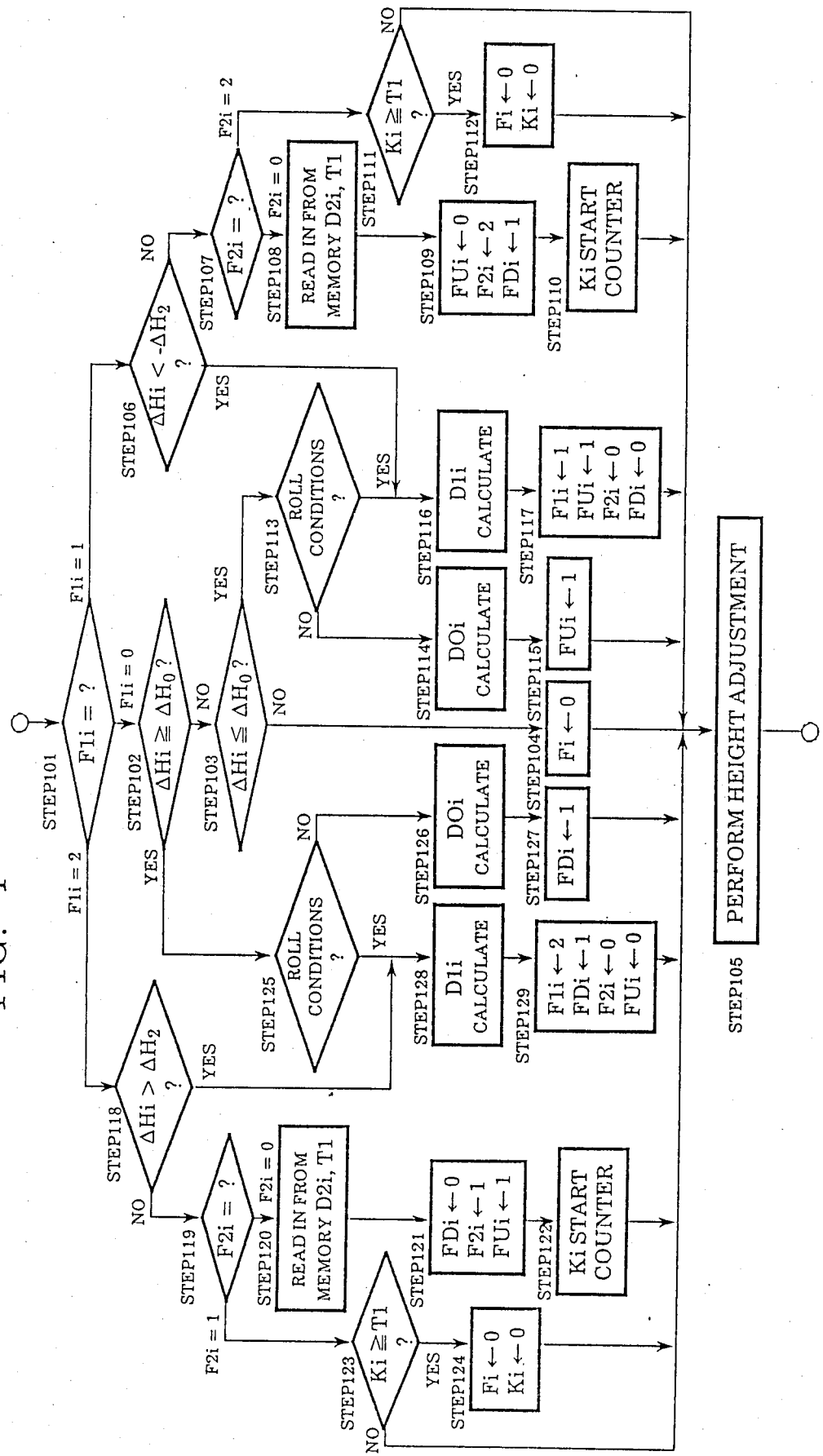
FIG. 4 is a detailed flow chart of a subroutine which is called in the case of the first preferred embodiment from four blocks shown in the flow chart of FIG. 3, again during normal operational processing.
Figure 8:
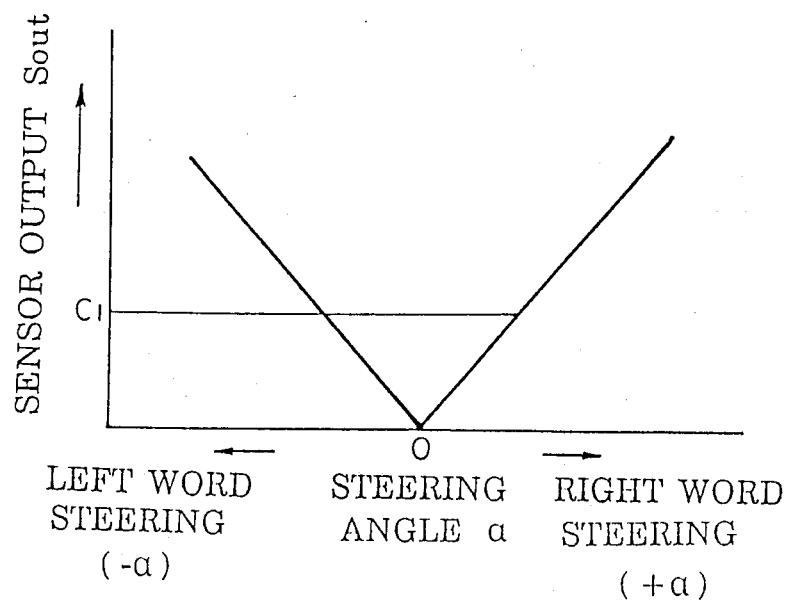
FIG. 8 is a diagram for illustrating a method of determining the occurrence of such steering wheel return according as to whether or not certain conditions are satisfied.

Referring next to the flow charts shown in FIGS. 3, 4, 6, 7, and 10 and to the graphs shown in FIGS. 5 and 8, and the time chart of FIG. 9, the operation of the micro computer 103 incorporated in the first preferred embodiment of the system for vehicle roll control of the present invention as shown in gross detail in FIGS. 1 and 2 will be explained. FIG. 3 is a flow chart showing the overall flow of said operation of said micro computer 103, and it will easily be observed that this overall program flow is a repetitive cycle which will typically take place over a certain characteristic approximate cycle time; while FIG. 4 is a flow chart showing in detail a routine which is called from each of the steps 4 through 7 of the flow chart laid out in FIG. 3 with a different parameter "i" equal to "fr", "fl", "rr", and "rl" for the various vehicle wheels.

In the step 1, then, signals indicating the wheel heights Hi (where "i" is "fr" for the front right wheel, "fl" for the front left wheel, "rr for the rear right wheel, and "rl" for the rear left wheel) as detected and outputted by the wheel height sensors 87 to 90, signals indicating the vehicle speed V, the steering angle alpha, the throttle opening theta, and the vehicle braking state detected and outputted by, respectively, the vehicle speed sensor 95, the steering angle sensor 96, the throttle opening sensor 97, and the braking sensor 98, a signal for the switch function S outputted from the vehicle height selection switch 110, and a signal for the switch function input from the damping effect selection switch not shown in the drawings are read in to the micro computer 103, and thereafter control is transferred to the step 2.

In the step 2, when the switch function S of the vehicle height selection switch 110 is "H" for indicating that the vehicle height is to be set to high, the front wheel standard wheel heights Hbfr and Hbfl are set to Hhf and the rear wheel standard wheel heights Hbrr and Hbrl are set to Hhr; when the switch function S of the vehicle height selection switch 110 is "N" for indicating that the vehicle height is to be set to normal, the front wheel standard wheel heights Hbfr and Hbfl are set to Hnf and the rear wheel standard wheel heights Hbrr and Hbrl are set to Hnr; and, when the switch function S of the vehicle height selection switch 110 is "L" for indicating that the vehicle height is to be set to low, the front wheel standard wheel heights Hbfr and Hbfl are set to Hlf and the rear wheel standard wheel heights Hbrr and Hbrl are set to Hlr. In any of these cases, next control is transferred to the step 3.

In the step 3, the deviations delta Hi between the actual wheel heights Hi (where "i" is "fr" for the front right wheel, "fl" for the front left wheel, "rr" for the rear right wheel, and "rl" for the rear left wheel) and the base wheel heights Hbi for each wheel, and also the steering velocity V(alpha), i.e. a quantity representative of the rate of turning of the steering wheel of the vehicle or of the rate of alternation of steering angle, are computed according to the following expressions:

delta Hi=Hi−Hbi

V(alpha)=alpha(n)−alpha(n−1)

Herein, alpha(n−1) is the steering angle detected a certain short time interval before the detection of alpha(n), such as for example one iteration of the FIG. 3 routine before this iteration thereof, i.e. one cycle earlier. After this derivation of the wheel height deviations delta Hi and the steering velocity V(alpha), control is transferred nexgt to the step 4.

In the step 4, by executing the subroutine whose control flow is shown in FIG. 4 and will be described later, with "i" equal to "fr", the wheel height adjustment for the front right wheel is carried out, and thereafter control is transferred next to the step 5.

In the step 5, by executing the subroutine whose control flow is shown in FIG. 4 and will be described later, with "i" equal to "fl", the wheel height adjustment for the front left wheel is carried out, and thereafter control is transferred next to the step 6.

In the step 6, by executing the subroutine whose control flow is shown in FIG. 4 and will be described later, with "i" equal to "rr", the wheel height adjustment for the rear right wheel is carried out, and thereafter control is transferred next to the step 7.

In the step 7, by executing the subroutine whose control flow is shown in FIG. 4 and will be described later, with "i" equal to "rl", the wheel height adjustment for the rear left wheel is carried out. After the step 7 has been executed, control returns to the step 1, and until the ignition switch is switched off, or until an interrupt occurs as will be explained later, the steps 1 to 7 are repeated, i.e. the program flow cycles round and round in a closed loop, repeatedly performing the steps detailed above.

Next, the subroutine whose flow chart is laid out in FIG. 4 and which is executed in each of the steps 4 to 7 will be described; this subroutine takes "i" as a parameter, where "i" is "fr" for the front right wheel, "fl" for the front left wheel, "rr" for the rear right wheel, and "rl" for the rear left wheel. It should be noted that in FIG. 4 the flags F1i (where "i" is "fr" for the front right wheel, "fl" for the front left wheel, "rr" for the rear right wheel, and "rl" for the rear left wheel) indicate whether or not wheel height adjustment control for roll control, for each said wheel, is being carried out: a flag value of zero indicates an operational state where wheel height increase or decrease adjustment is not being carried out, a flag value of one indicates an operational state where wheel height increase adjustment (up control for raising the vehicle body over that vehicle wheel) is being carried out, and a flag value of two indicates an operational state where wheel height decrease adjustment (down control for lowering the vehicle body down towards that vehicle wheel) is being carried out. The flags F2i (where again "i" is "fr" for the front right wheel, "fl" for the front left wheel, "rr" for the rear right wheel, and "rl" for the rear left wheel) relate to reverse output control for the purpose of restricting overshoot: a flag value of zero indicates an operational state where reverse output control is not being carried out, a flag value of one indicates an operational state where up control for raising the vehicle body over that vehicle wheel is being carried out by reverse output, and a flag value of two indicates an operational state where down control for lowering the vehicle body down towards that vehicle wheel is being carried out by reverse output. The flags FUi relate to whether or not actuating electrical energy is currently being supplied to the flow control valves 18, 19, 28 and 29 and to the open/shut valves 16, 17, 26 and 27 which control the supply of fluid to the actuator assemblies: a flag value of zero indicates that actuating electrical energy is not being thus supplied and thus that the vehicle body is not being raised over the corresponding vehicle wheel, and a flag value of one indicates that actuating electrical energy is being thus supplied and thus that the vehicle body is being raised over the corresponding vehicle wheel. The flags FDi relate to whether or not actuating electrical energy is being supplied to the flow control valves 32, 33, 39 and 40 and the open/shut valves 34, 35, 41 and 42 which control the draining of fluid from the actuator assemblies: a flag value of zero indicates that actuating electrical energy is not being thus supplied and thus that the vehicle body is not being lowered down towards the corresponding vehicle wheel, and a flag value of one indicates that actuating electrical energy is being thus supplied and thus that the vehicle body is being lowered down towards the corresponding vehicle wheel. Furthermore the expression "flags Fi" will be used as a generic term for the flags F1i, F2i, FUi and FDi.

First, in the first step 101, a test is made as to which of its allowable values zero, one, or two the flag F1i currently assumes, and: if a decision is made that F1i is equal to zero, control is transferred next to the step 102; if a decision is made that F1i is equal to one control is transferred next to the step 106; and if a decision is made that F1i is equal to two control is transferred next to the step 118.

In the step 102, a test is made as to whether or not the wheel height deviation delta Hi is greater than a control threshold value delta H0: if a decision is made that it is not true that delta Hi is greater than or equal to delta H0, then the flow of control is transferred next to the step 103; while if a decision is made that delta Hi is greater than or equal to delta H0 control is transferred next to the step 125.

In the step 103, a test is made as to whether or not the wheel height deviation delta Hi is less than or equal to -delta H0: if a decision is made that it is not true that delta Hi is less than or equal to -delta H0, then the flow of control is transferred next to the step 104; while, if a decision is made that delta Hi is less than or equal to -delta H0, then the flow of control is transferred next to the step 113.

In the step 104, all of the flags Fi are reset to zero, and then the flow of control is transferred next to the step 105.

In the step 105, the wheel height adjustment is carried out. Since when the flow of control passed from the step 104 to the step 105 it was the case that Fi was equal to zero, wheel height increase or decrease adjustment is not at this point in the program flow carried out.

In the step 106, with delta H2 as a threshold value for reverse output control, a test is made as to whether or not the wheel height deviation delta Hi is less than -delta H2. If a decision is made that it is not true that delta Hi is less than -delta H2, then the flow of control is transferred next to the step 107; while, on the other hand, if a decision is made that delta Hi is less than -delta H2 control is transferred next to the step 116.

In the step 107, a test is made as to whether the value of the flag F2i is equal to zero or is equal to two. If a decision is made that the value of F2i is equal to zero, then the flow of control proceeds to the step 108; while, on the other hand, if a decision is made that F2i is equal to two, then the flow of control proceeds to the step 111.

Figure 5:
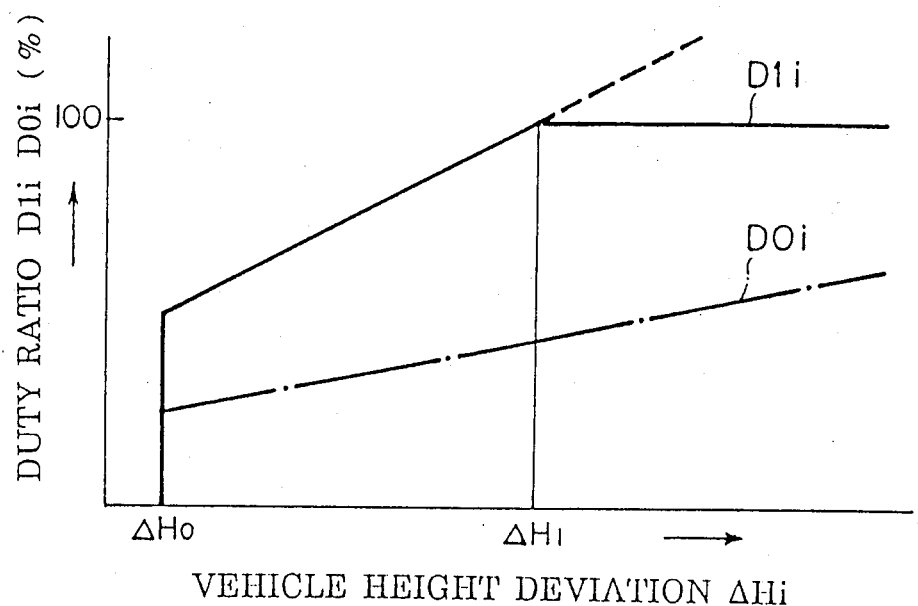
FIG. 5 is a graph exemplarily applying to all the preferred embodiments, illustrating a map stored in the memory of said micro computer, and showing duty ratio for a flow control valve on the vertical axis and wheel height deviation on the horizontal axis.

In the step 108, reading in from a look up table like the FIG. 5 graph stored in the ROM 105 of the duty ratio D2i (a constant value) for each flow control valve (for draining the appropriate one of the actuators 2fr, 2fl, 2rr, or 2rl) during reverse output control and the energizing time interval T1 (constant value) for the flow control valves (and the ON/OFF control valves) is carried out, and thereafter the flow of control is transferred next to the step 109.

In the step 109, the value of the flag FUi is reset to zero and the values of the flags F2i and FDi are set respectively to two and to one, and thereafter control is transferred next to the step 110.

In the step 110, the count of a counter Ki relating to the time interval T1 is started, and thereafter control is transferred next to the step 105. In this case, in the step 105, actuating electrical energy is supplied to the drain side electrically controlled flow rate control valve for draining the apropriate one of the actuators 2fr, 2fl, 2rr, or 2rl, at a duty ratio of D2i, and at the same time actuating electrical energy is supplied to the corresponding drain side electrically controlled ON/OFF switching valve, whereby the height of the vehicle body over the corresponding vehicle wheel is decreased, i.e. reverse output control is carried out in order to prevent an excessive increase (overshooting) in the wheel height for the corresponding vehicle wheel.

In the step 111, a test is made as to whether or not the count value of the counter Ki is at least T1, and if a decision is made that the count of Ki is greater than or equal to T1 then the flow of control is transferred next to the step 112, whereas if a decision is made that the count of Ki is not greater than or equal to T1 then the flow of control is transferred next to the step 105. In this case, in the step 105, since the flag setting state previously set in the step 109 in an earlier iteration through this FIG. 4 subroutine is preserved, thereby reverse output control is continued.

In the step 112, on the other hand, all of the flags Fi and also the count value of the counter Ki are reset to zero, and thereafter control is transferred next to the step 105. In this case, in the step 105, reverse output control is stopped.

In another program branch, in the step 113, a test is made as to whether or not the vehicle is in a condition liable to produce vehicle rolling, specifically whether or not the conditions below hold, with V0, alpha 1 and delta Hi as control threshold values for the vehicle speed, steering angle and wheel height:

$$V \geq V_0,$$
$$|\alpha| \geq \alpha_1 \text{ and} \qquad \text{(condition 1)}$$
$$|\Delta Hi| \geq \Delta H_1$$

If a decision is made that the vehicle is not in such a roll condition, the flow of control is transferred next to the step 114, while, on the other hand, if a decision is made that the vehicle is in such a roll condition, the flow of control is transferred next to the step 116.

In the step 114, from a lookup table in the ROM 105 again corresponding to the graph shown in FIG. 5, the duty ratio DOi for the electrically controlled flow rate control valve on the supply side (for supplying pressurized fluid into the appropriate one of the actuators 2fr, 2fl, 2rr, or 2rl) corresponding to the wheel height deviation delta Hi is computed, and thereafter the flow of control is transferred next to the step 115.

In the step 115, the value of the flag FUi is set to one, and thereafter the flow of control is transferred next to the step 105. In this case, in the step 105, in order that the wheel height Hi should be increased so that delta Hi exceeds -delta H0, actuating electrical energy is supplied to the supply side electrically controlled flow rate control valve for supplying pressurized fluid into the appropriate one of the actuators 2fr, 2fl, 2rr, or 2rl at a duty ratio DOi, and at the same time actuating electrical energy is supplied to the corresponding electrically controlled ON/OFF switching valve, whereby the height of the vehicle body over the corresponding vehicle wheel is increased, i.e. up control of the wheel height is carried out.

In the step 116, reading in from the lookup table in the ROM 105 corresponding to the graph shown in FIG. 5, the duty ratio D1i (greater than DOi) for each electrically controlled flow rate control valve (for supplying pressurized fluid to the appropriate one of the actuators 2fr, 2fl, 2rr, or 2rl) during vehicle raising control corresponding to the wheel height deviation delta Hi is determined, and thereafter the flow of control is transferred next to the step 117.

In the step 117, the flags F1i and FUi are set to one, and the flags F2i and FDi are reset to zero, and thereafter the flow of control is transferred next to the step 105. In this case, in the step 105, in order to prevent vehicle roll, actuating electrical energy is supplied to the supply side electrically controlled flow rate control valve for supplying pressurized fluid into the appropriate one of the actuators 2fr, 2fl, 2rr, or 2rl at a duty ratio D1i, and at the same time actuating electrical energy is supplied to the corresponding electrically controlled ON/OFF switching valve, whereby the height of the vehicle body over the corresponding vehicle wheel is increased, i.e. up control of the wheel height is carried out.

In the third main branch of this FIG. 4 subroutine, in the step 118, a test is made as to whether or not the wheel height deviation delta Hi exceeds delta H2, thus using delta H2 as the threshold value for reverse output control. If a decision is made that delta Hi is not greater than delta H2, then the flow of control is transferred next to the step 119; while, on the other hand, if a decision is made that delta Hi exceeds delta H2, then the flow of control is transferred next to the step 128.

In the step 119, a test is made as to whether or not the current value of the flag F2i is zero or unity. If a decision is made that the value of F2i is equal to zero, then the flow of control proceeds to the step 120; while, on the other hand, if a decision is made that the value of F2i is equal to one, then the flow of control proceeds to the step 123.

In the step 120, reading in from a map like the FIG. 5 graph stored in the ROM 105 of the duty ratio D2i for each electrically controlled flow rate control valve (for supplying pressurized fluid to the appropriate one of the actuators 2fr, 2fl, 2rr, or 2rl) during reverse output control and the energizing time interval T1 (constant value) for the flow control valves (and the ON/OFF control valves) is carried out, and thereafter the flow of control is transferred next to the step 121.

In the step 121, the value of the flag FDi is reset to zero and the values of the flags F2i and FUi are set to one, and thereafter the flow of control is transferred next to the step 122.

In the step 122, the count of a counter Ki relating to the time interval T1 is started, and thereafter control is transferred next to the step 105. In this case, in the step 105, actuating electrical energy is supplied to the supply side electrically controlled flow rate control valve for draining the appropriate one of the actuators 2fr, 2fl, 2rr, or 2rl, at a duty ratio of D2i, and at the same time actuating electrical energy is supplied to the corresponding supply side electrically controlled ON/OFF switching valve, whereby the height of the vehicle body over the corresponding vehicle wheel is decreased, i.e. reverse output control is carried out in order to prevent an excessive increase (overshooting) in the wheel height for the corresponding vehicle wheel.

In the step 123, a test is made as to whether or not the count value of the counter Ki is at least T1, and if a decision is made that the count value of Ki is greater than or equal to T1 the flow of control is transferred next to the step 124, whereas on the other hand if a decision is made that the count value of Ki is not greater than or equal to T1 then the flow of control is transferred next to the step 105. In this case, in the step 105, since the flag setting state previously set in the step 121 in an earlier iteration through this FIG. 4 subroutine is preserved, thereby reverse output control is continued.

In the step 124, the values of all of the flags Fi and also the count value of the counter Ki are reset to zero, and thereafter the flow of control is transferred next to the step 105. In this case, in the step 105, reverse output control is stopped.

In the step 125, a test is made as to whether or not the vehicle is in a condition which is liable to produce vehicle rolling, in other words whether or not the condition 1 laid out above currently holds. If a decision is made that the vehicle is not currently in a roll condition, the flow of control is transferred next to the step 126; while, on the other hand, when a decision is made that the vehicle is in a roll condition, then the flow of control is transferred next to the step 128.

In the step 126, from a lookup table in the ROM 105 corresponding to the graph shown in FIG. 5, the duty ratio DOi for the electrically controlled flow rate control valve on the drain side (for draining fluid from the appropriate one of the actuators 2fr, 2fl, 2rr, or 2rl) corresponding to the wheel height deviation delta Hi is computed, and thereafter the flow of control is transferred next to the step 127.

In the step 127, the value of the flag FDi is set to one, and thereafter the flow of control is transferred next to the step 105. In this case, in the step 105, in order that the wheel height Hi should be reduced so that delta Hi is less than delta H0, actuating electrical energy is supplied to the drain side electrically controlled flow rate control valve for draining fluid from the appropriate one of the actuators 2fr, 2fl, 2rr, or 2rl at a duty ratio DOi, and at the same time actuating electrical energy is supplied to the corresponding electrically controlled ON/OFF switching valve, whereby the height of the vehicle body over the corresponding vehicle wheel is decreased, i.e. down control of the wheel height is carried out.

In the step 128, reading in from the lookup table in the ROM 105 corresponding to the graph shown in FIG. 5, the duty ratio D1i for each electrically controlled flow rate control valve (for draining fluid from the appropriate one of the actuators 2fr, 2fl, 2rr, or 2rl) during vehicle lowering control corresponding to the wheel height deviation delta Hi is determined, and thereafter the flow of control is transferred next to the step 129.

In the step 129, the values of the flags F1i and FDi are set respectively to two and to one, and the values of the flags F2i and FUi are reset to zero, and thereafter the flow of control is transferred next to the step 105. In this case, in the step 105, in order to prevent vehicle roll, actuating electrical energy is supplied to the drain side electrically controlled flow rate control valve for draining fluid from the appropriate one of the actuators 2fr, 2fl, 2rr, or 2rl at a duty ratio D1i, and at the same time actuating electrical energy is supplied to the corresponding electrically controlled ON/OFF switching valve, whereby the height of the vehicle body over the corresponding vehicle wheel is decreased, i.e. down control of the wheel height is carried out.

Although the details of these matters are not particularly shown in the flow charts of FIGS. 3 and 4, when the flags F1i and F2i are equal to one or are equal to two, appropriate supply of actuating energy is performed to the motors 79 to 82 so as to increase the restriction amounts provided by the flow rate control valves 51 to 54, and appropriate supply of actuating electrical energy is performed to the motors 83 to 86 in order to close the electrically controlled ON/OFF switching valves 63 to 66, whereby the damping effect and the spring constant of the suspension units are switched to high (H). Also, in this first preferred embodiment of the present invention, when conditions such as are liable to produce vehicle nose dive and/or vehicle squat are detected, in order to restrict such undesirable vehicular attitudinizing, a control routine is executed by way of an interrupt, so as to increase the restriction amount provided by said electrically controlled flow rate control valves 51 to 54 and so as thereby to switch the damping effect of the suspension to high, and also so as, by closing the electrically controlled ON/OFF switching valves 63 to 66, to switch the spring constant of the suspension to high.

Next, the case will be described that the steering wheel is being returned back to the straight ahead or zero angular position, in other words the case that the vehicle is returning from the operational condition of travelling around a curve to the operational condition of travelling in a straight line.

Figure 6:
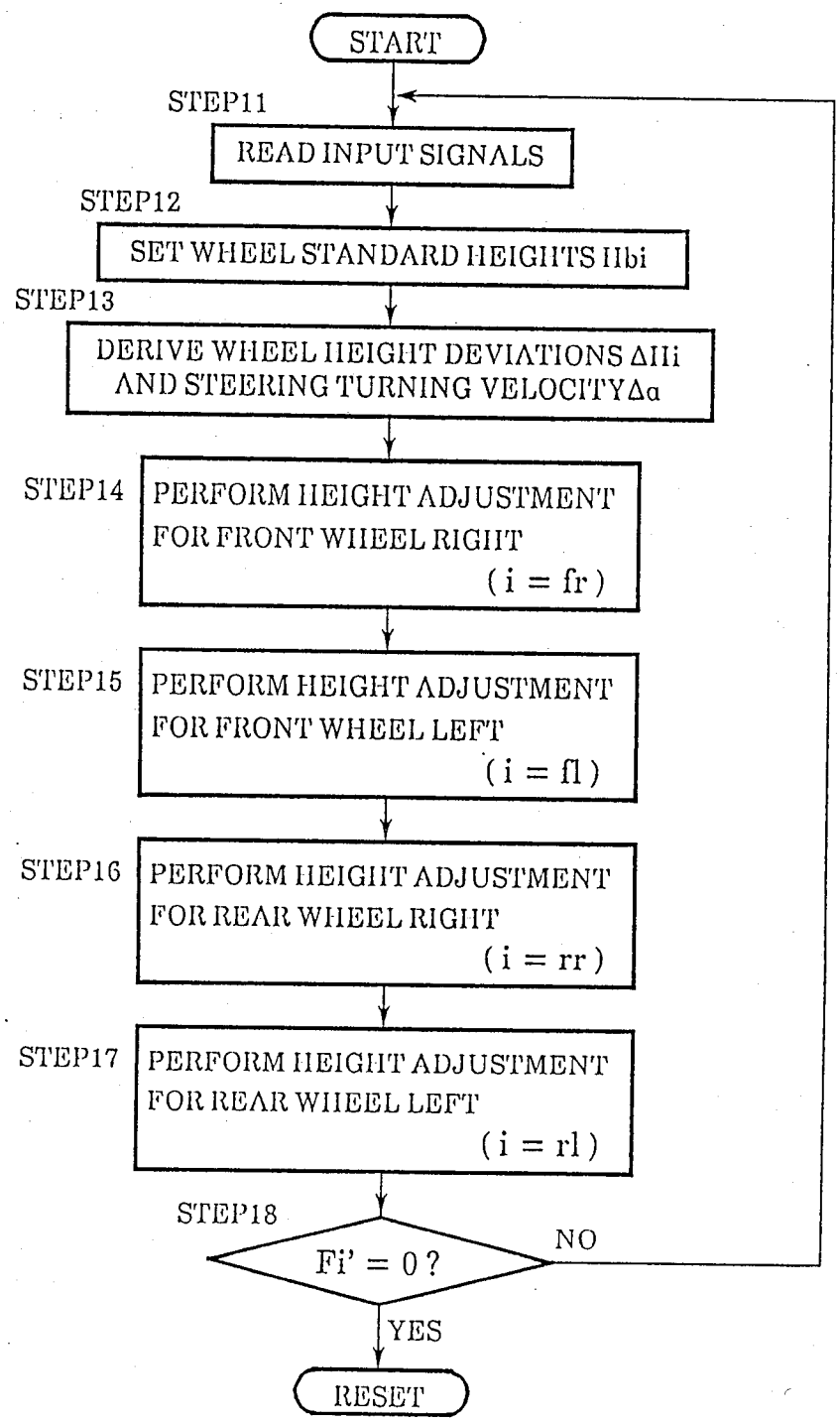
FIG. 6 is a flow chart, similar to the FIG. 3 flow chart for normal operational processing, showing the overall flow of a cyclical program which directs the operation of said micro computer utilized in this first preferred embodiment of the vehicle roll control system of the present invention during interrupt processing while the vehicle steering wheel is being returned towards its zero or straight ahead position.
Figure 7:
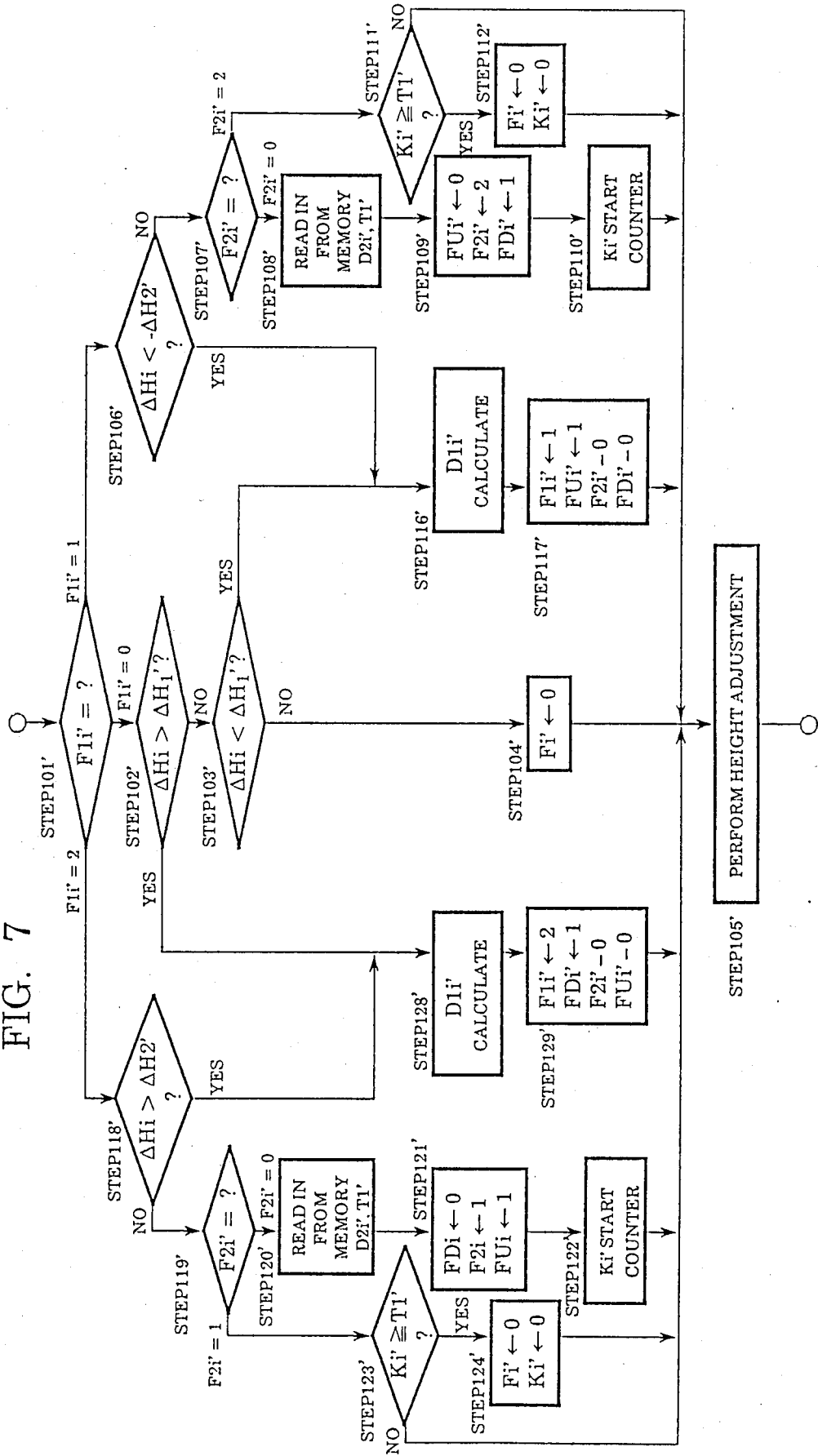
FIG. 7 is a flow chart, similar to the FIG. 4 flow chart for normal operational processing, showing a subroutine which is called from four blocks shown in FIG. 6, again during such interrupt processing of the first preferred embodiment while the vehicle steering wheel is being returned towards its zero or straight ahead position.

When such steering wheel return is detected, interrupt processing according to the flow charts shown in FIG. 6 and FIG. 7 is initiated and is carried out, whereby the occurrence of overshoot and of repeated vertical fluctuation of the wheel heights from the standard wheel heights are prevented during steering wheel return. It should be noted that steering wheel return may be detected by, for example as shown in FIG. 8, determining the occurrence of the conditions below, where steering to the right is considered as positive (with alpha greater than zero), the output of the steering angle sensor 96 is represented as "Sout", and C1 and C2 each is a positive constant:

for determining steering wheel return from steering to the right:

$$Sout \geq C_1 \text{ and } V(\alpha) \leq -C_2$$

for determining steering wheel return from steering to the left:

$$Sout \geq C_1 \text{ and } V(\alpha) \geq C_2$$

In the interrupt processing flow chart of FIG. 6, the steps which correspond to the steps shown in the flow chart of FIG. 3 are designated by step numbers which are increased by ten from the step numbers utilized for said corresponding the steps of FIG. 3, and in the interrupt processing flow chart of FIG. 7 the steps which correspond to the steps shown in the flow chart of FIG. 4 are designated by step numbers which are the same as the step numbers utilized for said corresponding the steps of FIG. 4 but with a dash appended.

The steps 11 through 13 in FIG. 6 are substantially the same as the steps 1 through 3 in FIG. 3, and therefore detailed description of them will be omitted herein. The steps 14 through 17 are also substantially the same as the steps 4 through 7 in FIG. 3; however, in the step 18 in this interrupt processing program, which is additionally executed after the step 17 and which does not correspond to any step in the FIG. 3 program for normal processing, a test is made as to whether or not the value of the flag Fi' is equal to zero: and if a decision is made that it is not the case that the value of Fi' is equal to zero, then the flow of control returns to the step 11; whereas, on the other hand, if a decision is made that it is the case that the value of the flag Fi' is equal to zero, then a return or RESET is made from the interrupt processing program of FIG. 6, and control returns to the step 1 of the normal processing program flow chart laid out in FIG. 3.

The interrupt processing subroutine whose flow chart is laid out in FIG. 7, which is executed in each of the steps 14 to 17 of the main interrupt processing program of FIG. 6, is substantially the same as the normal processing subroutine whose flow chart is laid out in FIG. 4, except in that: the flags F1i, F2i, FUi and FDi of FIG. 4 are replaced in FIG. 7 by, respectively, F1i', F2i', and FDi'; the wheel height control threshold value delta H0, delta H1 and delta H2 of FIG. 4 are replaced in FIG. 7 by delta H1' and delta H2'; the flow control valve duty ratios D0i, D1i and D2i of FIG. 4 are respectively replaced in FIG. 7 by D0i', D1i' and D2i'; the counter Ki and the energizing time Ti of FIG. 4 are respectively replaced in FIG. 7 by Ki' and T1'; in the steps 102' and 103' in FIG. 7, as opposed to the case in FIG. 4, tests are made respectively as to whether or not delta Hi is greater than or equal to delta H1' and delta Hi is less than or equal to -delta H1', and, in these steps, when negative decisions are made, in FIG. 7 the flow of control is transferred next to the step 104', whereas when an affirmative decision is made control passes without carrying out a roll condition decision to the steps 128' and 116' respectively. Accordingly, therefore, detailed description of this FIG. 7 interrupt subroutine will be omitted herein, in the interests of brevity of description.

Next with reference to the time chart shown in FIG. 9 and the flow charts of FIG. 3, FIG. 4, FIG. 6 and FIG. 7, an exemplary operational episode of the operation of the wheel height adjustment system according to this second preferred embodiment of the present invention will be described; this exemplary operational episode concerns the case of the vehicle performing a right turn. It should be noted that, in FIG. 9, the time chart portion (S) shows the time behavior of the steering angle alpha, while the time chart portions (R1), (R2) and (R3) show, respectively: the time behavior of the vehicle height deviation delta Hfr at a position corresponding to the front right wheel; the time behavior of the duty ratio of the actuating electrical signals supplied to the electrically controlled flow rate control valve 18 (on the supply side) and the electrically controlled flow rate control valve 32 (on the drainage side) of the actuator 2fr for said front right wheel, and the time behavior of the ON/OFF states of the actuating electrical signals supplied to the electrically controlled ON/OFF switching valve 16 (on the supply side) and the electrically controlled ON/OFF switching valve 34 (on the drainage side) of said actuator 2fr for said front right wheel; and the time chart portions (L1), (L2) and (L3) show, respectively: the time behavior of the vehicle height deviation delta Hfl at a position corresponding to the front left wheel; the time behavior of the duty ratio of the actuating electrical signals supplied to the electrically controlled flow rate control valve 19 (on the supply side) and the electrically controlled flow rate control valve 33 (on the drainage side) of the actuator 2fl for said front left wheel; and the time behavior of the ON/OFF states of the actuating electrical signals supplied to the electrically controlled ON/OFF switching valve 17 (on the supply side) and the electrically controlled ON/OFF switching valve 35 (on the drainage side) of said actuator 2fl for said front left wheel. In FIG. 9, the broken lines show the fluctuations in wheel height which would occur in the (hypothetical) case in which roll control by wheel height adjustment and roll control by control of the damping effect and spring constant were not carried out, and the dot dash lines show the fluctuations in wheel height which would occur in the (also hypothetical) case in which the reverse output control implemented by the wheel height adjustment device of the present invention was not carried out.

Figure 9:
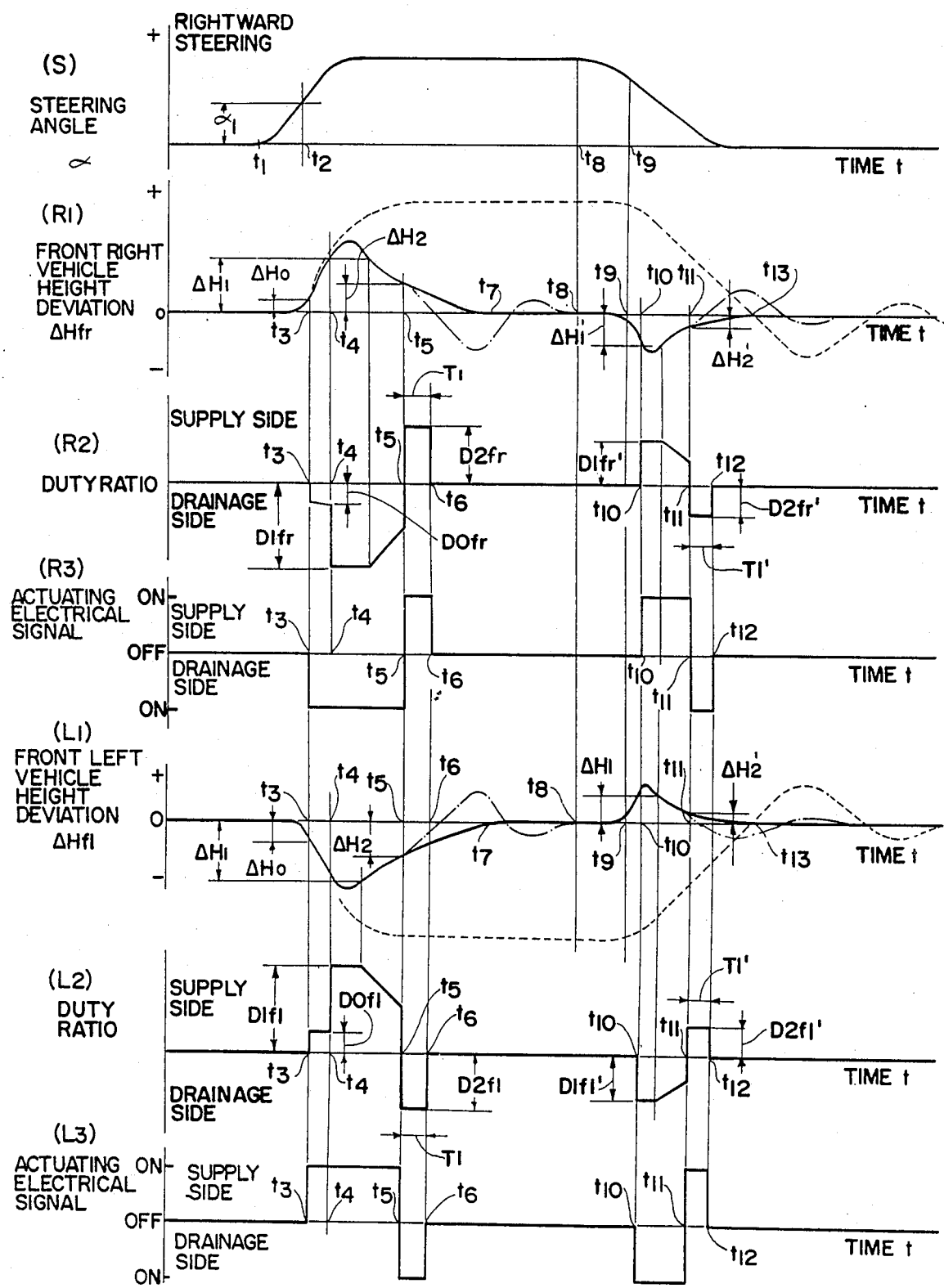
FIG. 9 is a time chart for illustrating the operation of this first preferred embodiment of the vehicle roll control system of the present invention.

Referring to this FIG. 9 time chart, at the time point t1 the vehicle driver starts to turn the steering wheel to the right, and at the time point t2 the steering angle reaches alpha 1, and thus at approximately the time point t2 the front right vehicle wheel height deviation delta Hfr will begin to increase and on the other hand the front left vehicle wheel height deviation delta Hfl will begin to decrease. At the same point t3, delta Hfr reaches delta H0, and thus, in the step 102 in the subroutine whose flow chart is laid out in FIG. 4, a decision is made that delta Hfr is greater than or equal to delta H0, and next, in the roll condition determining step 125, it is found to the case that V is greater than or equal to V0 and alpha is greater than or equal to alpha 1, but delta Hfr is not greater than or equal to delta H1, so a NO decision is made, and thus the flow of control is transferred next to the step 126. In the step 126, the duty ratio D0fr for the electrically controlled flow rate control valve 32 is computed, and in the step 127 the flag FDfr is set to one, and thereafter in the step 105, the electrically controlled flow rate control valve 32 is supplied with actuating electrical energy at a duty ratio of D0fr, and further the electrically controlled ON/OFF switching valve 34 is supplied with actuating electrical energy, whereby a certain amount of fluid is drained from the cylinder chamber 5 of the actuator 2fr, and therefore the wheel height for the front right wheel is controlled to be increased.

At the time point t4, delta Hfr reaches delta H1, and thus in the step 125 a positive decision is made, and therefore the flow of control is transferred next to the step 128. In the step 128, the duty ratio D1fr for the electrically controlled flow rate control valve 32 is computed, and in the step 129 the value of the flag F1fr is set to two and the value of the flag FDfr is set to one, and thereafter in the step 105 the duty ratio of the actuating electrical signal supplied to the electrically controlled flow rate control valve 32 is corrected to D1fr, and therefore a relatively large amount of fluid is drained from the cylinder chamber 5 of said actuator 2fr, so that the wheel height of the front right wheel is reduced.

At the time point t5, delta Hfr reaches delta H2, and in the step 118 in the subroutine whose flow chart is laid out in FIG. 4 a decision is made that delta Hfr is not greater than delta H2, and next in the step 119 a decision is made that the value of the flag F2fr is equal to zero, in the step 120 the duty ratio D2fr of the actuating electrical energy to be supplied to the electrically controlled flow rate control valve 18 and the energizing time period T1 are read in from the ROM of the micro computer, and the flow of control is transferred next to the step 121. In the step 121, the value of the flag FDfr is reset to zero, and the values of the flags F2fr and FUfr are set to one, and next in the step 122 the counting process of the counter Kfr is started, and thereafter in the step 105 the supply of actuating electrical energy to the electrically controlled flow rate control valve 32 and to the electrically controlled ON/OFF switching valve 34 is stopped, whereby the draining of fluid from the cylinder chamber 5 of the actuator 2fr is stopped and at the same time point the electrically controlled flow rate control valve 18 is supplied with actuating electrical energy at a duty ratio of D2fr, and actuating electrical energy is supplied to the electrically controlled ON/OFF switching valve 16, whereby reverse output control is carried out so as to supply fluid to the cylinder chamber 5 of the actuator 2fr. This supply of fluid continues until the time point t6, at which a decision that the timed count Kfr is now greater than or equal to T1 is made in the step 123, and, when thus in the step 123 a decision is made that Kfr is greater than or equal to T1, then in the step 124 the values of all of the flags Ffr and also the counted value of the counter Kfr are reset to zero, and by this means reverse output control is terminated. Thus for example, at the time point t7, delta Hfr reaches 0.

It should be noted that the rear right wheel is also controlled in the same way; therefore, detailed description of said control will be omitted herein.

As for the front left wheel, at the time point t3, delta Hfl reaches -delta H0, whereupon, in the step 103 in the subroutine whose flow chart is laid out in FIG. 4, a decision is made that delta Hfr is less than or equal to -delta H0, and next in the step 113, since V is greater than or equal to V0 and alpha is greater than or equal to alpha 1, but delta Hfl is not less than or equal to -delta H1, a negative decision is made, so that the flow of control is transferred next to the step 114. In the step 114, the duty ratio DOfl for the actuating electrical energy to be supplied to the electrically controlled flow rate control valve 19 is computed, in the step 115 the value of the flag FUfl is set to one, and thereafter in the step 105 actuating electrical energy is supplied to the electrically controlled flow rate control valve 19 at a duty ratio of DOfl, and actuating electrical energy is supplied to the electrically controlled ON/OFF switching valve 17, whereby a certain amount of fluid is supplied to the cylinder chamber 5 of the actuator 2fl for the front left wheel, whereby the wheel height of this front left wheel is controlled to be reduced.

At the time point t4, delta Hfl reaches -delta H1, so that in the step 113 a positive decision is made and therefore the flow of control is transferred next to the step 116. In the step 116 the duty ratio D1fl of the electrically controlled flow rate control valve 19 is computed, in the step 117 the value of the flag F1fl and the value of the flag FUfl are set to one, and thereafter in the step 105 the duty ratio for the actuating electrical energy supplied to the electrically controlled flow rate control valve 19 is corrected to D1fl, and thereby a relatively large amount of fluid is supplied to the cylinder chamber 5 of the actuator 2fl for the front left wheel, and thereby the wheel height of this front left wheel is increased.

At the time point t5, delta Hfl reaches -delta H2, whereupon in the step 106 in the subroutine whose flow chart is laid out in FIG. 4 a decision is made that delta Hfl is not less than -delta H2, and, in the next step 107, a decision is made that the value of the flag F2fl is equal to zero, in the step 108 the duty ratio D2fl of the actuating electrical energy supplied to the electrically controlled flow rate control valve 33 and the energizing time period T1 are read in from the ROM of the micro computer 103, and the flow of control is transferred next to the step 109. In the step 109, the value of the flag FUfl is reset to zero, and the values of the flags F2fl and FDfl are set respectively to two and to one, and in the next step 110 the count of the counter Kfl is started, after which, in the step 105, the supply of actuating electrical energy to the electrically controlled flow rate control valve 19 and to the electrically controlled ON/OFF switching valve 17 is terminated, whereby the supply of fluid to the cylinder chamber 5 of the actuator 2fl for the suspension of the front left wheel is stopped and at the same time actuating electrical energy is supplied to the electrically controlled flow rate control valve 33 at a duty ratio of D2fl, and actuating electrical energy is supplied to the electrically controlled ON/OFF switching valve 35, whereby the reverse output control to drain the fluid from the cylinder chamber 5 of the actuator 2fl is carried out. This draining of fluid continues until the time point t6, at which a decision that Kfl is greater than or equal to T1 is made in the step 111, and when in the step 111 a decision is made that Kfl is greater than or equal to T1, in the step 112 the values of all of the flags Ffl as well as the count value of the counter Kfl are reset to zero, and by this means the reverse output control is terminated. Thus, for example, at the time point t7, delta Hfl becomes zero.

It should be noted that the control for the rear left wheel is done in the same way.

Next, an explanation will be presented for the case of returning from a right turn to straight line motion, i.e. when the right turn is unwound by the vehicle driver turning the steering wheel back to the straight ahead position thereof.

In FIG. 9, at the time point t8, the turning in the return direction of the steering wheel begins, and at the time point t9 this turning of the steering wheel in the return direction is detected, whereupon the routines whose flow charts are shown in FIG. 6 and FIG. 7 are begun as interrupt processing routines. At approximately the time point t9, the wheel height Hfr of the vehicle body over the front right vehicle wheel begins to decrease and on the other hand the wheel height Hfl of the vehicle body over the front left vehicle wheel begins to increase. At the time point t10, delta Hfr reaches -delta H1', whereupon, the step 103' in the interrupt routine whose flow chart is laid out in FIG. 7, a decision is made that delta Hfr is less than or equal to -delta H1', and next in the step 116' the duty ratio D1fr' for the actuating electrical energy to be supplied to the electrically controlled flow rate control valve 18 is computed, in the step 117' the value of the flag F1fr and the value of the flag FUfr are set to one, thereafter in the step 105' actuating electrical energy is supplied to the electrically controlled flow rate control valve 18 at a duty ratio of D1fr', and actuating electrical energy is supplied to the electrically controlled ON/OFF switching valve 16, whereby a certain amount of fluid is supplied to the cylinder chamber 5 of the actuator 2fr for the front right vehicle wheel, and thus the wheel height of the front right wheel is increased.

At the time point t11, delta Hfr reaches -delta H2', whereupon in the step 106' a decision is made that delta Hfr is not less than -delta H2', and in the next step 107' a decision is made that the value of the flag F2fr is equal to zero, in the step 108' the duty ratio D2fr' of the actuating electrical energy supplied to the electrically controlled flow rate control valve 32 and the time interval for energization T1' are read in from the ROM of the micro computer 103, and the flow of control is transferred next to the step 109'. In the step 109', the value of the flag FUfr is reset to zero, and the values of the flags F2fr and FDfr are set to one, and next in the step 110' the count of the counter Kfr is started, after which, in the step 105', the supply of actuating electrical energy to the electrically controlled flow rate control valve 18 and to the electrically controlled ON/OFF switching valve 16 is terminated, thus closing these valves, and the flow control valve electrically controlled flow rate control valve 32 is supplied with actuating electrical energy at a duty ratio of D2fr', and actuating electrical energy is supplied to the electrically controlled ON/OFF switching valve 34, whereby reverse output control is carried out to drain fluid from the cylinder chamber 5 of the actuator 2fr for the right front vehicle wheel. This draining of fluid continues until the time point t12, at which a decision that Kfr is greater than or equal to T1' is made in the step 111', and when in the step 111' a decision is made that Kfr is greater than or equal to T1', then in the step 112' the values of all of the flags Ffr' and the count value of the counter Kfr are reset to zero, and by this means reverse output control is terminated. Thus, for example at the time point t18, delta Hfr becomes 0.

It should be noted that control for the rear right wheel is done in the same manner.

As for the front left wheel, at the time point t10, delta Hfl reaches delta H1', and, in the step 102' in the interrupt routine whose flow chart is laid out in FIG. 7, a decision is made that delta Hfl is greater than or equal to H1', and next, in the next step 128', the duty ratio D1$f'$ for the actuating electrical energy to be supplied to the electrically controlled flow rate control valve 33 is computed, and then in the step 129' the value of the flag F1$fl$ and the value of the flag FDfl are set respectively to two and to one, and thereafter in the step 105' actuating electrical energy is supplied to the electrically controlled flow rate control valve 33 at a duty ratio of D1$f'$, and actuating electrical energy is supplied to the electrically controlled ON/OFF switching valve 35, whereby a certain amount of fluid is drained from the cylinder chamber 5 of the actuator 2$fl$ for the front left vehicle wheel, and by this means the wheel height of said front left vehicle wheel is reduced.

At the time point t11, delta Hfl reaches delta H2', so that in the step 118' a decision is made that delta Hfl is not greater than delta H2', next in the step 119' a decision is made that the value of the flag F2$fl$ is equal to zero, in the step 120' the duty ratio D2$fl'$ of the actuating electrical energy supplied to the electrically controlled flow rate control valve 19 and the energizing time interval T1' are read in from the ROM, and the flow of control continues to the step 121'. In the step 121' the value of the flag FDfl is reset to zero, and the values of the flags F2$fl$ and FUfl are set to one, and next in the step 122' the count of the counter Kfl is started, after which, in the step 105', the supply of actuating electrical energy to the electrically controlled flow rate control valve 33 and to the electrically controlled ON/OFF switching valve 35 is terminated, thus closing these valves, and the electrically controlled flow rate control valve 19 is supplied with actuating electrical energy at a duty ratio of D2$fl'$, and actuating electrical energy is supplied to the electrically controlled ON/OFF switching valve 17, whereby reverse output control is carried out to supply fluid to the cylinder chamber 5 of the actuator 2$fl$ for the front left vehicle wheel. This supply of fluid continues until the time point t12, at which a decision that Kfl is greater than or equal to T1' is made in the step 123'; and, when thus in the step 123' a decision is made that Kfl is greater than or equal to T1', then, in the step 124', the values of all of the flags Ffl' and the counted value of the counter Kfl are reset to zero, and by this means reverse output control is terminated. Thus, for example at the time point t18, delta Hfl reaches 0.

It should be noted that the control for the rear left wheel is done in the same way. Additionally in the case of a left turn, similar control is carried out to that in the case of the above described right turn.

Thus in the first preferred embodiment, as described above and as shown in the relevant drawings, when the vehicle is substantially travelling in a straight line, then: in the case that the deviation delta Hi from the standard wheel height of the wheel height in the position corresponding to each of the vehicle wheels is less than plus or minus delta H0, wheel height adjustment is not carried out, and therefore the expenditure of the electrical energy required for opening and closing the electrically controlled flow rate control valves and the electrically controlled ON/OFF switching valves can be saved, and the danger of producing the so called hunting phenomenon through carrying out repeated increase and decrease adjustments in wheel height within a relatively fine range can be reduced, in this case that the vehicle is travelling substantially in a straight line; and, in the case that the wheel height deviation delta Hi in a position corresponding to each of the wheels is at least plus or minus delta H0 and is less than plus or minus delta H1', then the wheel height Hi of each wheel is adjusted to a target wheel height range (Hbi plus or minus delta H0). On the other hand, in the case that the vehicle is travelling around a curve such as when turning, as well as effectively preventing vehicle roll at the beginning and end of the travelling around a curve, repeated vertical fluctuations in wheel height for each wheel from the standard wheel height caused by overshoot are effectively prevented, whereby the steering stability of the vehicle is improved.

Figure 10:
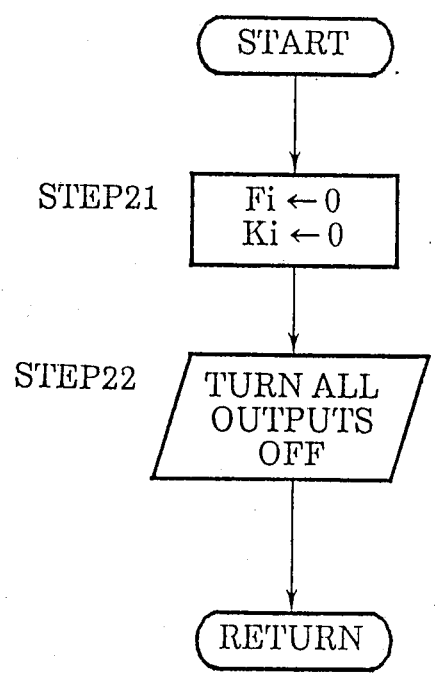
FIG. 10 is a flow chart, similar to the FIG. 6 flow chart for interrupt type operational processing, showing the overall flow of a cyclical program which directs the operation of said micro computer utilized in a variation of this first preferred embodiment of the vehicle roll control system of the present invention during interrupt processing, while the vehicle steering wheel is being returned towards its zero or straight ahead position, in the case that said unwinding of the steering wheel can be taken as being performed less quickly than in the case of FIG. 6.

It should be noted that generally, when the vehicle changes from moving around a curve to moving along a straight line, i.e. in the case where the driver unwinds the steering wheel, the steering movement speed is low compared with the case of moving from straight line movement to movement around a curve, i.e. in the case where the driver winds up the steering wheel, as a result of which when the turning in the return direction of the steering wheel is detected the interrupt processing which is executed may be according to the flow chart laid out in FIG. 10. In this interrupt processing subroutine whose flow chart is laid out in FIG. 10, when the turning in the return direction of the steering wheel is detected, first, in the initial step 21, in the normal processing subroutine whose flow chart is laid out in FIG. 4, the values of the flags Fi and also the count values of the counters Ki are reset to zero, and thereafter in the step 22 all output of actuating electrical energy to the electrically controlled flow rate control valves and the electrically controlled ON/OFF switching valves is stopped, and by this means roll control by wheel height adjustment is stopped, and thereafter control returns to the step 1 of the program whose flow chart is laid out in FIG. 3. In this case, the values of the flag Fi are reset to zero, but it is preferable that for a certain time interval the damping effect and spring constant should be maintained as high.

The first preferred embodiment of the vehicle roll control system of the present invention has been described in detail above in a very specific fashion, but the present invention is not limited to this particular implementation, and it will be clear to those skilled in the relevant art that various other variant embodiments are possible within the scope of the present invention. For example, the area of at least delta H1 in the graph of FIG. 5 may be set as shown by the broken line, and delta H1 may be set to any position between delta H0 and delta H1 shown in the drawing. Again, in the roll condition decision in the steps 113 and 125 of the subroutine whose flow chart is laid out in FIG. 4, the condition that the absolute value of delta Hi is greater than or equal to delta H1 may be omitted. Furthermore, in the above described first preferred embodiment while the vehicle is turning the damping effect and the spring constant of the suspension are both set to be high, but the construction may also be such that the damping effect and spring constant are set to be high on the outer turning wheels, and the damping effect and spring constant are set respectively to base mode and to low for the inner turning wheels. Also, although, in the first preferred embodiment described above, a time differential value of steering angle, i.e., a steering speed, is calculated from the steering angle sensed by the steering sensor 96, it should be noted that the steering sensor 96 could in another preferred embodiment be replaced with a steering angular velocity sensor which detected a steering angular velocity omega.

THE SECOND PREFERRED EMBODIMENT

Figure 11:
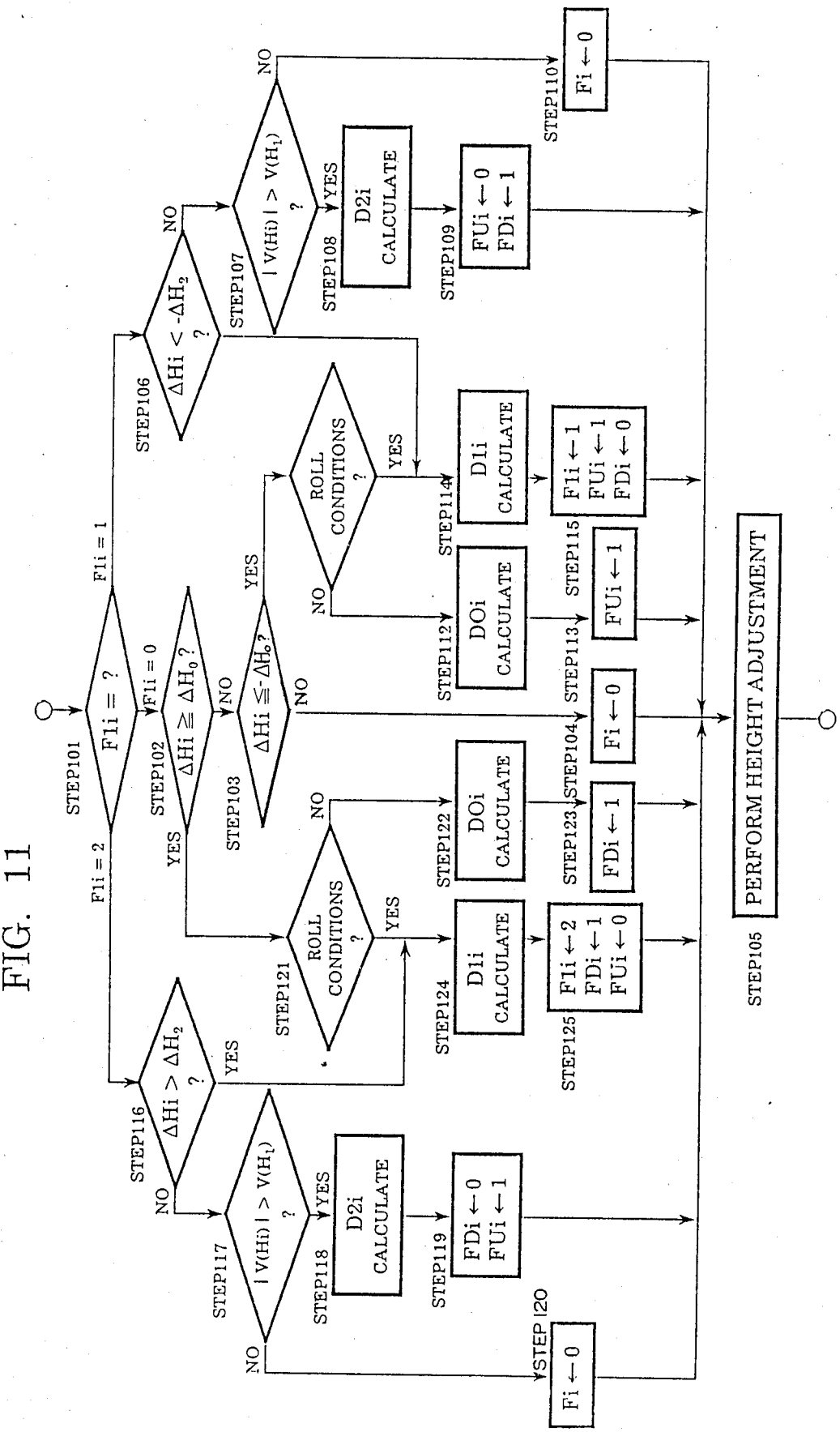
FIG. 11 is a detailed flow chart of a subroutine which is called in the case of the second preferred embodiment from four blocks as shown in the flow chart of FIG. 3, again during normal operational processing.

The schematic structural view of FIG. 1 and the block diagrammatical view of FIG. 2 are also suitable for showing the gross construction of the suspension system and of the electrical control device incorporating a micro computer which include the second preferred embodiment of the system for vehicle roll control of the present invention, and further the flow chart of FIG. 3 showing the overall program flow can be applied to this second preferred embodiment as well as to the first, with slight modifications which will be explained shortly. Now, the operation of the micro computer 103 incorporated in this second preferred embodiment of the system for vehicle roll control of the present invention will be explained. As before, it will easily be understood that the FIG. 3 program flow is a repetitive cycle which will typically take place over a certain characteristic approximate cycle time. Further, the flow chart laid out in FIG. 11 shows in detail, for this second preferred embodiment, the routine which in the flow chart laid out in FIG. 3 is called from each one of the steps 4 through 7 with a different parameter "i" equal to "fr", "fl", "rr", and "rl" for the various vehicle wheels.

In the step 1 of the main program whose flow chart is laid out in FIG. 3, then, signals indicating the wheel heights Hi (where "i" is "fr" for the front right wheel, "fl" for the front left wheel, "rr for the rear right wheel, and "rl" for the rear left wheel) as detected and outputted by the wheel height sensors 87 to 90, signals indicating the vehicle speed V, the steering angle alpha, the throttle opening theta, and the vehicle braking state detected and outputted by, respectively, the vehicle speed sensor 95, the steering angle sensor 96, the throttle opening sensor 97, and the braking sensor 98, a signal for the switch function S outputted from the vehicle height selection switch 110, and a signal for the switch function input from the damping effect selection switch not shown in the drawings are read in to the micro computer 103, and thereafter control is transferred to the step 2.

In the step 2, when the switch function S of the vehicle height selection switch 110 is "H" for indicating that the vehicle height is to be set to high, the front wheel standard wheel heights Hbfr and Hbfl are set to Hhf and the rear wheel standard wheel heights Hbrr and Hbrl are set to Hhr; when the swtich function S of the vehicle height selection switch 110 is "N" for indicating that the vehicle height is to be set to normal, the front wheel standard wheel heights Hbfr and Hbfl are set to Hnf and the rear wheel standard wheel heights Hbrr and Hbrl are set to Hnr; and, when the switch function S of the vehicle height selection switch 110 is "L" for indicating that the vehicle height is to be set to low, the front wheel standard wheel heights Hbfr and Hbfl are set to Hlf and the rear wheel standard wheel heights Hbrr and Hbrl are set to Hlr. In any of these cases, control is next transferred to the step 3.

In the step 3, the deviations delta Hi between the actual wheel heights Hi (where "i" is "fr" for the front right wheel, "fl" for the front left wheel, "rr for the rear right wheel, and "rl" for the rear left wheel) and the base wheel heights Hbi for each wheel, the rate of change V(Hi) of each of said wheel heights Hi (and of course of the corresponding deviation delta Hi also), and also the steering velocity V(alpha), i.e. a quantity representative of the rate of turning of the steering wheel of the vehicle or of the rate of alteration of steering angle, are computed according to the following expressions:

delta $Hi = Hi - Hbi$ $V(Hi) = Hi(n) - Hi(n-1)$ $V(alpha) = alpha(n) - alpha(n-1)$ Herein, $Hi(n-1)$ is the detected wheel height a certain short time interval before the detection of $Hi(n)$, such as for example one iteration of the FIG. 3 routine before this iteration thereof, i.e. one cycle earlier; and $alpha(n-1)$ is the steering angle detected said certain short time interval before the detection of $alpha(n)$. After this derivation of the wheel height deviations delta Hi, their rates of change V(Hi), and the steering velocity V(alpha), control is transferred next to the step 4.

In the step 4, by executing the subroutine whose control flow is shown in FIG. 11 and will be dcescribed later, with "i" equal to "fr", the wheel height adjustment for the front right wheel is carried out, and thereafter control is transferred next to the step 5.

In the step 5, by again executing said subroutine whose control flow is shown in FIG. 11 and will be described later, with "i" equal to "fl", the wheel height adjustment for the front left wheel is carried out, and thereafter control is transferred next to the step 6.

In the step 6, by again executing said subroutine whose control flow is shown in FIG. 11 and will be described later, with "i" equal to "rr", the wheel height adjustment for the rear right wheel is carried out, and thereafter control is transferred next to the step 7.

In the step 7, by yet again executing said subroutine whose control flow is shown in FIG. 11 and will be described later, with "i" equal to "rl", the wheel height adjustment for the rear left wheel is carried out. After the step 7 has been executed, control returns to the step 1, and until the ignition switch is switched off, or until an interrupt occurs as will be explained later, the steps 1 to 7 are repeated, i.e. the program flow cycles round and round in a closed loop, repeatedly performing the steps detailed above.

Next, the subroutine whose flow chart is laid out in FIG. 11 and which is executed in each of the steps 4 to 7 of the main program whose flow chart is laid out in FIG. 11 will be described; this subroutine takes "i" as a parameter, where "i" is "fr" for the front right wheel, "fl" for the front left wheel, "rr for the rear right wheel, and "rl" for the rear left wheel. It should be noted that in FIG. 11 the flags F1$i$ (where "i" is "fr" for the front right wheel, "fl" for the front left wheel, "rr for the rear right wheel, and "rl" for the rear left wheel) indicate whether or not wheel height adjustment control for roll control, for each said wheel, is being carried out: a flag value of zero indicates an operational state where wheel height increase or decrease adjustment is not being carried out, a flag value of one indicates an operational state where wheel height increase adjustment (up control for raising the vehicle body over that vehicle wheel) is being carried out, and a flag value of two indicates an operational state where wheel height decrease adjustment (down control for lowering the vehicle body down towards that vehicle wheel) is being carried out. The flags FUi relate to whether or not actuating electrical energy is currently being supplied to the flow control valves 18, 19, 28 and 29 and to the open/shut valves 16, 17, 26 and 27 which control the supply of fluid to the actuator assemblies: a flag value of zero indicates that actuating electrical energy is not being thus supplied and thus that the vehicle body is not being raised over the corresponding vehicle wheel, and a flag value of one indicates that actuating electrical energy is being thus supplied and thus that the vehicle body is being raised over the corresponding vehicle wheel. The flags FDi relate to whether or not actuating electrical energy is being supplied to the flow control valves 32, 33, 39 and 40 and the open/shut valves 34, 35, 41 and 42 which control the draining of fluid from the actuator assemblies: a flag value of zero indicates that actuating electrical energy is not being thus supplied and thus that the vehicle body is not being lowered down towards the corresponding vehicle wheel, and a flag value of one indicates that actuating electrical energy is being thus supplied and thus that the vehicle body is being lowered down towards the corresponding vehicle wheel. Furthermore the expression "flags Fi" will be used as a generic term for the flags F1$i$, FUi and FDi.

First, in the first step 101, a test is made as to which of its allowable values zero, one, or two the flag F1$i$ currently assumes, and: if a decision is made that F1$i$ is equal to zero, the flow of control is transferred next to the step 102; if a decision is made that F1$i$ is equal to one, the flow of control is transferred next to the step 106; and, if a decision is made that F1$i$ is equal to two, the flow of control is transferred next to the step 116.

In the step 102, a test is made as to whether or not the wheel height deviation delta Hi is greater than a control threshold value delta H0: if a decision is made that it is not true that delta Hi is greater than or equal to delta H0, then the flow of control is transferred next to the step 103; while if a decision is made that delta Hi is greater than or equal to delta H0 control is transferred next to the step 121.

In the step 103, a test is made as to whether or not the wheel height deviation delta Hi is less than or equal to -delta H0: if a decision is made that it is not true that delta Hi is less than or equal to -delta H0, then the flow of control is transferred next to the step 104; while, if a decision is made that delta Hi is less than or equal to -delta H0, then the flow of control is transferred next to the step 111.

In the step 104, all of the flags Fi are reset to zero, and then the flow of control is transferred next to the step 105.

In the step 105, the wheel height adjustment is carried out. Since when the flow of control passed from the step 104 to the step 105 it was the case that Fi was equal to zero, wheel height increase or decrease adjustment is not at this point in the program flow carried out.

In the step 106, with delta H2 as a threshold value for reverse output control, a test is made as to whether or not the wheel height deviation delta Hi is less than -delta H2. If a decision is made that it is not true that delta Hi is less than -delta H2, then the flow of control is transferred next to the step 107; while, on the other hand, if a decision is made that delta Hi is less than -delta H2, then the flow of control is transferred next to the step 114.

In the step 107, with V(H1) as a control threshold value for the wheel height rate of change, a test is made as to whether or not the absolute value of the wheel height rate of change V(Hi) exceeds V(H1). If a decision is made that indeed the absolute value of the wheel height rate of change V(Hi) does exceed V(H1), then the flow of control proceeds to the step 108; while, on the other hand, if a decision is made that in fact the absolute value of the wheel height rate of change V(Hi) does not exceed V(H1), then the flow of control proceeds to the step 110.

Figure 12:
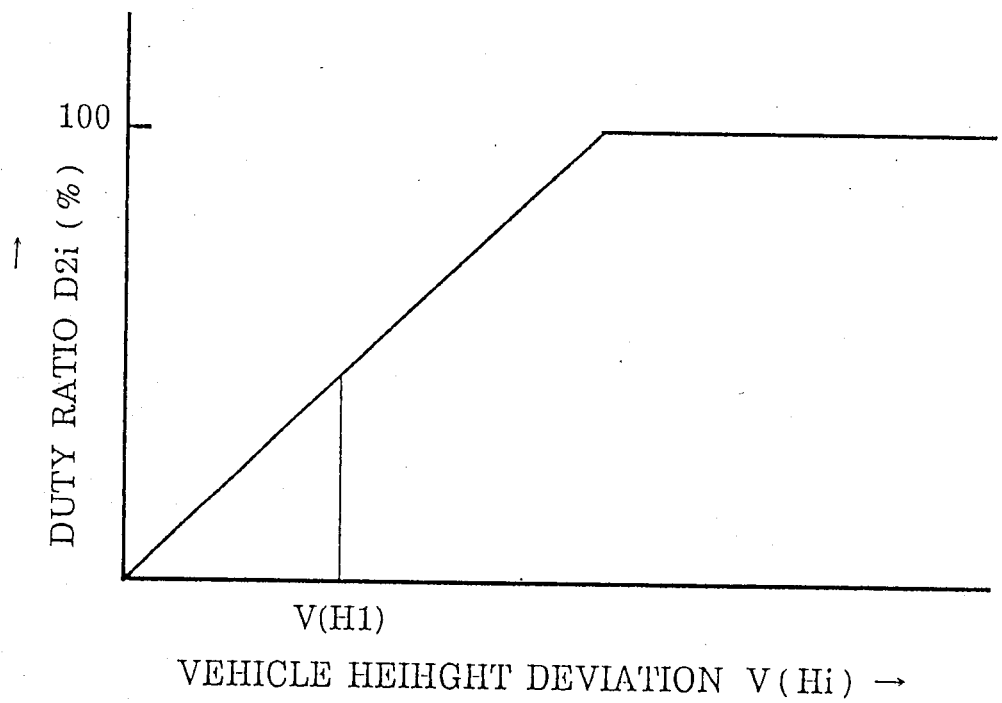
FIG. 12 is a graph applying to the second preferred embodiment, illustrating another map stored in the memory of said micro computer, and showing duty ratio for a flow control valve on the vertical axis and the rate of change of wheel height deviation on the horizontal axis.

In the step 108, reading in from a look table like the FIG. 12 graph stored in the ROM 105 of the micro computer 103, the duty ratio D2$i$ for each flow control valve (for draining the appropriate one of the actuators 2$fr$, 2$fl$, 2rr, or 2$rl$) during reverse output control for the flow control valves (and the ON/OFF control valves), as a value this time corresponding to the rate of change V(Hi) of the wheel height, is carried out, and thereafter the flow of control is transferred next to the step 109.

In the step 109, the value of the flag FUi is reset to zero and the value of the flag FDi is set to one, and thereafter control is transferred next to the step 105. In this case, in the step 105, actuating electrical energy is supplied to the drain side electrically controlled flow rate control valve for draining the appropriate one of the actuators 2$fr$, 2$fl$, 2rr, or 2$rl$, at a duty ratio of D2$i$, and at the same time actuating electrical energy is supplied to the corresponding drain side electrically controlled ON/OFF switching valve, whereby the height of the vehicle body over the corresponding vehicle wheel is decreased, i.e. reverse output control is carried out in order to prevent an excessive increase (overshooting) in the wheel height for the corresponding vehicle wheel.

In the step 110, on the other hand, the values of all of the flags Fi are reset to zero, and thereafter control is transferred next to the step 105. In this case, in the step 105, reverse output is stopped.

In another program branch, in the step 111, a test is made as to whether or not the vehicle is in a condition to produce vehicle rolling, specifically whether or not the conditions below hold, with V0, alpha 1 and delta Hi as control threshold values for the vehicle speed, steering angle and wheel height:

$$\left. \begin{array}{l} V \geq V_0, \\ |\alpha| \geq \alpha_1 \text{ and} \\ |\Delta \text{Hi}| \geq \Delta H_1 \end{array} \right\} \quad \text{(condition 2)}$$

If a decision is made that the vehicle is not in such a roll condition, the flow of control is transferred next to the step 112, while, on the other hand, if a decision is made that the vehicle is in such a roll condition, the flow of control is transferred next to the step 114.

In the step 112, from a lookup table in the ROM 105 this time corresponding to the graph shown in FIG. 5, the duty ratio DOi for the electrically controlled flow rate control valve on the supply side (for supplying pressurized fluid into the appropriate one of the actuators 2fr, 2fl, 2rr, or 2rl) corresponding to the wheel height deviation delta Hi (not, this time, its rate of change) is computed, and thereafter the flow of control is transferred next to the step 113.

In the step 113, the value of the flag FUi is set to one, and thereafter the flow of control is transferred next to the step 105. In this case, in the step 105, in order that the wheel height Hi should be increased so that delta Hi exceeds -delta H0, actuating electrical energy is supplied to the supply side electrically controlled flow rate control valve for supplying pressurized fluid into the appropriate one of the actuators 2fr, 2fl, 2rr, or 2rl at a duty ratio DOi, and at the same time actuating electrical energy is supplied to the corresponding electrically controlled ON/OFF switching valve, whereby the height of the vehicle body over the corresponding vehicle wheel is increased, i.e. up control of the wheel height is carried out.

In the step 114, reading in from the lookup table in the ROM 105 corresponding to the graph shown in FIG. 5, the duty ratio D1i (greater than DOi) for each electrically controlled flow rate control valve (for supplying pressurized fluid to the appropriate one of the actuators 2fr, 2fl, 2rr, or 2rl) during vehicle raising control corresponding to the wheel height deviation delta Hi is determined, and thereafter the flow of control is transferred next to the step 115.

In the step 115, the flags F1i and FUi are set to one, and thereafter the flow of control is transferred next to the step 105. In this case, in the step 105, in order to prevent vehicle roll, actuating electrical energy is supplied to the supply side electrically controlled flow rate control valve for supplying pressurized fluid into the appropriate one of the actuators 2fr, 2fl, 2rr, or 2rl at a duty ratio D1i, and at the same time actuating electrical energy is supplied to the corresponding electrically controlled ON/OFF switching valve, whereby the height of the vehicle body over the corresponding vehicle wheel is increased, i.e. up control of the wheel height is carried out.

In the third main branch of this FIG. 11 subroutine, in the step 116, a test is made as to whether or not the wheel height deviation delta Hi exceeds delta H2, thus using delta H2 as the threshold value for reverse output control. If a decision is made that delta Hi is not greater than delta H2, then the flow of control is transferred next to the step 117; while, on the other hand, if a decision is made that delta Hi exceeds delta H2, then the flow of control is transferred next to the step 124.

In the step 117, again with V(H1) as a control threshold value for the wheel height rate of change, as in the step 107 a test is made as to whether or not the absolute value of the wheel height rate of change V(Hi) exceeds V(H1). If a decision is made that indeed the absolute value of the wheel height rate of change V(Hi) does exceed V(H1), then the flow of control proceeds to the step 118; while, on the other hand, if a decision is made that in fact the absolute value of the wheel height rate of change V(Hi) does not exceed V(H1), then the flow of control proceeds to the step 120.

In the step 118, reading in from a map like the FIG. 5 graph stored in the ROM 105 of the duty ratio D2i for each electrically controlled flow rate control valve (for supplying pressurized fluid to the appropriate one of the actuators 2fr, 2fl, 2rr, or 2rl) during reverse output control is carried out, and thereafter the flow of control is transferred next to the step 119.

In the step 119, the value of the flag FDi is reset to zero and the value of the flag FUi is set to one, and thereafter the flow of control is transferred next to the step 105. In this case, in the step 105, actuating electrical energy is supplied to the supply side electrically controlled flow rate control valve for draining the appropriate one of the actuators 2fr, 2fl, 2rr, or 2rl, at a duty ratio of D2i, and at the same time actuating electrical energy is supplied to the corresponding supply side electrically controlled ON/OFF switching valve, whereby the height of the vehicle body over the corresponding vehicle wheel is decreased, i.e. reverse output control is carried out in order to prevent an excessive increase (overshooting) in the wheel height for the corresponding vehicle wheel.

In the step 120, the values of all of the flags Fi are reset to zero, and thereafter the flow of control is transferred next to the step 105. In this case, in the step 105, reverse output control is stopped.

In the step 121, a test is made as to whether or not the vehicle is in a condition which is liable to produce vehicle rolling, in other words whether or not the condition 2 laid out above currently holds. If a decision is made that the vehicle is not currently in a roll condition, the flow of control is transferred next to the step 122; while, on the other hand, when a decision is made that the vehicle is in a roll condition, then the flow of control is transferred next to the step 124.

In the step 122, from a lookup table in the ROM 105 corresponding to the graph shown in FIG. 5, the duty ratio DOi for the electrically controlled flow rate control valve on the drain side (for draining fluid from the appropriate one of the actuators 2fr, 2fl, 2rr, or 2rl) corresponding to the wheel height deviation delta Hi is computed, and thereafter the flow of control is transferred next to the step 123.

In the step 123, the value of the flag FDi is set to one, and thereafter the flow of control is transferred next to the step 105. In this case, in the step 105, in order that the wheel height Hi should be reduced so that delta Hi is less than delta H0, actuating electrical energy is supplied to the drain side electrically controlled flow rate control valve for draining fluid from the appropriate one of the actuators 2fr, 2fl, 2rr, 2rl at a duty ratio DOi, and at the same time actuating electrical energy is supplied to the corresponding electrically controlled ON/OFF switching valve, whereby the height of the vehicle body over the corresponding vehicle wheel is decreased, i.e. down control of the wheel height is carried out.

In the step 124, reading in from the lookup table in the ROM 105 corresponding to the graph shown in FIG. 12, the duty ratio D1i for each electrically controlled flow rate control valve (for draining fluid from the appropriate one of the actuators 2fr, 2fl, 2rr, or 2rl) during vehicle lowering control corresponding to the wheel height deviation delta Hi is determined, and thereafter the flow of control is transferred next to the step 129.

In the step 125, the values of the flags F1i and FDi are set respectively to two and to one, and the value of the flag FUi is reset to zero, and thereafter the flow of control is transferred next to the step 105. In this case, in the step 105, in order to prevent vehicle roll, actuating electrical energy is supplied to the drain side electrically controlled flow rate control valve for draining fluid from the appropriate one of the actuators 2fr, 2fl, 2rr, or 2rl at a duty ratio D1i, and at the same time actuating electrical energy is supplied to the corresponding electrically controlled ON/OFF switching valve, whereby the height of the vehicle body over the corresponding vehicle wheel is decreased, i.e. down control of the wheel height is carried out.

Although the details of these matters are not particularly shown in the flow charts of FIGS. 3 and 11, when the value of the flag FUi or the value of the flag FDi is equal to one, appropriate supply of actuating electrical energy is performed to the motors 79 to 82 so as to increase the restriction amounts provided by the flow rate control valves 51 to 54, and appropriate supply of actuating electrical energy is performed to the motors 83 to 86 in order to close the electrically controlled ON/OFF switching valves 63 to 66, whereby the damping effect and the spring constant of the suspension units are switched to high (H). Also, in this second preferred embodiment of the present invention, when conditions such as are liable to produce vehicle nose dive and/or vehicle squat are detected, in order to restrict such undesirable vehicular attitudinizing, a control routine is executed by way of an interrupt, so as to increase the restriction amount provided by said electrically controlled flow rate control valves 51 to 54 and so as thereby to switch the damping effect of the suspension to high, and also so as, by closing the electrically controlled ON/OFF switching valves 63 to 66, to switch the spring constant of the suspension to high.

Next, the case will be described that the steering wheel is being returned back to the straight ahead or zero angular position, in other words the case that the vehicle is returning from the operational condition of travelling around a curve to the operational condition of travelling in a straight line.

Figure 13:
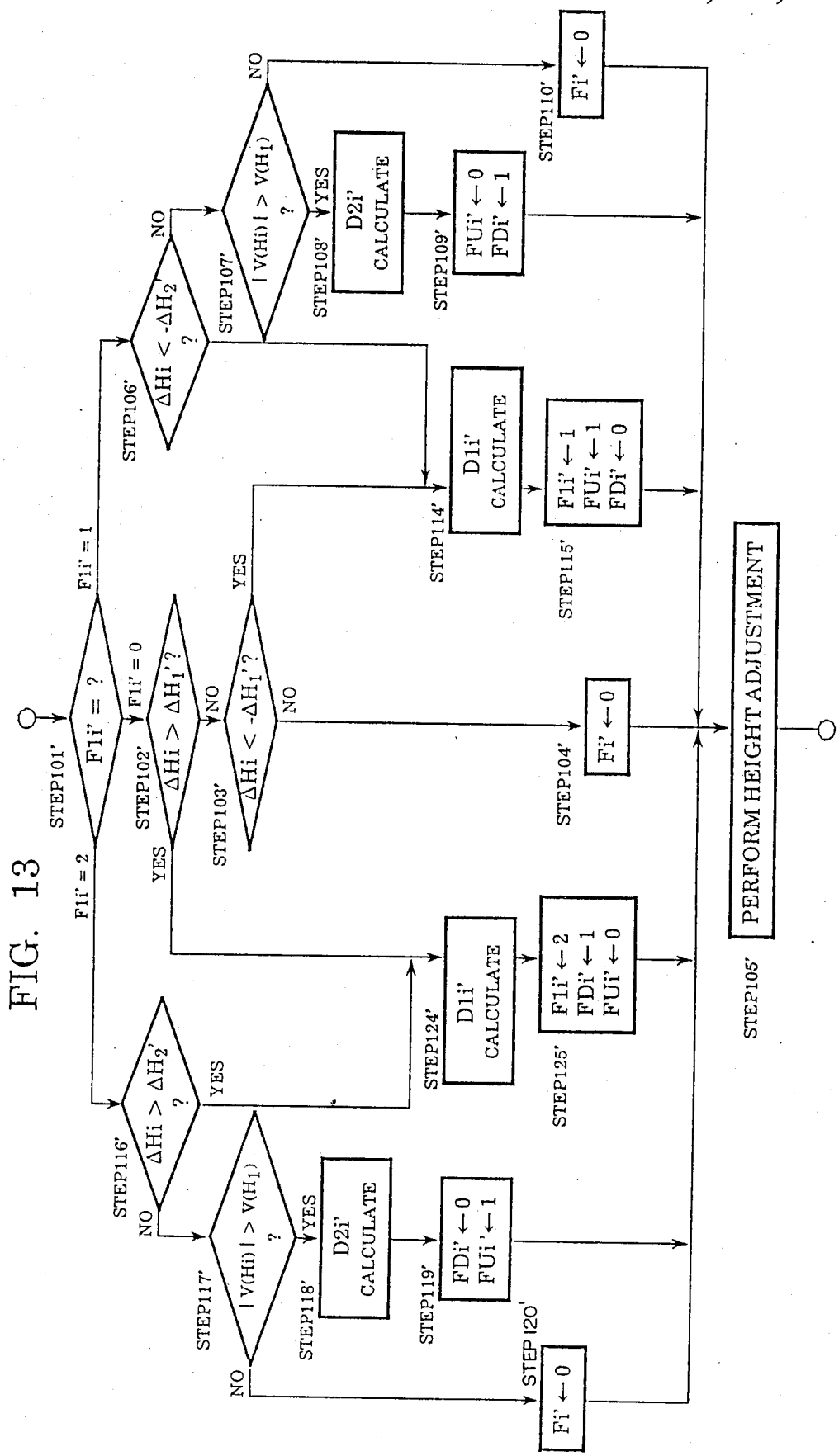
FIG. 13 is a flow chart, similar to the FIG. 6 flow chart for the first preferred embodiment, showing a subroutine which is called from four blocks shown in the FIG. 7 flow chart, during interrupt processing of this second preferred embodiment while the vehicle steering wheel is being returned towards its zero or straight ahead position.

When such steering wheel return is detected, interrupt processing according to the flow charts shown in FIG. 13 and FIG. 7 is initiated and is carried out, whereby the occurrence of overshoot and of repeated vertical fluctuation of the wheel heights from the standard wheel heights are prevented during steering wheel return. It should be noted that steering wheel return may be detected by, for example as shown in FIG. 8 which applies to this third preferred embodiment also, determining the occurrence of the conditions below, where steering to the right is considered as positive (with alpha greater than zero), the output of the steering angle sensor 96 is represented as "Sout", and C1 and C2 each is a positive constant:

for determining steering wheel return from steering to the right:

$$Sout \geq C1 \text{ and } V(\alpha) \leq -C2$$

for determining steering wheel return from steering to the left:

$$Sout \geq C1 \text{ and } V(\alpha) \geq C2$$

In the interrupt processing flow chart of FIG. 13 the steps which correspond to the steps shown in the flow chart of FIG. 11 are designated by step numbers which are the same as the step numbers utilized for said corresponding steps of FIG. 11, but with a dash appended. The steps of the FIG. 6 interrupt processing program as described above with respect to the first preferred embodiment, with an appropriate modification for this second preferred embodiment introduced to parallel the relatively minor modification described above that was made for the steps shown in FIG. 3 for normal processing, are applicable to this second preferred embodiment also, and therefore detailed description of them will be omitted herein.

The interrupt processing subroutine whose flow chart is laid out in FIG. 13, which is executed in each of the steps 14 to 17 of the main interrupt processing program of FIG. 6, has steps numbered the same as corresponding steps in the normal processing routine whose flow chart is laid out in FIG. 11, but with a dash affixed: and this subroutine is substantially the same as the normal processing subroutine whose flow chart is laid out in FIG. 11, except in that: the flags F1i, FUi and FDi of FIG. 11 are replaced in FIG. 13 by, respectively, F1i', FUi' and FDi'; the wheel height control threshold values delta H0, delta H1 and delta H2 of FIG. 11 are replaced in FIG. 13 by delta H1' and delta H2'; the flow control valve duty ratios D0i, D1i and D2i of FIG. 11 are respectively replaced in FIG. 13 by D0i', D1i' and D2i'; the wheel height rate of change control threshold value V(H1) of FIG. 11 is replaced in FIG. 13 by a new value V(H2); in the steps 102' and 103' in FIG. 13, as opposed to the case in FIG. 11, tests are made respectively as to whether or not delta Hi is greater than or equal to delta H1' and delta Hi is less than or equal to -delta H1', and, in these steps, when negative decisions are made, in FIG. 13 the flow of control is transferred next to the step 104', whereas when an affirmative decision is made control passes without carrying out a roll condition decision to the steps 124' and 114' respectively. Accordingly, therefore, detailed description of this FIG. 13 interrupt subroutine will be omitted herein, in the interests of brevity of description.

Figure 14:
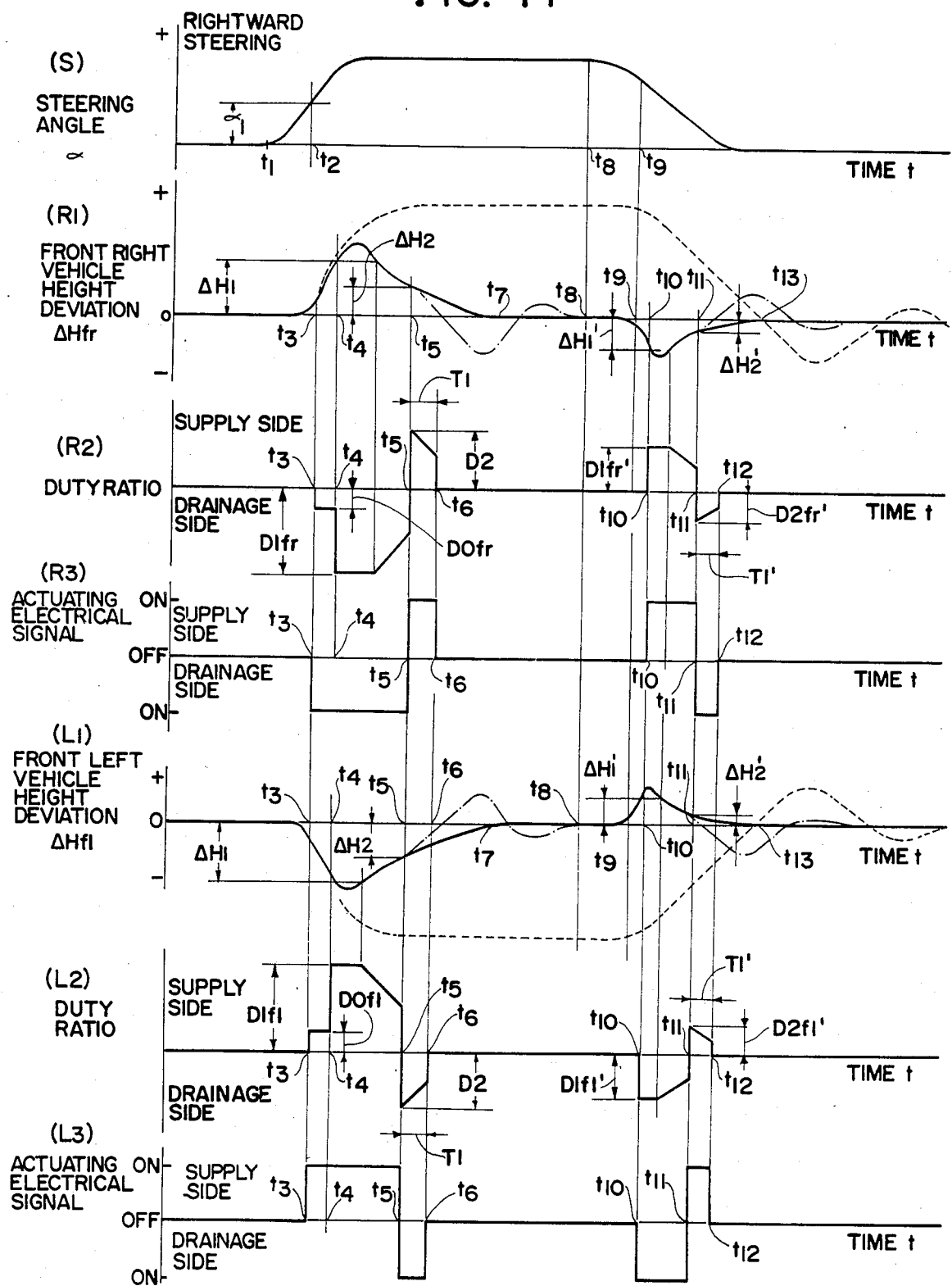
FIG. 14, which corresponds to FIG. 9 for the first preferred embodiment, is a time chart for illustrating the operation of this second preferred embodiment of the vehicle roll control system of the present invention.

Next with reference to the time chart shown in FIG. 14 and the flow charts of FIG. 3, FIG. 11, FIG. 6 and FIG. 13, an exemplary operational episode of the operation of the wheel height adjustment system according to this second preferred embodiment of the present invention will be described; this exemplary operational episode concerns the case of the vehicle performing a right turn. It should be noted that, in FIG. 14, the time chart portion (S) shows the time behavior of the steering angle alpha, while the time chart portions (R1), (R2) and (R3) show, respectively: the time behavior of the vehicle height deviation delta Hfr at a position corresponding to the front right wheel; the time behavior of the duty ratio of the actuating electrical signals supplied to the electrically controlled flow rate control valve 18 (on the supply side) and the electrically controlled flow rate control valve 32 (on the drainage side) of the actuator 2fr for said front right wheel; and the time behavior of the ON/OFF states of the actuating electrical signals supplied to the electrically controlled ON/OFF switching valve 16 (on the supply side) and the electrically controlled ON/OFF switching valve 34 (on the drainage side) of said actuator 2fr for said front right wheel; and the time chart portions (L1), (L2) and (L3) show, respectively: the time behavior of the vehicle height deviation delta Hfl at a position corresponding to the front left wheel; the time behavior of the duty ratio of the actuating electrical signals supplied to the electrically controlled flow rate control valve 19 (on the supply side) and the electrically controlled flow rate control valve 33 (on the drainage side) of the actuator 2fl for said front left wheel; and the time behavior of the ON/OFF states of the actuating electrical signals supplied to the electrically controlled ON/OFF switching valve 17 (on the supply side) and the electrically controlled ON/OFF switching valve 35 (on the drainage side) of said actuator 2fl for said front left wheel. In FIG. 14, the broken lines show the fluctuations in wheel height which would occur in the (hypothetical) case in which roll control by wheel height adjustment and roll control by control of the damping effect and spring contant were not carried out, and the dot dash lines show the fluctuations in wheel height which would occur in the (also hypothetical) case in which the reverse output control implemented by the wheel height adjustment device of the present invention was not carried out.

Referring to this FIG. 14 time chart, at the time point t1 the vehicle driver starts to turn the steering wheel to the right, and at the time point t2 the steering angle reaches alpha 1, and thus at approximately the time point t2 the front right vehicle wheel height deviation delta Hfr will begin to increase and on the other hand the front left vehicle wheel height deviation delta Hfl will begin to decrease. At the time point t3, delta Hfr reaches delta H0, and thus, in the step 102 in the subroutine whose flow chart is laid out in FIG. 11, a decision is made that delta Hfr is greater than or equal to delta H0, and next, in the roll condition determining step 121, it is found to the case that V is greater than or equal to V0 and alpha is greater than or equal to alpha 1, but delta Hfr is not greater than or equal to delta H1, so a NO decision is made, and thus the flow of control is transferred next to the step 122. In the step 122, the duty ratio DOfr for the electrically controlled flow rate control valve 32 is computed, and in the step 123 the flag FDfr is set to one, and thereafter in the step 105, the electrically controlled flow rate control valve 32 is supplied with actuating electrical energy at a duty ratio of DOfr, and further the electrically controlled ON/OFF switching valve 34 is supplied with actuating electrical energy, whereby a certain amount of fluid is drained from the cylinder chamber 5 of the actuator 2fr, and therefore the wheel height for the front right wheel is controlled to be increased.

At the time point t4, delta Hfr reaches delta H1, and thus in the step 121 a positive decision is made, and therefore the flow of control is transferred next to the step 124. In the step 124, the duty ratio D1fr for the electrically controlled flow rate control valve 32 is computed, and in the step 125 the value of the flag F1fr is set to two and the value of the flag FDfr is set to one, and thereafter in the step 105 the duty ratio of the actuating electrical signal supplied to the electrically controlled flow rate control valve 32 is corrected to D1fr, and therefore a relatively large amount of fluid is drained from the cylinder chamber 5 of the actuator 2fr, so that the wheel height of the front right wheel is reduced.

At the time point t5, delta Hfr reaches delta H2, and in the step 116 in the subroutine whose flow chart is laid out in FIG. 11 a decision is made that delta Hfr is not greater than delta H2, and next in the step 117 a decision is made that the absolute value of V(Hfr) is greater than V(H1), in the step 118 the duty ratio D2fr of the actuating electrical energy to be supplied to the electrically controlled flow rate control valve 18 is read in from the ROM of the micro computer, and the flow of control is transferred next to the step 119. In the step 119, the value of the flag FDfr is reset to zero and the value of the flag FUfr is set to one, and thereafter in the step 105 the supply of actuating electrical energy to the electrically controlled flow rate control valve 32 and to the electrically controlled ON/OFF switching valve 34 is stopped, whereby the draining of fluid from the cylinder chamber 5 of the actuator 2fr is stopped and at the same time point the electrically controlled flow rate control valve 18 is supplied with actuating electrical energy at a duty ratio of D2fr, and actuating electrical energy is supplied to the electrically controlled ON/OFF switching valve 16, whereby reverse output control is carried out so as to supply fluid to the cylinder chamber 5 of the actuator 2fr. This supply of fluid continues until a negative decision is made in the step 117, and then in the step 120 the values of all of the flags Ffr are reset to zero, in other words until the absolute value of V(Hfr) becomes less than or equal to V(H1), which happens at the time point t6. Thus, for example at the time point t7, delta Hfr reaches 0.

It should be noted that the rear right wheel is also controlled in the same way; therefore, detailed description of said control will be omitted herein.

As for the front left wheel, at the time point t3, delta Hfl reaches -delta H0, whereupon, in the step 103 in the subroutine whose flow chart is laid out in FIG. 11, a decision is made that delta Hfr is less than or equal to -delta H0, and next, in the step 111, since V is greater than or equal to V0 and alpha is greater than or equal to alpha 1, but delta Hfl is not less than or equal to -delta H1, a negative decision is made, so that the flow of control is transferred next to the step 112. In the step 112, the duty ratio DOfl for the electrically controlled flow rate control valve 19 is computed, in the step 113 the value of the flag FUfl is set to one, and thereafter in the step 105 actuating electrical energy is supplied to the electrically controlled flow rate control valve 19 at a duty ratio of DOfl, and actuating electrical energy is supplied to the electrically controlled ON/OFF switching valve 17, whereby a certain amount of fluid is supplied to the cylinder chamber 5 of the actuator 2fl for the front left wheel, whereby the wheel height of this front left wheel is controlled to be reduced.

At this time point t4, delta Hfl reaches -delta H1, so that in the step 111 a positive decision is made and therefore the flow of control is transferred next to the step 114. In the step 114 the duty ratio D1fl for the actuating electrical energy to be supplied to the electrically controlled flow rate control valve 19 is computed, in the step 115 the value of the flag F1fl and the value of the flag FUfl are set to one, and thereafter in the step 105 the duty ratio for the actuating electrical energy to be supplied to the electrically controlled flow rate control valve 19 is corrected to D1fl, and thereby a relatively large amount of fluid is supplied to the cylinder chamber 5 of the actuator 2fl for the front left wheel, and thereby the wheel height of this front left wheel is increased.

At the time point t5, delta Hfl reaches -delta H2, whereupon in the step 106 in the subroutine whose flow chart is laid out in FIG. 11 a decision is made that delta Hfl is not less than -delta H2, and, in the next step 107, a decision is made that the absolute value of V(Hfl) is greater than V(H1), in the step 108 the duty ratio D2fl of the actuating electrical energy to be supplied to the electrically controlled flow rate control valve 33 is read in from the ROM of the micro computer 103, and the flow of control is transferred next to the step 109. In the step 109, the value of the flag FUfl is reset to zero, and the value of the flag FDfl is set to one, after which, in the step 105, the supply of actuating electrical energy to the electrically controlled flow rate control valve 19 and to the electrically controlled ON/OFF switching valve 17 is terminated, whereby the supply of fluid to the cylinder chamber 5 of the actuator 2fl for the suspension of the front left wheel is stopped and at the same time actuating electrical energy is supplied to the electrically controlled flow rate control valve 33 at a duty ratio of D2fl, and actuating electrical energy is supplied to the electrically controlled ON/OFF switching valve 35, whereby the reverse output control to drain the fluid from the cylinder chamber 5 of the actuator 2fl is carried out. This draining of fluid continues until the time point t6, at which a negative decision is made in the step 107, and then in the step 110 the values of all of the flags Ffl are reset to zero, and by this means the reverse output control is terminated. Thus, for example, at the time point t7, delta Hfl becomes zero.

It should be noted that the control for the rear left wheel is done in the same way.

Next, an explanation will be presented for the case of returning from a right turn to straight line motion, i.e when the right turn is unwound by the vehicle driver turning the steering wheel back to the straight ahead position thereof.

In FIG. 14, at the time point t8, the turning in the return direction of the steering wheel begins, and at the time point t9 this turning of the steering wheel in the return direction is detected, whereupon the routines whose flow charts are shown in FIG. 6 and FIG. 13 are begun as interrupt processing routines. At approximately the time point t9, the wheel height Hfr of the vehicle body over the front right vehicle wheel begins to decrease and on the other hand the wheel height Hfl of the vehicle body over the front left vehicle wheel begins to increase. At the time point t10, delta Hfr reaches -delta H1', whereupon, in the step 103' in the interrupt routine whose flow chart is laid out in FIG. 13, a decision is made that delta Hfr is less than or equal to -delta H1', and next in the step 114' the duty ratio D1fr' for the actuating electrical energy to be supplied to the electrically controlled flow rate control valve 18 is computed, in the step 115' the value of the flag F1fr and the value of the flag FUfr are set to one, thereafter in the step 105' actuating electrical energy is supplied to the electrically controlled flow rate control valve 18 at a duty ratio of D1fr', and actuating electrical energy is supplied to the electrically controlled ON/OFF switching valve 16, whereby a certain amount of fluid is supplied to the cylinder chamber 5 of the actuator 2fr for the front right vehicle wheel, and thus the wheel height of the front right wheel is increased.

At the time point t11, delta Hfr reaches -delta H2', whereupon in the step 106' a decision is made that delta Hfr is not less than -delta H2', and in the next step 107' a decision is made that the absolute value of V(Hfr) is greater than V(H2), in the step 108' the duty ratio D2fr' of the actuating electrical energy supplied to the electrically controlled flow rate control valve 32 is read in from the ROM of the micro computer 103, and the flow of control is transferred next to the step 109'. In the step 109', the value of the flag FUfr is reset to zero, and the value of the flag FDfr is set to one, after which, in the step 105', the supply of actuating electrical energy to the electrically controlled flow rate control valve 18 and to the electrically controlled ON/OFF switching valve 16 is terminated, thus closing these valves, and the electrically controlled flow rate control valve 32 is supplied with actuating electrical energy at a duty ratio of D2fr', and actuating electrical energy is supplied to the electrically controlled ON/OFF switching valve 34, whereby reverse output control is carried out to drain fluid from the cylinder chamber 5 of the actuator 2fr for the right front vehicle wheel. This draining of fluid continues until the step 107' a negative decision is made, and then in the step 110' the values of all of the flags Ffr' are reset to zero, in other words until the absolute value of V(Hfr) is less than or equal to V(H2), which happens at the time point t12. Thus, for example at the time point t13, delta Hfr becomes 0.

It should be noted that control for the rear right wheel is done in the same manner.

As for the front left wheel, at the time pont t10, delta Hfl reaches delta H1', and, in the step 102' in the interrupt routine whose flow chart is laid out in FIG. 13, a decision is made that delta Hfl is greater than or equal to H1', and next, in the step 124', the duty ratio D1fl' for the actuating electrical energy to be supplied to the electrically controlled flow rate control valve 33 is computed, and then in the step 125' the value of the flag F1fl and the value of the flag FDfl are set respectively to two and to one, and thereafter in the step 105' actuating electrical energy is supplied to the electrically controlled flow rate control valve 33 at a duty ratio of D1fl', and actuating electrical energy is supplied to the electrically controlled ON/OFF switching valve 35, whereby a certain amount of fluid is drained from the cylinder chamber 5 of the actuator 2fl for the front left vehicle wheel, and by this means the wheel height of said front left vehicle wheel is reduced.

At the time point t11, delta Hfl reaches delta H2', so that in the step 116' a decision is made that delta Hfl is not greater than delta H2', and next in the step 117' a decision is made that the absolute value of V(Hfl) is greater than V(H2), in the step 118' the duty ratio D2fl' of the actuating electrical energy supplied to the electrically controlled flow rate control valve 19 is computed by being read in from the ROM, and the flow of control continues to the step 119'. In the step 119' the value of the flag FDfl is reset to zero, and the value of the flag FUfl is set to one, after which, in the step 105', the supply of actuating electrical energy to the electrically controlled flow rate control valve 33 and to the electrically controlled ON/OFF switching valve 35 is terminated, thus closing these valves, and the electrically controlled flow rate control valve 19 is supplied with actuating electrical energy at a duty ratio of D2fl', and actuating electrical energy is supplied to the electrically controlled ON/OFF switching valve 17, whereby reverse output control is carried out to supply fluid to the cylinder chamber 5 of the actuator 2fl for the front left vehicle wheel. This supply of fluid continues until a negative decision is made in the step 117', and then, in the step 120', the values of all the flags Ffl' are reset to zero, or in other words until a decision is made that the absolute value of V(Hfl) is less than or equal to V(H2), which happens at the time point t12. Thus, for example at the time point t13, delta Hfl reaches 0.

It should be noted that the control for the rear left wheel is done in the same way. Additionally in the case of a left turn, similar control is carried out to that in the case of the above described right turn.

Thus in this second preferred embodiment, as described above and as shown in the relevant drawings, when the vehicle is substantially travelling in a straight line, then: in the case that the deviation delta Hi from the standard wheel height of the wheel height in the position corresponding to each of the vehicle wheels is less than plus or minus delta H0, wheel height adjustment is not carried out, and therefore the expenditure of the electrical energy required for opening and closing the electrically controlled flow rate control valves and the electrically controlled ON/OFF switching valves can be saved, and the danger of producing the so called hunting phenomenon through carrying out repeated increase and decrease adjustments in wheel height within a relatively fine range can be reduced, in this case that the vehicle is travelling substantially in a straight line; and, in the case that the wheel height deviation delta Hi in a position corresponding to each of the wheels is at least plus or minus delta H0 and is less than plus or minus delta H1, then the wheel height Hi of each wheel is adjusted to a target wheel height range (Hbi plus or minus delta H0). On the other hand, in the case that the vehicle is travelling around a curve such as when turning, as well as effectively preventing vehicle roll at the beginning and end of such travelling around a curve, repeated vertical fluctuations in wheel height for each wheel from the standard wheel height caused by overshoot are effectively prevented, whereby the steering stability of the vehicle is improved.

As in the first preferred embodiment, it should be noted that generally, when the vehicle changes from moving around a curve to moving along a straight line, i.e. in the case where the driver unwinds the steering wheel, the steering movement speed is low compared with the case of moving from straight line movement to movement around a curve, i.e. in the case where the driver winds up the steering wheel, as a result of which when the turning in the return direction of the steering wheel is detected the interrupt processing which is executed may be according to the flow chart laid out in FIG. 10, as in the case of the first preferred embodiment. In this interrupt processing subroutine whose flow chart is laid out in FIG. 10, as before, when the turning in the return direction of the steering wheel is detected, first, in the initial step 21, in the normal processing subroutine whose flow chart is laid out in FIG. 11, the values of the flags Fi are reset to zero, and thereafter in the step 22 all output of actuating electrical energy to the electrically controlled flow rate control valves and the electrically controlled ON/OFF switching valves is stopped, and by this means roll control by wheel height adjustment is stopped, and thereafter control returns to the step 1 of the program whose flow chart is laid out in FIG. 3. In this case, the values of the flag Fi are reset to zero, but it is preferable that for a certain time interval the damping effect and spring constant should be maintained as high.

The second preferred embodiment of the vehicle roll control system of the present invention has been described in detail above in a very specific fashion, but the present invention is not limited to this particular implementation, and it will be clear to those skilled in the relevant art that various other variant embodiments are possible within the scope of the present invention. For example, as before, the area of at least delta H1 in the graph of FIG. 5 may be set as shown by the broken line, and delta H1 may be set to any position between delta H0 and delta H1 shown in the drawing. Again, in the roll condition decision in the steps 111 and 121 of the subroutine whose flow chart is laid out in FIG. 11, the condition that the absolute value of delta Hi is greater than or equal to delta H1 may be omitted. Furthermore, in the above described second preferred embodiment while the vehicle is turning the damping effect and the spring constant of the suspension are both set to be high, but the construction may also be such that the damping effect and spring constant are set to be high on the outer turning wheels, and the damping effect and spring constant are set respectively to base mode and to low for the inner turning wheels. Also, although, in the second preferred embodiment described above, a time differential value of steering angle, i.e., a steering speed, is calculated from the steering angle sensed by the steering sensor 96, it should be noted that the steering sensor 96 could in another preferred embodiment be replaced with a steering angular velocity sensor which detected a steering angular velocity omega.

THE THIRD PREFERRED EMBODIMENT

Figure 15:
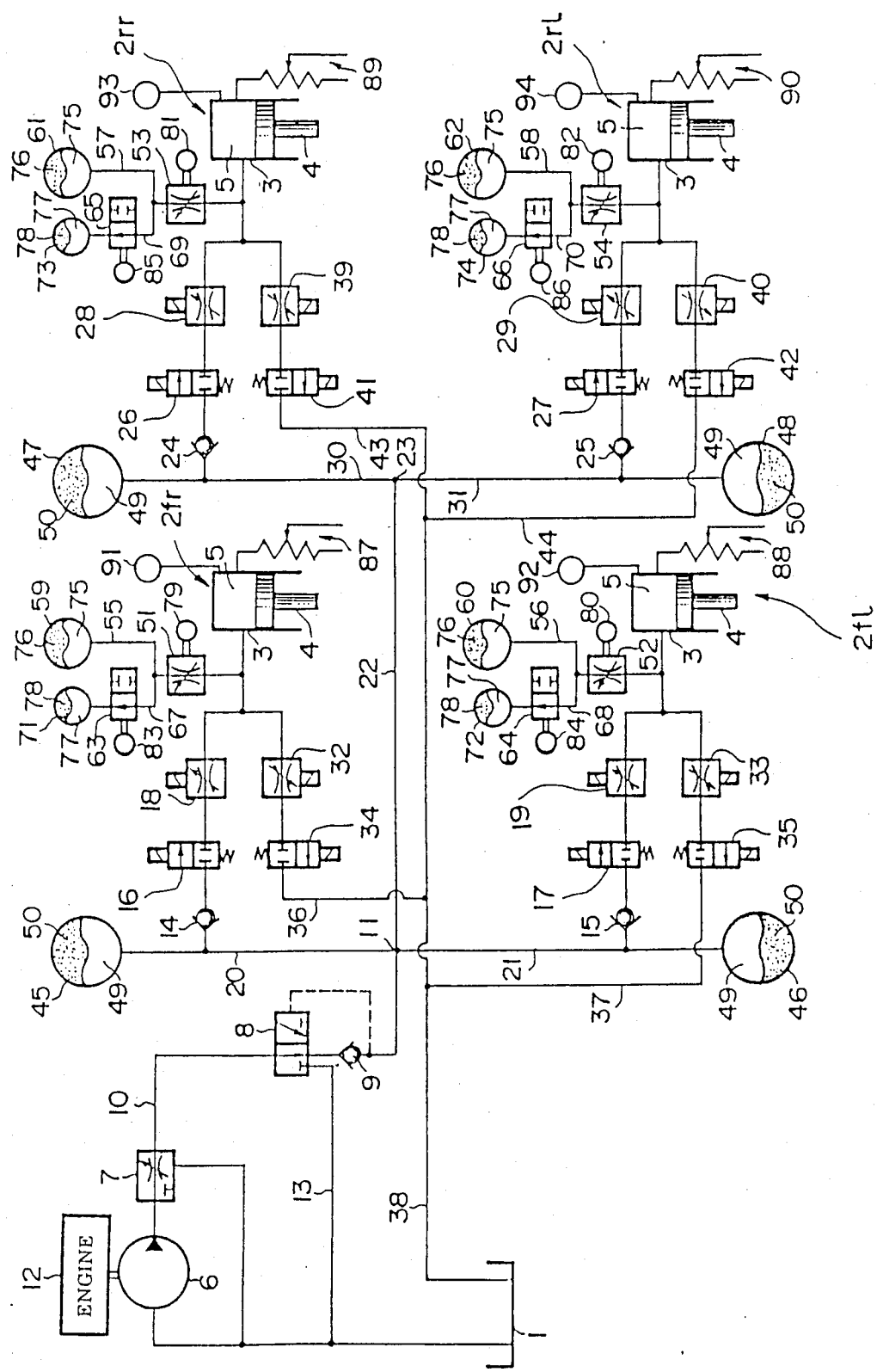
FIG. 15, which corresponds to FIG. 1 for the first and the second preferred embodiments, is a schematic diagram showing major physical components of the third preferred embodiment of the system for roll control for an automotive vehicle of the present invention which will be described.
Figure 16:
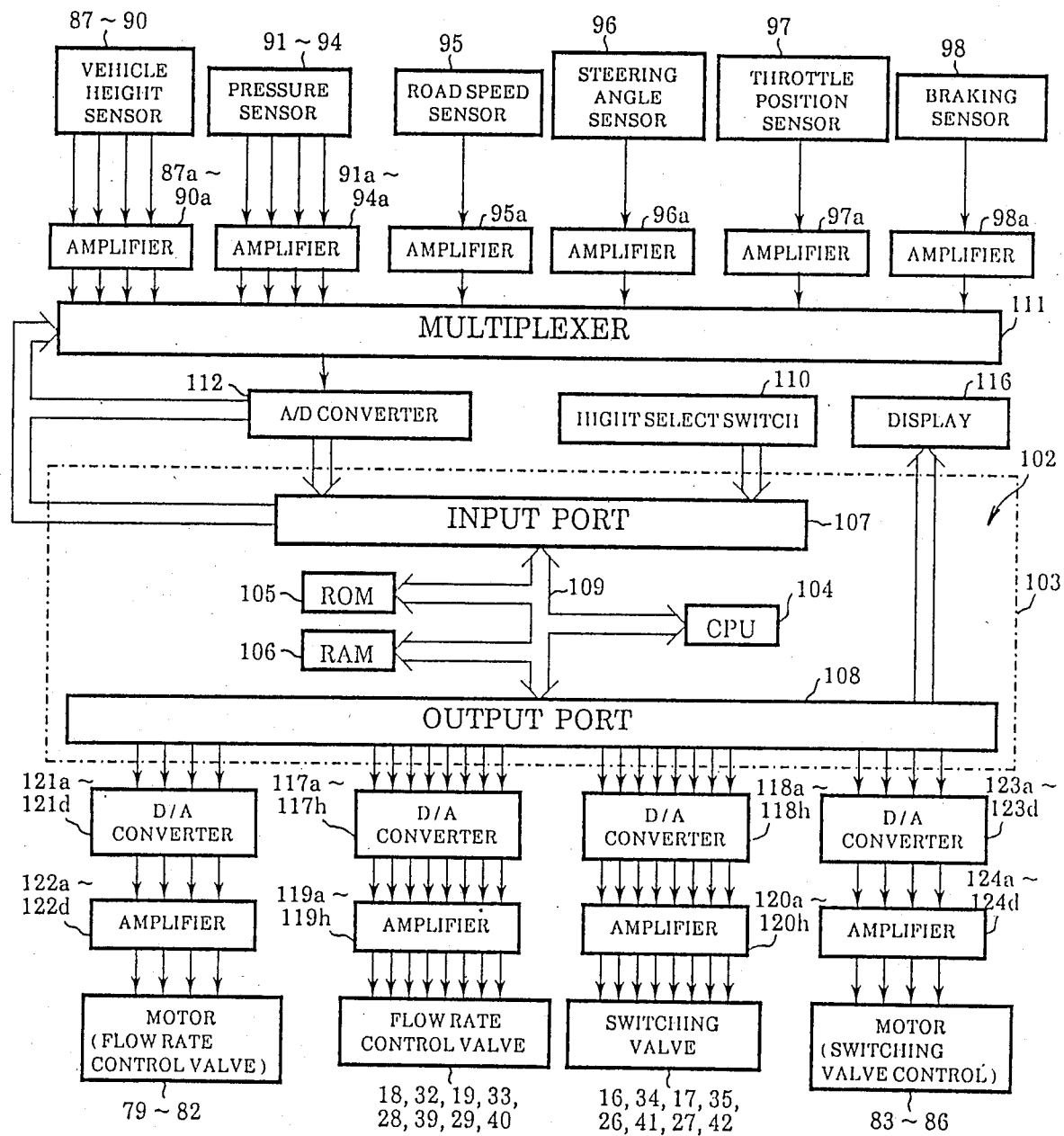
FIG. 16, which corresponds to FIG. 2 for the first and the second preferred embodiments, is a block diagrammatical view showing the internal construction of the electrical control device incorporated in said third preferred embodiment of the system for roll control for an automotive vehicle of the present invention, incorporating a micro computer.
Figure 22:
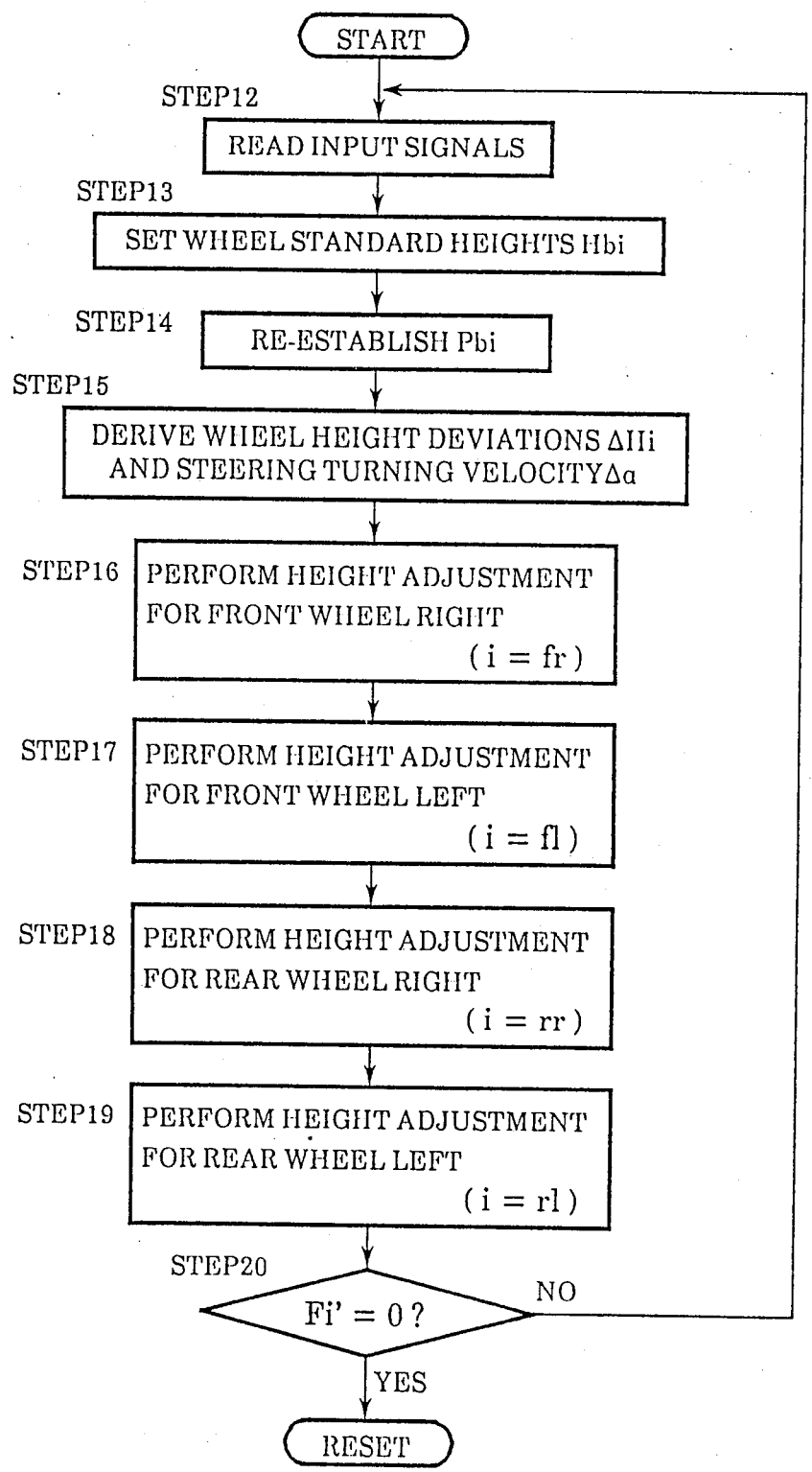
FIG. 22 is a flow chart, similar to the FIG. 17 flow chart for normal operational processing, showing the overall flow of a cyclical program which directs the operation of said micro computer utilized in this third preferred embodiment of the vehicle roll control system of the present invention, during interrupt operational processing while the vehicle steering wheel is being returned towards its zero or straight ahead position.
Figure 23:
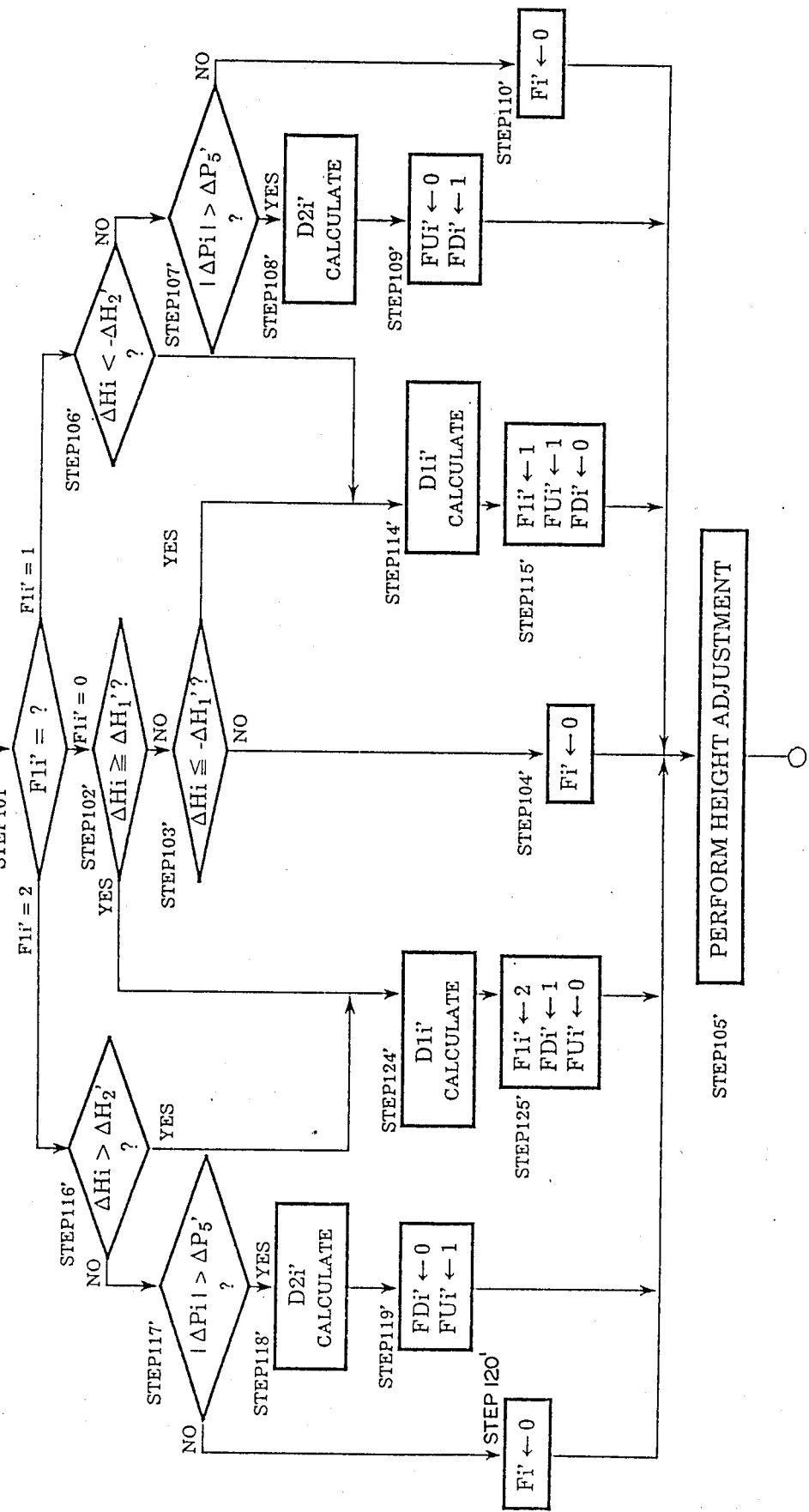
FIG. 23 is a flow chart, similar to the FIG. 19 flow chart for normal operational processing, showing a subroutine which is called from four blocks shown in FIG. 22, again during such interrupt processing of the third preferred embodiment while the vehicle steering wheel is being returned towards its zero or straight ahead position.
Figure 24:
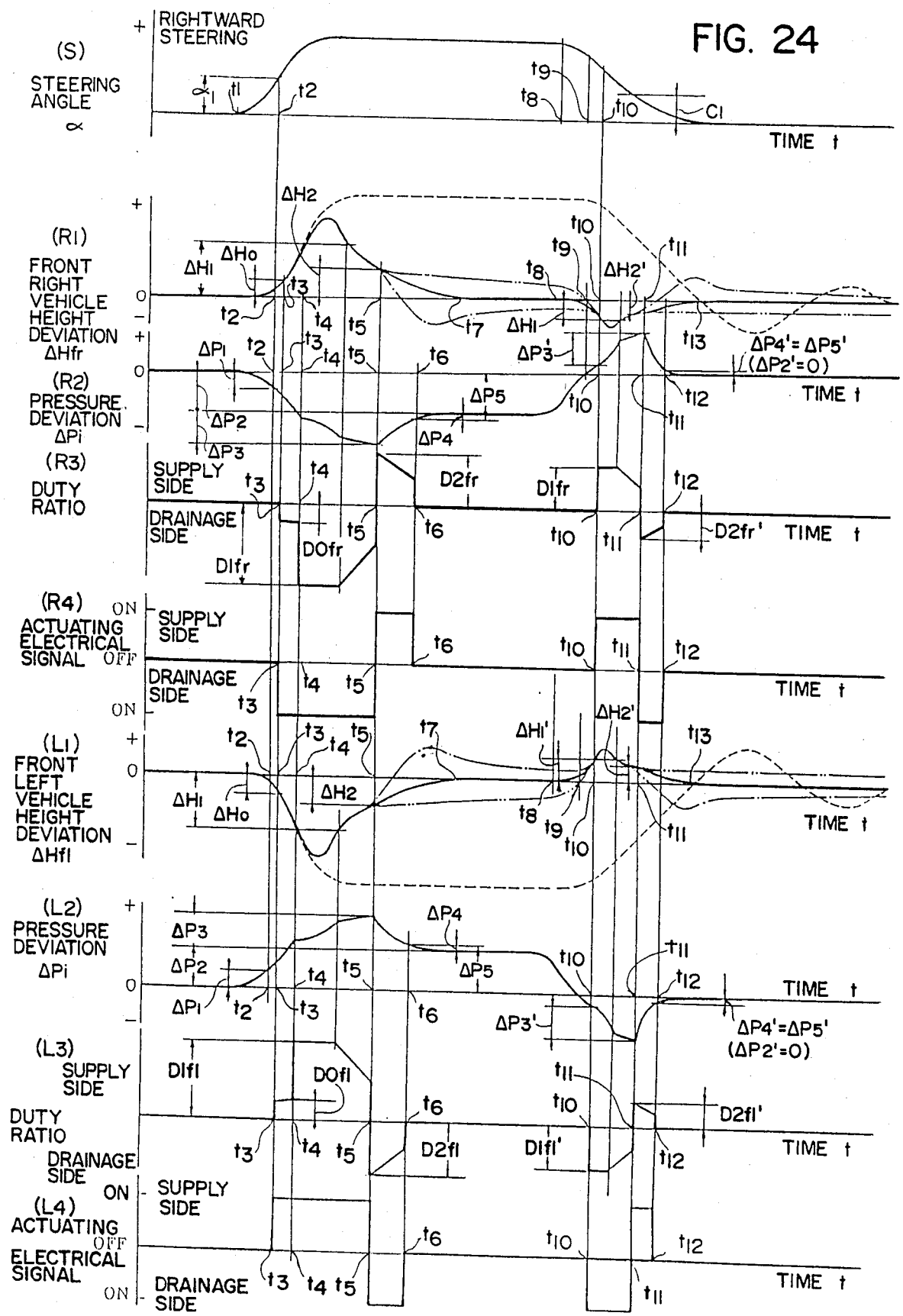
FIG. 24, which corresponds to FIGS. 9 and 14 for the first and the second preferred embodiments respectively, is a time chart for illustrating the operation of this third preferred embodiment of the vehicle roll control system of the present invention.

Referring next to the schematic diagram of FIG. 15, which, like FIG. 1 for the first and second preferred embodiments, shows major physical components of the third preferred embodiment of the system for roll control for an automotive vehicle of the present invention, and to the block diagrammatical view of FIG. 16 showing the construction of the electrical control device incorporating a micro computer which is included in said third preferred embodiment, and to the flow charts of FIGS. 17, 18, 19, 22, and 23 and to the time chart of FIG. 24 (respectively similar to FIG. 3, no figure, FIG. 4, FIG. 6, and FIG. 7 for the first preferred embodiment), the construction and the operation of the micro computer 103 incorporated in the third preferred embodiment of the system for vehicle roll control of the present invention will be explained.

With reference to the difference between FIG. 1 showing the gross physical structure of the vehicle roll control system relating to the first and second preferred embodiments of the present invention and FIG. 15 relating to this third preferred embodiment, the only physical constructional difference of the electrical control system is that in this third preferred embodiment, as shown in FIG. 15, for each of the pressure chambers 5 of the actuators 2fr, 2fl, 2rr, and 2rl for the vehicle wheels there is provided a corresponding pressure sensor, respectively designated by the reference numerals 91 through 94, which senses the pressure of the working fluid within its pressure chamber 5 and produces an electrical output signal representative thereof. In line with this, with reference to the difference between FIG. 16 relating to this third preferred embodiment and FIG. 2 relating to the first and second preferred embodiments, the only physical constructional difference of the electrical control system is that there are provided, in this third preferred embodiment, amplifiers 91a through 94a which amplify the output signals of said pressure sensors 91 through 94 and supply the result of said amplification to the multiplexer 111 for input to the micro computer 103. Accordingly, in this third preferred embodiment, information representative of the pressures in all the four pressure chambers 5 is available to the micro computer 103. Further descriptions relating to FIGS. 14 and 15 will be omitted in the interests of conciseness of disclosure.

Figure 17:
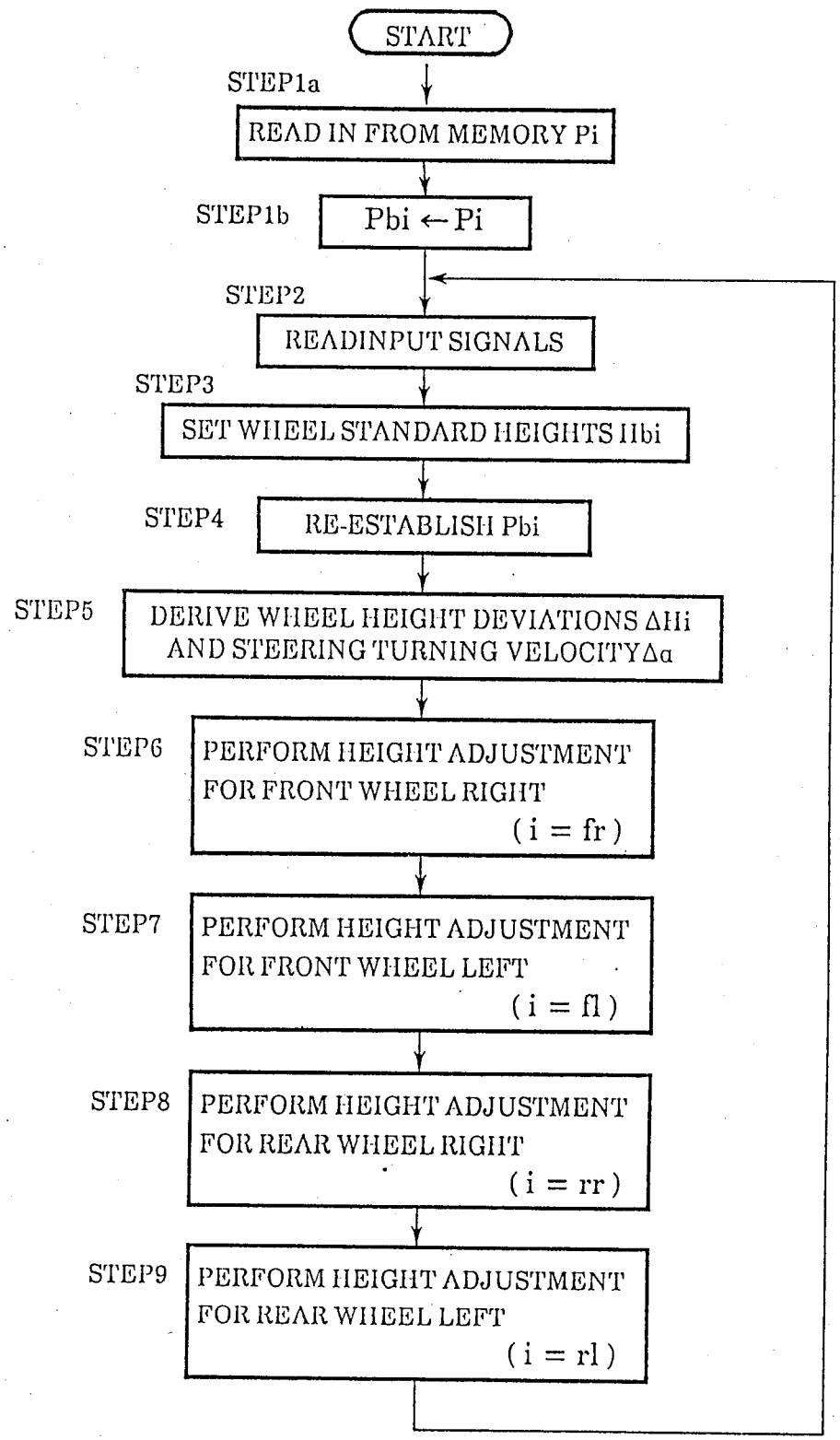
FIG. 17, which corresponds to FIG. 3 for the first and the second preferred embodiments, is a flow chart showing the overall flow of a cyclical program which directs the operation of said micro computer utilized in the third preferred embodiment of the vehicle roll control system of the present invention, during normal operational processing.
Figure 18:
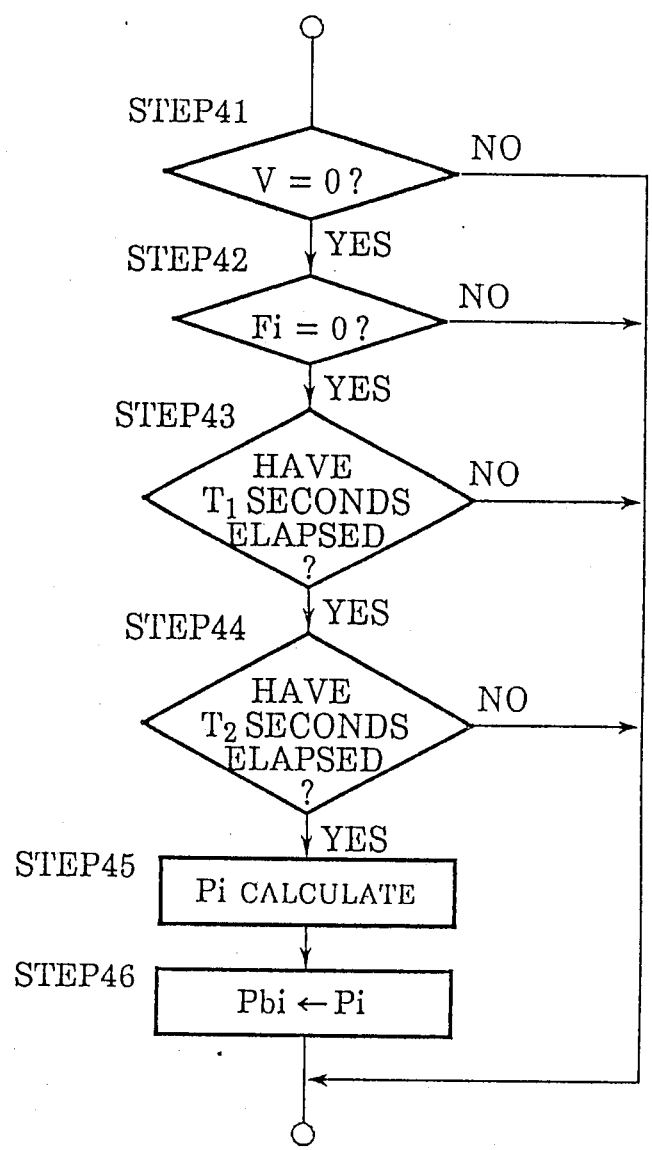
FIG. 18 is a detailed flow chart of a subroutine which is called in the case of the third preferred embldiment from a block shown in the flow chart of FIG. 17, again during normal operational processing.
Figure 19:
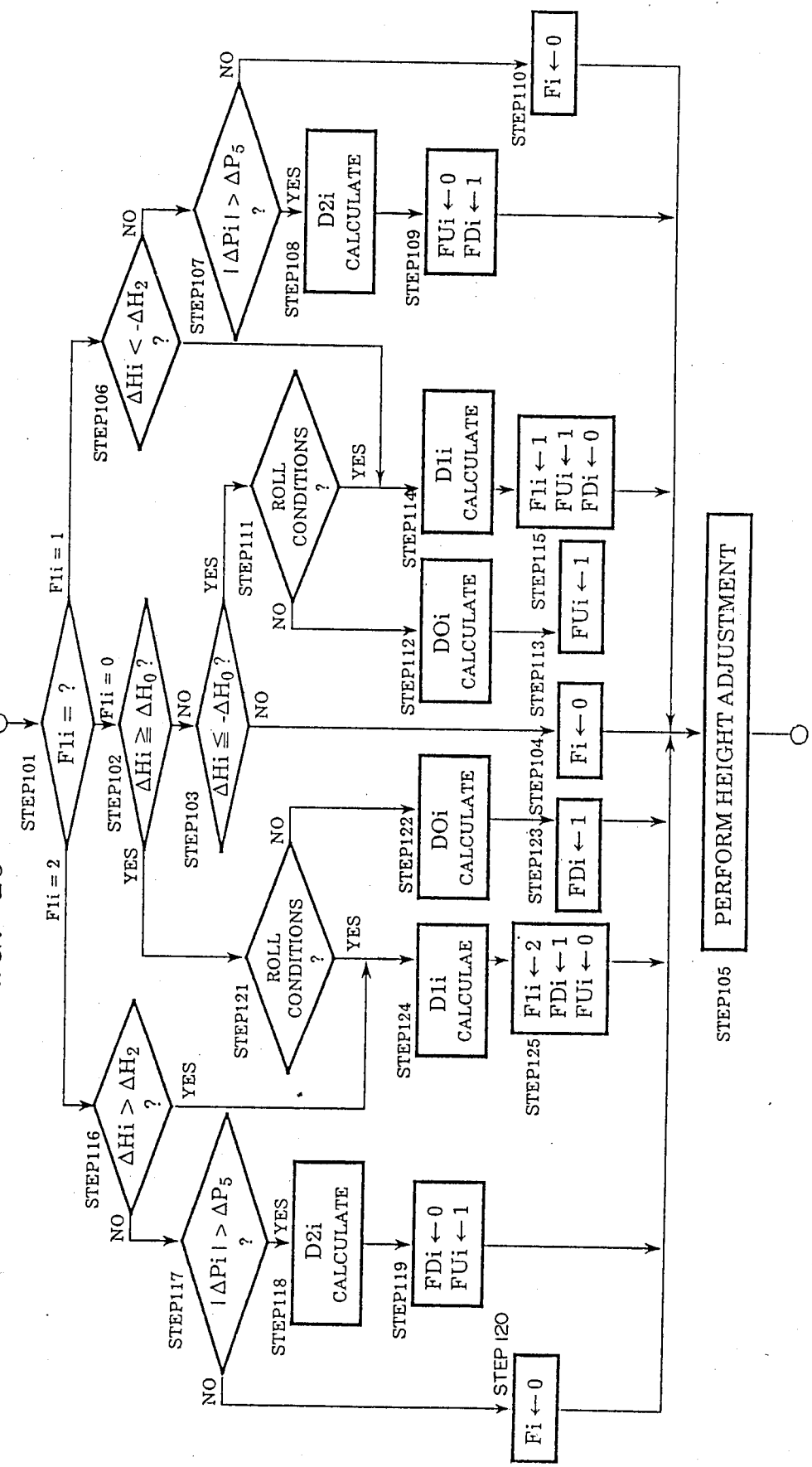
FIG. 19, which corresponds to FIGS. 4 and 11 for the first and the second preferred embodiments respectively, is a detailed flow chart of a subroutine which is called in the case of the third preferred embodiment from four blocks shown in the flow chart of FIG. 17, again during normal operational processing.

Referring next to the flow charts of FIGS. 17, 18, 19, 22, and 23 and to the time chart of FIG. 24, the operation of the micro computer 103 incorporated in this third preferred embodiment of the system for vehicle roll control of the present invention will be explained. FIG. 17 is a flow chart showing the overall flow of said operation of said micro computer 103, and as before it will easily be observed that this overall program flow is a repetitive cycle which will typically take place over a certain characteristic approximate cycle time. Further, the flow chart laid out in FIG. 18 shows in detail a routine which in the flow chart laid out in FIG. 17 is abbreviated simply by the step 4, as applied to a different parameter, while the flow chart laid out in FIG. 19 shows in detail a routine which in the flow chart laid out in FIG. 17 is abbreviated simply by each of the steps 6 through 9 with a different parameter "i" equal to "fr", "fl", "rr", and "rl" for the various vehicle wheels.

In the step 1 of the main program whose flow chart is laid out in FIG. 17, then, signals indicating the current values Pi (where "i" is "fr" for the front right wheel, "fl" for the front left wheel, "rr" for the rear right wheel, and "rl" for the rear left wheel) of the fluid pressures in the pressure chambers 5 of the four respective actuators 2fr, 2fl, 2rr, and 2rl for the front right wheel, the front left wheel, and rear right wheel, and the rear left wheel, as detected by the pressure sensors 91 through 94, are read in to the micro computer 103, and thereafter control is transferred to the next step 1b.

In this next step 1b, these pressures Pi are established as base or reference pressures Pbi, and thereafter control is transferred to the next step 2.

In this next step 2, signals indicating the wheel heights Hi (where "i" is "fr" for the front right wheel, "fl" for the front left wheel, "rr" for the rear right wheel, and "rl" for the rear left wheel) as detected and outputted by the wheel height sensors 87 to 90, signals (again) indicating the current values Pi (where "i" is "fr" for the front right wheel, "fl" for the front left wheel, "rr" for the rear right wheel, and "rl" for the rear left wheel) of the fluid pressures in the pressure chambers 5 of the four respective wheel actuators 2fr, 2fl, 2rr, and 2rl as detected by the pressure sensors 91 through 94, and signals indicating the vehicle speed V, the steering angle alpha, the throttle opening theta, and the vehicle braking state detected and outputted by, respectively, the vehicle speed sensor 95, the steering angle sensor 96, the throttle opening sensor 97, and the braking sensor 98, as well as a signal for the switch function S outputted from the vehicle height selection switch 110 and a signal for the switch function input from the damping effect selection switch not shown in the drawings, are read in to the micro computer 103, and thereafter control is transferred to the step 3.

In the step 3, when the switch function S of the vehicle height selection switch 110 is "H" for indicating that the vehicle height is to be set to high, the front wheel standard wheel heights Hbfr and Hbfl and set to Hhf and the rear wheel standard wheel heights Hbrr and Hbrl are set to Hhr; when the switch function S of the vehicle height selection switch 110 is "N" for indicating that the vehicle height is to be set to normal, the front wheel standard wheel heights Hbfr and Hbfl are set to Hnf and the rear wheel standard wheel heights Hbrr and Hbrl are set to Hnr; and, when the switch function S of the vehicle height selection switch 110 is "L" for indicating that the vehicle height is to be set to low, the front wheel standard wheel heights Hbfr and Hbfl are set to Hlf and the rear wheel standard wheel heights Hbrr and Hbrl are set to Hlr. In any of these cases, control is next transferred to the step 4.

In the step 4, by executing the subroutine whose flow chart is laid out in detail in FIG. 18 and which will be explained hereinafter, the base pressures Pbi are reset, and then control is next transferred to the step 5.

In the step 5, the deviations delta Hi between the actual wheel heights Hi (where "i" is "fr" for the front right wheel, "fl" for the front left wheel, "rr" for the rear right wheel, and "rl" for the rear left wheel) and the base wheel heights Hbi for each wheel, the steering velocity V(alpha), i.e. a quantity representative of the rate of turning of the steering wheel of the vehicle or of the rate of alteration of steering angle, and also the deviations delta Pi between the actual pressures Pi present in the pressure chambers 5 of the actuators 2 and the base pressures Pbi therefor, are computed according to the following expressions:

delta $Hi = Hi - Hbi$ $V(alpha) = alpha(n) - alpha(n-1)$ delta $Pi = Pi - Pbi$

Figure 20:
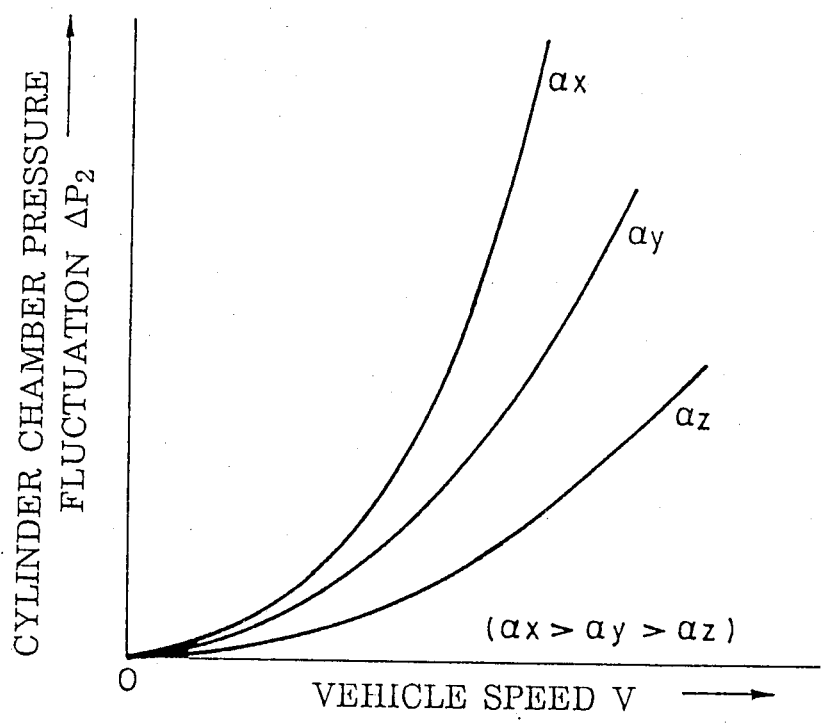
FIG. 20 is a graph relating to this third preferred embodiment, illustrating a map stored in the memory of said micro computer, which determines the pressure fluctuation in cylinder chambers of the suspension actuators as a function of vehicle speed and steering angle.

Herein, alpha(n−1) is the steering angle detected said certain short time interval before the detection of alpha(n). Furthermore, from a look up table in the ROM of the micro computer 103 like one corresponding to the graph shown in FIG. 20, or in some similar manner, the fluctuation delta P2 of the cylinder chamber pressure from the base pressure produced in the cylinder chamber 5 of each of the actuators 2 caused by the shift in the vehicle loading, in the case of this vehicle speed V and this steering angle alpha as read in in the step 2 above, is calculated. After this derivation of the wheel height deviations delta Hi, the steering velocity V(alpha), the pressure deviations delta Pi, and the pressure fluctuation delta P2, control is transferred next to the step 6.

In the step 6, by executing the subroutine whose control flow is shown in FIG. 19 and will be described later, with "i" equal to "fr", the wheel height adjustment for the front right wheel is carried out, and thereafter control is transferred next to the step 7.

In the step 7, by again executing said subroutine whose control flow is shown in FIG. 19 and will be described later, with "i" equal to "fl", the wheel height adjustment for the front left wheel is carried out, and thereafter control is transferred next to the step 8.

In the step 8, by again executing said subroutine whose control flow is shown in FIG. 19 and will be described later, with "i" equal to "rr", the wheel height adjustment for the rear right wheel is carried out, and thereafter control is transferred next to the step 9.

In the step 9, by yet again executing said subroutine whose control flow is shown in FIG. 19 and will be described later, with "i" equal to "rl", the wheel height adjustment for the rear left wheel is carried out. After the step 9 has been executed, control returns to the step 2, and until the ignition switch is switched off, or until an interrupt occurs as will be explained later, the steps 2 to 9 are repeated, i.e. the program flow cycles round and round in a closed loop, repeatedly performing the steps detailed above.

Next, the subroutine whose flow chart is laid out in FIG. 18 and which is executed in the step 4 of the main program whose flow chart is laid out in FIG. 17 will be described.

First in the first step 41, a test is made as to whether the vehicle speed V is substantially equal to zero, or not, and, if in fact vehicle speed is substantially zero, then the flow of control passes next to the step 42, while, on the other hand, if vehicle speed is not substantially zero, then the flow of control passes next to exit this subroutine without doing anything further.

In the next step 42, a test is made as to whether or not wheel height adjustment is not being carried out for any of the vehicle wheels, in other words whether Fi in the subroutine whose flow chart is laid out in FIG. 19 to be described hereinbelow is zero or not, if a decision is made that wheel height adjustment is not currently being made, then the flow of control passes next to the next step 43, while, on the other hand, if wheel adjustment is currently being performed at this time, then the flow of control passes next to exit this subroutine without doing anything further.

In the step 43, a test is made as to whether or not T1 seconds have elapsed since the time when the decision that Fi=0 was made in step 42, and when a decision that T1 seconds have elapsed is made, control goes to the step 44.

In the next step 43, a test is made as to whether or not T1 seconds have elapsed since the time when the decision that Fi was zero was made in the step 42, and, if a decision is made that T1 seconds have in fact elapsed, then the flow of control passes next to the next step 44, while, on the other hand, if a decision is made that T1 seconds have not yet elapsed, then the flow of control passes next to exit this subroutine without doing anything further.

In the next step 44, a test is made as to whether or not T2 seconds have elapsed since the time when the decision that Fi was zero was made in the step 42, and, if a decision is made that T2 seconds have in fact elapsed, then the flow of control passes next to the next step 45, while, on the other hand, if a decision is made that T2 seconds have not yet elapsed, then the flow of control passes next to exit this subroutine without doing anything further.

In the step 45, an average value avPi of the values of Pi read in in the step 2 in the interval from the time when T1 seconds had elapsed after the decision that Fi was equal to zero was made in the step 42 until the time that T2 seconds had elapsed is computed, and thereafter the flow of control passes next to the step 46.

In the step 46, the base pressure values Pbi which were set in the step 1b are replaced by the values avPi computed in the step 45, and thereafter the flow of control passes next to exit this subroutine, so as to pass next to the step 5 in FIG. 17.

It should be noted that, if a negative decision is made in any one of the steps 41 through 44, then the flow of control passes next back to the step 5 in FIG. 17, and in this case the values Pbi set in the step 1b are used unchanged as the base pressure values.

Next, the subroutine whose flow chart is laid out in FIG. 19 and which is executed in each of the steps 6 to 9 of the main program whose flow chart is laid out in FIG. 17 will be described; this subroutine takes "i" as a parameter, where "i" is "fr" for the front right wheel, "fl" for the front left wheel, "rr" for the rear right wheel, and "rl" for the rear left wheel. It should be noted that in FIG. 19 the flags F1i (where "i" is "fr" for the front right wheel, "fl" for the front left wheel, "rr" for the rear right wheel, and "rl" for the rear left wheel) indicate whether or not wheel height adjustment control for roll control, for each said wheel, is being carried out: a flag value of zero indicates an operational state where wheel height increase or decrease adjustment is not being carried out, a flag value of one indicates an operational state where wheel height increase adjustment (up control for raising the vehicle body over that vehicle wheel) is being carried out, and a flag value of two indicates an operational state where wheel height decrease adjustment (down control for lowering the vehicle body down towards that vehicle wheel) is being carried out. The flags FUi relate to whether or not actuating electrical energy is currently being supplied to the flow control valves 18, 19, 28 and 29 and to the open/shut valves 16, 17, 26 and 27 which control the supply of fluid to the actuator assemblies: a flag value of zero indicates that actuating electrical energy is not being thus supplied and thus that the vehicle body is not being raised over the corresponding vehicle wheel, and a flag value of one indicates that actuating electrical energy is being thus supplied and thus that the vehicle body is being raised over the corresponding vehicle wheel. The flags FDi relate to whether or not actuating electrical energy is being supplied to the flow control valves 32, 33, 39 and 40 and the open/shut valves 34, 35, 41 and 42 which control the draining of fluid from the actuator assemblies: a flag value of zero indicates that actuating electrical energy is not being thus supplied and thus that the vehicle body is not being lowered down towards the corresponding vehicle wheel, and a flag value of one indicates that actuating electrical energy is being thus supplied and thus that the vehicle body is being lowered down towards the corresponding vehicle wheel. Furthermore the expression "flags Fi" will be used as a generic term for the flags F1i, FUi and FDi.

First, in the first step 101, a test is made as to which of its allowable values zero, one, or two the flag F1i currently assumes, and: if a decision is made that F1i is equal to zero, the flow of control is transferred next to the step 102; if a decision is made that F1i is equal to one, the flow of control is transferred next to the step 106; and, if a decision is made that F1i is equal to two, the flow of control is transferred next to the step 116.

In the step 102, a test is made as to whether or not the wheel height deviation delta Hi is greater than a control threshold value delta H0: if a decision is made that it is not true that delta Hi is greater than or equal to delta H0, then the flow of control is transferred next to the step 103; while if a decision is made that delta Hi is greater than or equal to delta H0 control is transferred next to the step 121.

In the step 103, a test is made as to whether or not the wheel height deviation delta Hi is less than or equal to -delta H0: if a decision is made that it is not true that delta Hi is less than or equal to -delta H0, then the flow of control is transferred next to the step 104; while, if a decision is made that delta Hi is less than or equal to -delta H0, then the flow of control is transferred next to the step 111.

In the step 104, all of the flags Fi are reset to zero, and then the flow of control is transferred next to the step 105.

In the step 105, the wheel height adjustment is carried out. Since when the flow of control passed from the step 104 to the step 105 it was the case that Fi was equal to zero, wheel height increase or decrease adjustment is not at this point in the program flow carried out.

In the step 106, with delta H2 as a threshold value for reverse output control, a test is made as to whether or not the wheel height deviation delta Hi is less than -delta H2. If a decision is made that it is not true that delta Hi is less than -delta H2, then the flow of control is transferred next to the step 107; while, on the other hand, if a decision is made that delta Hi is less than -delta H2, then the flow of control is transferred next to the step 114.

In the step 107, with delta P4 as a control threshold value for the cylinder chamber pressure, delta P5 is set to delta P2+delta P4, and a test is made as to whether or not the absolute value of the pressure deviation delta Pi exceeds delta P5. If a decision is made that indeed the absolute value of the pressure deviation delta Pi does exceed delta P5, then the flow of control proceeds to the step 108; while, on the other hand, if a decision is made that in fact the absolute value of the pressure deviation delta Pi does not exceed delta P5, then the flow of control proceeds to the step 110.

Figure 21:
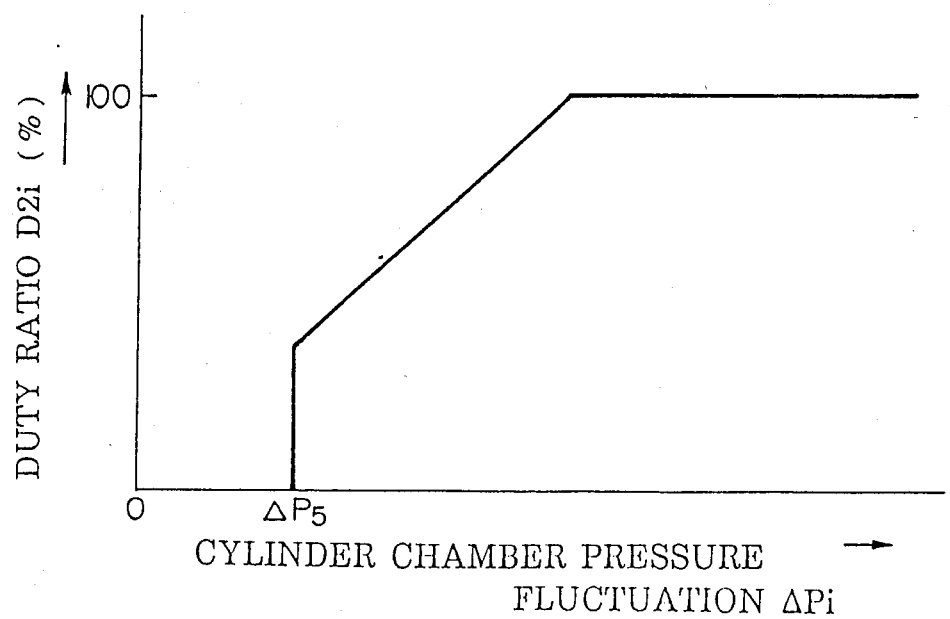
FIG. 21 is also a graph relating to this third preferred embodiment, illustrating a map stored in the memory of said micro computer, which determines the duty ratio for a flow control valve as a function of pressure deviation.

In the step 108, reading in from a look up table like the FIG. 21 graph stored in the ROM 105 of the micro computer 103, the duty ratio D2i (a constant value) for each flow control valve (for draining the appropriate one of the actuators $2fr$, $2fl$, $2rr$, or $2rl$) during reverse output control for the flow control valves (and the ON/OFF control valves), as a valve this time corresponding to the pressure deviation delta Pi, is carried out, and thereafter the flow control is transferred next to the step 109.

In the step 109, the value of the flag FUi is reset to zero and the value of the flag FDi is set to one, and thereafter control is transferred next to the step 105. In this case, in the step 105, actuating electrical energy is supplied to the drain side electrically controlled flow rate control valve for draining the appropriate one of the actuators $2fr$, $2fl$, $2rr$, or $2rl$, at a duty ratio of D2i, and at the same time actuating electrical energy is supplied to the corresponding drain side electrically controlled ON/OFF switching valve, whereby the height of the vehicle body over the corresponding vehicle wheel is decreased, i.e. reverse output control is carried out in order to prevent an excessive increase (overshooting) in the wheel height for the corresponding vehicle wheel.

In the step 110, on the other hand, the values of all of the flags Fi are reset to zero, and thereafter control is transferred next to the step 105. In this case, in the step 105, reverse output control is stopped.

In another program branch, in the step 111, a test is made as to whether or not the vehicle is in a condition liable to produce vehicle rolling, specifically whether or not the conditions below hold, with V0, alpha 1 and delta Hi as control threshold values for the vehicle speed, steering angle and wheel height:

$$\left. \begin{array}{l} V \geq V_0, \\ |\alpha| \geq \alpha_1 \text{ and} \\ |\Delta Hi| \geq \Delta H_1 \end{array} \right\} \quad \text{(condition 3)}$$

If a decision is made that the vehicle is not in such a roll condition, the flow of control is transferred next to the step 112, while, on the other hand, if a decision is made that the vehicle is in such a roll condition, the flow of control is transferred next to the step 114.

In the step 112, from a lookup table in the ROM 105 this time corresponding to the graph shown in FIG. 5, the duty ratio DOi for the electrically controlled flow rate control valve on the supply side (for supplying pressurized fluid into the appropriate one of the actuators $2fr$, $2fl$, $2rr$, or $2rl$) corresponding to the wheel height deviation delta Hi is computed, and thereafter the flow of control is transferred next to the step 113.

In the step 113, the value of the flag FUi is set to one, and thereafter the flow of control is transferred next to the step 105. In this case, in the step 105, in order that the wheel height Hi should be increased so that delta Hi exceeds -delta H0, actuating electrical energy is supplied to the supply side electrically controlled flow rate control valve for supplying pressurized fluid into the appropriate one of the actuators $2fr$, $2fl$, $2rr$, or $2rl$ at a duty ratio DOi, and at the same time actuating electrical energy is supplied to the corresponding electrically controlled ON/OFF switching valve, whereby the height of the vehicle body over the corresponding vehicle wheel is increased, i.e. up control of the wheel height is carried out.

In the step 114, reading in from the lookup table in the ROM 105 corresponding to the graph shown in FIG. 5, the duty ratio Dli (greater than DOi) for each electrically controlled flow rate control valve (for supplying pressurized fluid to the appropriate one of the actuators $2fr$, $2fl$, $2rr$, or $2rl$) during vehicle raising control corresponding to the wheel height deviation delta Hi is determined, and thereafter the flow of control is transferred next to the step 115.

In the step 115, the flags Fli and FUi are set to one, and thereafter the flow of control is transferred next to the step 105. In this case, in the step 105, in order to prevent vehicle roll, actuating electrical energy is supplied to the supply side electrically controlled flow rate control valve for supplying pressurized fluid into the appropriate one of the actuators $2fr$, $2fl$, $2rr$, or $2rl$ at a duty ratio D1$i$, and at the same time actuating electrical energy is supplied to the corresponding electrically controlled ON/OFF switching valve, whereby the height of the vehicle body over the corresponding vehicle wheel is increased, i.e. up control of the wheel height is carried out.

In the third main branch of this FIG. 19 subroutine, in the step 116, a test is made as to whether or not the wheel height deviation delta Hi exceeds delta H2, thus using delta H2 as the threshold value for reverse output control. If a decision is made that delta Hi is not greater than delta H2, then the flow of control is transferred next to the step 117; while, on the other hand, if a decision is made that delta Hi exceeds delta H2, then the flow of control is transferred next to the step 124.

In the step 117, as in the step 107, a test is made as to whether or not the absolute value of the pressure deviation delta Pi exceeds delta P5. If a decision is made that indeed the abolute value of the pressure deviation delta Pi does exceed delta P5, then the flow of control proceeds to the step 118; while, on the other hand, if a decision is made that in fact the absolute value of the pressure deviation delta Pi does not exceed delta P5, then the flow of control proceeds to the step 120.

In the step 118, by reading in from a map like the FIG. 21 graph stored in the ROM 105 of the duty ratio D2$i$ against the value of the pressure deviation delta Pi, calculation of said duty ratio D2$i$ for each electrically controlled flow rate control valve (for supplying pressurized fluid to the appropriate one of the actuators $2fr$, $2fl$, $2rr$, or $2rl$) during reverse output control is carried out, and thereafter the flow of control is transferred next to the step 119.

In the step 119, the value of the flag FDi is reset to zero and the value of the flag FUi is set to one, and thereafter the flow of control is transferred next to the step 105. In this case, in the step 105, actuating electrical energy is supplied to the supply side electrically controlled flow rate control valve for draining the appropriate one of the actuators 2fr, 2fl, 2rr, or 2rl, at a duty ratio of D2i, and at the same time actuating electrical energy is supplied to the corresponding supply side electrically controlled ON/OFF switching valve, whereby the height of the vehicle body over the corresponding vehicle wheel is decreased, i.e. reverse output control is carried out in order to prevent an excessive increase (overshooting) in the wheel height for the corresponding vehicle wheel.

In the step 120, the values of all of the flags Fi are reset to zero, and thereafter the flow of control is transferred next to the step 105. In this case, in the step 105, reverse output control is stopped.

In the step 121, a test is made as to whether or not the vehicle is in a condition which is liable to produce vehicle rolling, in other words whether or not the condition 3 laid out above currently holds. If a decision is made that the vehicle is not currently in a roll condition, the flow of control is transferred next to the step 122; while, on the other hand, when a decision is made that the vehicle is in a roll condition, then the flow of control is transferred next to the step 124.

In the step 122, from a lookup table in the ROM 105 corresponding to the graph shown in FIG. 5, the duty ratio DOi for the electrically controlled flow rate control valve on the drain side (for draining fluid from the appropriate one of the actuators 2fr, 2fl, 2rr, or 2rl) corresponding to the wheel height deviation delta Hi is computed, and thereafter the flow of control is transferred next to the step 123.

In the step 123, the value of the flag FDi is set to one, and thereafter the flow of control is transferred next to the step 105. In this case, in the step 105, in order that the wheel height Hi should be reduced so that delta Hi is less than delta H0, actuating electrical energy is supplied to the drain side electrically controlled flow rate control valve for draining fluid from the appropriate one of the actuators 2fr, 2fl, 2rr, or 2rl at a duty ratio DOi, and at the same time actuating electrical energy is supplied to the corresponding electrically controlled ON/OFF switching valve, whereby the height of the vehicle body over the corresponding vehicle wheel is decreased, i.e. down control of the wheel height is carried out.

In the step 124, reading in from the lookup table in the ROM 105 corresponding to the graph shown in FIG. 5, the duty ratio D1i for each electrically controlled flow rate control valve (for draining fluid from the appropriate one of the actuators 2fr, 2fl, 2rr, or 2rl) during vehicle lowering control corresponding to the wheel height deviation delta Hi is determined, and thereafter the flow of control is transferred next to the step 129.

In the step 125, the values of the flags Fli and FDi are set respectively to two and to one, and the value of the flag FUi is reset to zero, and thereafter the flow of control is transferred next to the step 105. In this case, in the step 105, in order to prevent vehicle roll, actuating electrical energy is supplied to the drain side electrically controlled flow rate control valve for draining fluid from the appropriate one of the actuators 2fr, 2fl, 2rr, or 2rl at a duty ratio D1i, and at the same time actuating electrical energy is supplied to the corresponding electrically controlled ON/OFF switching valve, whereby the height of the vehicle body over the corresponding vehicle wheel is decreased, i.e. down control of the wheel height is carried out.

Although the details of these matters are not particularly shown in the flow charts of FIGS. 3 and 11, when the value of the flag FUi or the value of the flag FDi is equal to one, appropriate supply of actuating electrical energy is performed to the motors 79 to 82 so as to increase the restriction amounts provided by the flow rate control valves 51 to 54, and appropriate supply of actuating electrical energy is performed to the motors 83 to 86 in order to close the electrically controlled ON/OFF switching valves 63 to 66, whereby the damping effect and the spring constant of the suspension units are switched to high (H). Also, in this third preferred embodiment of the present invention like the other two previously described, when conditions such as are liable to produce vehicle nose dive and/or vehicle squat are detected, in order to restrict each undesirable vehicular attitudinizing, a control routine is executed by way of an interrupt, so as to increase the restriction amount provided by said electrically controlled flow rate control valves 51 to 54 and so as thereby to switch the damping effect of the suspension to high, and also so as, by closing the electrically controlled ON/OFF switching valves 63 to 66, to switch the spring constant of the suspension to high.

Next, the case will be described that the steering wheel is being returned back to the straight ahead or zero angular position, in other words the case that the vehicle is returning from the operational condition of travelling around a curve to the operational condition of travelling in a straight line.

When such steering wheel return is detected, interrupt processing according to the flow charts shown in FIG. 22 and FIG. 23 is initiated and is carried out, whereby the occurrence of overshoot and of repeated vertical fluctuation of the wheel heights from the standard wheel heights are prevented during steering wheel return. It should be noted that steering wheel return may be detected by, for example as shown in FIG. 8 which applies to this third preferred embodiment also, determining the occurrence of the conditions below, where steering to the right is considered as positive (with alpha greater than zero), the output of the steering angle sensor 96 is represented as "Sout", and C1 and C2 each is a positive constant:

for determining steering wheel return from steering to the right:

$$Sout \geq C1 \text{ and } V(\alpha) \leq -C2$$

for determining steering wheel return from steering to the left:

$$Sout \geq C1 \text{ and } V(\alpha) \geq C2$$

In the interrupt processing subroutine flow chart of FIG. 23 the steps which correspond to the steps shown in the normal processing subroutine flow chart of FIG. 19 are designated by step numbers which are the same as the step numbers utilized for said corresponding steps of FIG. 19, but with a dash appended. The steps 12 through 19 of FIG. 22 main program for interrupt processing are substantially the same as the steps 2 through 9 of the FIG. 17 main program for normal processing, and therefore detailed description of them will be omitted herein. However, at the end of this FIG. 22 main program for interrupt processing, a test is made as to whether or not the value of the flat Fi' is zero or not, and if in fact the value of the flag Fi' is not zero, then the flow of control loops around to perform this FIG. 22 interrupt processing main routine again, while on the other hand if in fact the value of the flag Fi' is zero, then the flow of control exits from this FIG. 22 interrupt processing main routine back to the normal processing condition and terminates its interrupt.

The interrupt processing subroutine whose flow chart is laid out in FIG. 23, which is executed in each of the steps 14 to 17 of the main interrupt processing program of FIG. 22, has steps numbered the same as corresponding steps in the normal processing routine whose flow chart is laid out in FIG. 19, but with a dash affixed; and this subroutine is substantially the same as the normal processing subroutine whose flow chart is laid out in FIG. 19, except in that: the flags Fli, FUi and FDi of FIG. 19 are replaced in FIG. 23 by, respectively, F1i', FUi' and FDi'; the wheel height control threshold values delta H0, delta H1 and delta H2 of FIG. 19 are replaced in FIG. 23 by delta H1' and delta H2'; the flow control valve duty ratios D0i, D1i and D2i of FIG. 19 are respectively replaced in FIG. 23 by D0i', D1i' and D2i'; the cylinder chamber pressure control threshold value delta P5 of FIG. 19 is replaced in FIG. 23 by a value detla P5'; in the steps 102' and 103' in FIG. 23, tests are made respectively as to whether or not delta Hi is greater than or equal to delta H1' and delta Hi is less than or equal to -delta H1', and, in these steps, when negative decisions are made, in FIG. 23 the flow of control is transferred next to the step 104', whereas when an affirmative decision is made control passes without carrying out a roll condition decision to the steps 124' and 114' respectively. Accordingly, therefore, detailed description of this FIG. 23 interrupt subroutine will be omitted herein, in the interests of brevity of description.

Next with reference to the time chart shown in FIG. 24 and the flow charts of FIG. 17, FIG. 19, FIG. 22 and FIG. 23, an exemplary operational episode of the operation of the wheel height adjustment system according to this second preferred embodiment of the present invention will be described; this exemplary operational episode concerns the case of the vehicle performing a right turn. It should be noted that, in FIG. 24, the time chart portion (S) shows the time behavior of the steering angle alpha, while the time chart portions (R1), (R2), (R3), and (R4) show, respectively: the time behavior of the vehicle height deviation delta Hfr at a position corresponding to the front right wheel; the time behavior of the deviation delta Pfr from the base pressure therefor of the fluid pressure in the pressure chamber 5 of the actuator 2fr for said front right wheel; the time behavior of the duty ratio of the actuating electrical signals supplied to the electrically controlled flow rate control valve 18 (on the supply side) and the electrically controlled flow rate control valve 32 (on the drainage side) of the actuator 2fr for said front right wheel; and the time behavior of the ON/OFF states of the actuating electrical signals supplied to the electrically controlled ON/OFF switching valve 16 (on the supply side) and the electrically controlled ON/OFF switching valve 34 (on the drainage side) of said actuator 2fr for said front right wheel; and the time chart portions (L1), (L2), (L3), and (L4) show, respectively: the time behavior of the vehicle height deviation delta Hfl at a position corresponding to the front left wheel; the time behavior of the deviation delta Pfl from the base pressure therefor of the fluid pressure in the pressure chamber 5 of the actuator 2fl for said front left wheel; the time behavior of the duty ratio of the actuating electrical signals supplied to the electrically controlled flow rate control valve 19 (on the supply side) and the electrically controlled flow rate control valve 33 (on the drainage side) of the actuator 2fl for said front left wheel; and the time behavior of the ON/OFF states of the actuating electrical signals supplied to the electrically controlled ON/OFF switching valve 17 (on the supply side) and the electrically controlled ON/OFF switching valve 35 (on the drainage side) of said actuator 2fl for said front left wheel. In FIG. 24, the broken lines show the fluctuations in wheel height which would occur in the (hypothetical) case in which roll control by wheel height adjustment and roll control by control of the damping effect and spring constant were not carried out; the dot dash lines show the fluctuations in wheel height which would occur in the (also hypothetical) case in which the reverse output control implemented by the wheel height adjustment device of the present invention was not carried out, in the one case that the supply and drainage of hydraulic fluid to the pressure chambers 5 of the actuators 2 was excessive; and the dot dash lines show the fluctuations in wheel height which would occur in the (also hypothetical) case in which the reverse output control implemented by the wheel height adjustment device of the present invention was not carried out, in the contrary case that the supply and draining of hydraulic fluid to the pressure chambers 5 of the actuators 2 was insufficient.

Referring to this FIG. 24 time chart, at the time point t1 the vehicle driver starts to turn the steering wheel to the right, and at the time point t2 the steering angle reaches alpha 1, and thus at approximately the time point t2 the front right vehicle wheel height deviation delta Hfr will begin to increase and on the other hand the front left vehicle wheel height deviation delta Hfl will begin to decrease. At the time point t3, delta Hfr reaches delta H0, and thus, in the step 102 in the subroutine whose flow chart is laid out in FIG. 19, a decision is made that delta Hfr is greater than or equal to delta H0, and next, in the roll condition determining step 121, it is found to the case that V is greater than or equal to V0 and alpha is greater than or equal to alpha 1, but delta Hfr is not greater than or equal to delta H1, so a NO decision is made, and thus the flow of control is transferred next to the step 122. In the step 122, the duty ratio D0fr for the electrically controlled flow rate control valve 32 is computed, and in the step 123 the flag FDfr is set to one, and thereafter in the step 105, the electrically controlled flow rate control valve 32 is supplied with actuating electrical energy at a duty ratio of D0fr, and further the electrically controlled ON/OFF switching valve 34 is supplied with actuating electrical energy, whereby a certain amount of fluid is drained from the cylinder chamber 5 of the actuator 2fr, and therefore the wheel height for the front right wheel is controlled to be increased.

At the time point t4, delta Hfr reaches delta H1, and thus in the step 121 a positive decision is made, and therefore the flow of control is transferred next to the step 124. In the step 124, the duty ratio D1fr for the electrically controlled flow rate control valve 32 is computed, and in the step 125 the value of the flag F1*fr* is set to two and the value of the flag FDfr is set to one, and thereafter in the step 105 the duty ratio of the actuating electrical signal supplied to the electrically controlled flow rate conrol valve 32 is corrected to D1*fr*, and therefore a relatively large amount of fluid is drained from the cylinder chamber 5 of the actuator 2*fr*, so that the wheel height of the front right wheel is reduced.

At the time point t5, delta Hfr reaches delta H2, and in the step 116 in the subroutine whose flow chart is laid out in FIG. 19 a decision is made that delta Hfr is not greater than delta H2, and next in the step 117 a decision is made that the absolute value of delta Pi is greater than delta P5, in the step 118 the duty ratio D2*fr* of the actuating electrical energy to be supplied to the electrically controlled flow rate control valve 18 is read in from the ROM of the micro computer, and the flow of control is transferred next to the step 119. In the step 119, the value of the flag FDfr is reset to zero and the value of the flag FUfr is set to one, and thereafter in the step 105 the supply of actuating electrical energy to the electrically controlled flow rate control valve 32 and to the electrically controlled ON/OFF switching valve 34 is stopped, whereby the draining of fluid from the cylinder chamber 5 of the actuator 2*fr* is stopped and at the same time point the electrically controlled flow rate control valve 18 is supplied with actuating electrical energy at a duty ratio of D2*fr*, and actuating electrical energy is supplied to the electrically controlled ON/OFF switching valve 16, whereby reverse output control is carried out so as to supply fluid to the cylinder chamber 5 of the actuator 2*fr*. This supply of fluid continues until a negative decision is made in the step 117, and then in the step 120 the values of all of the flags Ffr are reset to zero, in other words until the absolute value of delta Pi becomes less than or equal to delta P5, which happens at the time point t6. Thus, for example at the time point t7, delta Hfr reaches 0.

It should be noted that the rear right wheel is also controlled in the same way; therefore, detailed description of said control will be omitted herein.

As for the front left wheel, at the time point t3, delta Hfl reaches -delta H0, whereupon, in the step 103 in the subroutine whose flow chart is laid out in FIG. 19, a decision is made that delta Hfr is less than or equal to -delta H0, and next, in the step 111, since V is greater than or equal to V0 and alpha is greater than or equal to alpha 1, but delta Hfl is not less than or equal to -delta H1, a negative decision is made, so that the flow of control is transferred next to the step 112. In the step 112, the duty ratio DOfl for the electrically controlled flow rate control valve 19 is computed, in the step 113 the value of the flag FUfl is set to one, and thereafter in the step 105 actuating electrical energy is supplied to the electrically controlled flow rate control valve 19 at a duty ratio of DOfl, and actuating electrical energy is supplied to the electrically controlled ON/OFF switching valve 17, whereby a certain amount of fluid is supplied to the cylinder chamber 5 of the actuator 2*fl* for the front left wheel, whereby the wheel height of this front left wheel is controlled to be reduced.

At the time point t4, delta Hfl reaches -delta H1, so that in the step 111 a positive decision is made and therefore the flow control is transferred next to the step 114. In the step 114 the duty ratio D1*fl* for the actuating electrical energy to be supplied to the electrically controlled flow rate control valve 19 is computed, in the step 115 the value of the flag F1*fl* and the value of the flag FUfl are set to one, and thereafter in the step 105 the duty ratio for the actuating electrical energy to be supplied to the electrically controlled flow rate control valve 19 is corrected to D1*fl*, and thereby a relatively large amount of fluid is supplied to the cylinder chamber 5 of the actuator 2*fl* for the front left wheel, and thereby the wheel height of this front left wheel is increased.

At the time point t5, delta Hfl reaches -delta H2, whereupon in the step 106 in the subroutine whose flow chart is laid out in FIG. 19 a decision is made that delta Hfl is not less than -delta H2, and, in the next step 107, a decision is made that the absolute value of delta Pi is greater than delta P5, in the step 108 the duty ratio D2*fl* of the actuating electrical energy to be supplied to the electrically controlled flow rate control valve 33 is read in from the ROM of the micro computer 103, and the flow of control is transferred next to the step 109. In the step 109, the value of the flag FUfl is reset to zero, and the value of the flag FDfl is set to one, after which, in the step 105, the supply of actuating electrical energy to the electrically controlled flow rate control valve 19 and to the electrically controlled ON/OFF switching valve 17 is terminated, whereby the supply of fluid to the cylinder chamber 5 of the actuator 2*fl* for the suspension of the front left wheel is stopped and at the same time actuating electrical energy is supplied to the electrically controlled flow rate control valve 33 at a duty ratio of D2*fl*, and actuating electrical energy is supplied to the electrically controlled ON/OFF switching valve 35, whereby the reverse output control to drain the fluid from the cylinder chamber 5 of the actuator 2*fl* is carried out. This draining of fluid continues until the time point t6, at which a negative decision is made in the step 107, in other words until the absolute value of delta Pi is less than or equal to delta P5, and then in the step 110 the values of all of the flags Ffl are reset to zero, and by this means the reverse output control is terminated. Thus, for example, at the time point t7, delta Hfl becomes zero.

It should be noted that the control for the rear left wheel is done in the same way.

Next, an explanation will be presented for the case of returning from a right turn to straight line motion, i.e. when the right turn is unwound by the vehicle driver turning the steering wheel back to the straight ahead position thereof.

In FIG. 24, at the time point t8, the turning in the return direction of the steering wheel begins, and at the time point t9 this turning of the steering wheel in the return direction is detected, whereupon the routines whose flow charts are shown in FIG. 22 and FIG. 23 are begun as interrupt processing routines. At approximately the time point t9, the wheel height Hfr of the vehicle body over the front right vehicle wheel begins to decrease and on the other hand the wheel height Hfl of the vehicle body over the front left vehicle wheel begins to increase. At the time point t10, delta Hfr reaches -delta H1', whereupon, in the step 103' in the interrupt routine whose flow chart is laid out in FIG. 23, a decision is made that delta Hfr is less than or equal to -delta H1', and next in the step 114' the duty ratio D1*fr*' for the actuating electrical energy to be supplied to the electrically controlled flow control valve 18 is computed, in the step 115' the value of the flag F1*fr* and the value of the flag FUfr are set to one, thereafter in the step 105' actuating electrical energy is supplied to the electrically controlled flow rate control valve 18 at a duty ratio of D1$fr'$, and actuating electrical energy is supplied to the electrically controlled ON/OFF switching valve 16, whereby a certain amount of fluid is supplied to the cylinder chamber 5 of the actuator 2$fr$ for the front right vehicle wheel, and thus the wheel height of the front right wheel is increased.

At the time point t11, delta Hfr reaches -delta H2', whereupon in the step 106' a decision is made that delta Hfr is not less than -delta H2', and in the next step 107' a decision is made that the absolute value of delta Pi is greater than delta P5, in the step 108' the duty ratio D2$fr'$ of the actuating electrical energy supplied to the electrically controlled flow rate control valve 32 is read in from the ROM of the micro computer 103, and the flow of control is transferred next to the step 109'. In the step 109', the value of the flag FUfr is reset to zero, and the value of the flag FDfr is set to one, after which, in the step 105', the supply of actuating electrical energy to the electrically controlled flow rate control valve 18 and to the electrically controlled ON/OFF switching valve 16 is terminated, thus closing these valves, and the electrically controlled flow rate control valve 32 is supplied with actuating electrical energy at a duty ratio of D2$fr'$, and actuating electrical energy is supplied to the electrically controlled ON/OFF switching valve 34, whereby reverse output control is carried out to drain fluid from the cylinder chamber 5 of the actuator 2$fr$ for the right front vehicle wheel. This draining of fluid continues until in the step 107' a negative decision is made, and then in the step 110' the values of all of the flags Ffr' are reset to zero, in other words until the absolute value of delta Pi is less than or equal to delta P5, which happens at the time point t12. Thus, for example at the time point t1, delta Hfr becomes 0.

It should be noted that control for the rear right wheel is done in the same manner.

As for the front left wheel, at the time point t10, delta Hfl reaches delta H1', and, in the step 102' in the interrupt routine whose flow chart is laid out in FIG. 23, a decision is made that delta Hfl is greater than or equal to H1', and next, in the step 124', the duty ratio D1$fl'$ for the actuating electrical energy to be supplied to the electrically controlled flow rate control valve 33 is computed, and in the step 125' the value of the flag F1$fl$ and the value of the flag FDfl are set respectively to two and to one, and thereafter in the step 105' actuating electrical energy is supplied to the electrically controlled flow rate control valve 33 at a duty ratio of D1$fl'$, and actuating electrical energy is supplied to the electrically controlled ON/OFF switching valve 35, whereby a certain amount of fluid is drained from the cylinder chamber 5 of the actuator 2$fl$ for the front left vehicle wheel, and by this means the wheel height of said front left vehicle wheel is reduced.

At the time point t11, delta Hfl reaches delta H2', so that in the step 116' a decision is made that delta Hfl is not greater than delta H2', and next in the step 117' a decision is made that the absolute value of delta Pi is greater than delta P5, in the step 118' the duty ratio D2$fl'$ of the actuating electrical energy supplied to the electrically controlled flow rate control valve 19 is computed by being read in from the ROM, and the flow of control continues to the step 119'. In the step 119' the value of the flag FDfl is reset to zero, and the value of the flag FUfl is set to one, after which, in the step 105', the supply of actuating electrical energy to the electrically controlled flow rate control valve 33 and to the electrically controlled ON/OFF switching valve 35 is terminated, thus closing these valves, and the electrically controlled flow rate control valve 19 is supplied with actuating electrical energy at a duty ratio of D2$fl'$, and actuating electrical energy is supplied to the electrically controlled ON/OFF switching valve 17, whereby reverse output control is carried out to supply fluid to the cylinder chamber 5 of the actuator 2$fl$ for the front left vehicle wheel. This supply of fluid continues until a negative decision is made in the step 117', and then, in the step 120', the values of all of the flags Ffl' are reset to zero, or in other words until a decision is made that the absolute value of delta Pi is less than or equal to delta P5, which happens at the time point t12. Thus, for example at the time point t13, delta Hfl reaches 0.

It should be noted that the control for the rear left wheel is done in the same way. Additionally in the case of a left turn, similar control is carried out to that in the case of the above described right turn.

Thus in this third preferred embodiment, as described above and as shown in the relevant drawings, when the vehicle is substantially travelling in a straight line, then: in the case that the deviation delta Hi from the standard wheel height of the wheel height in the position corresponding to each of the vehicle wheels is less than plus or minus delta H0, wheel height adjustment is not carried out, and therefore the expenditure of the electrical energy required for opening and closing the electrically controlled flow rate control valves and the electrically controlled ON/OFF switching valves can be saved, and the danger of producing the so called hunting phenomenon through carrying out repeated increase and decrease adjustments in wheel height within a relatively fine range can be reduced, in this case that the vehicle is travelling substantially in a straight line; and, in the case that the wheel height deviation delta Hi in a position corresponding to each of the wheels is at least plus or minus delta H0 and is less than plus or minus delta H1, then the wheel height Hi of each wheel is adjusted to a target wheel height range (Hbi plus or minus delta H0). On the other hand, in the case that the vehicle is travelling around a curve such as when turning, as well as effectively preventing vehicle roll at the beginning and end of such travelling around a curve, repeated vertical fluctuations in wheel height for each wheel from the standard wheel height caused by overshoot are effectively prevented, whereby the steering stability of the vehicle is improved.

As in the first preferred embodiment, it should be noted that generally, when the vehicle changes from moving around a curve to moving along a straight line, i.e. in the case where the driver unwinds the steering wheel, the steering movement speed is low compared with the case of moving from straight line movement to movement around a curve, i.e. in the case where the driver winds up the steering wheel, as a result of which when the turning in the return direction of the steering wheel is detected the interrupt processing which is executed may be according to the flow chart laid out in FIG. 10, as in the case of the first and the second preferred embodiments. In this interrupt processing subroutine whose flow chart is laid out in FIG. 10, as before, when the turning in the return direction of the steering wheel is detected, first, in the initial step 21, in the normal processing subroutine whose flow chart is laid out in FIG. 19, the values of the flags Fi are reset to zero, and thereafter in the step 22 all output of actuating electrical energy to the electrically controlled flow rate control valves and the electrically controlled ON/OFF switching valves is stopped, and by this means roll control by wheel height adjustment is stopped, and thereafter control returns to the step 2 of the program whose flow chart is laid out in FIG. 17. In this case, the values of the flag Fi are reset to zero, but it is preferable that for a certain time interval the damping effect and spring constant should be maintained as high.

The third preferred embodiment of the vehicle roll control system of the present invention has been described in detail above in a very specific fashion, but the present invention is not limited to this particular implementation, and it will be clear to those skilled in the relevant art that various other variant embodiments are possible within the scope of the present invention. For example, as before, the area of at least delta H1 in the graph of FIG. 5 may be set as shown by the broken line, and delta H1 may be set to any position between delta H0 and delta H1 shown in the drawing. Again, in the roll condition decision in the steps 111 and 121 of the subroutine whose flow chart is laid out in FIG. 19, the condition that the absolute value of delta Hi is greater than or equal to delta H1 may be omitted. Furthermore, in the above described third preferred embodiment while the vehicle is turning the damping effect and the spring constant of the suspension are both set to be high, but the construction may also be such that the damping effect and spring constant are set to be high on the outer turning wheels, and the damping effect and spring constant are set respectively to base mode and to low for the inner turning wheels. Also, although, in the third preferred embodiment described above, a time differential value of steering angle, i.e., a steering speed, is calculated from the steering angle sensed by the steering sensor 96, it should be noted that the steering sensor 96 could in another preferred embodiment be replaced with a steering angular velocity sensor which detected a steering angular velocity omega.

CONCLUSION

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a vehicle comprising a body and a plurality of wheels upon which said vehicle runs, a roll control system of vehicle height adjustment type for height duration maintenance control comprising:

a plurality of actuator assemblies equal in number to the number of said vehicle wheels, each actuator assembly corresponding to one of said vehicle wheels and resiliently suspending said one of said vehicle wheels from the vehicle body, each actuator assembly comprising a pressure chamber, and each actuator assembly increasing and decreasing vehicle height at a location in the vicinity of said actuator assembly's corresponding vehicle wheel as a result of the supply and discharge of working fluid to and from said pressure chamber;

a plurality of working fluid supplying and discharging means, for supplying working fluid to and discharging working fluid from each said pressure chamber;

means for controlling said plurality of working fluid supplying and discharging means by duty ratio control;

a plurality of vehicle height detection means, for sensing heights of the vehicle body over said vehicle wheels; and computing and control means for:

calculating deviations of the actual vehicle body heights as detected by said vehicle height detection means from standard vehicle body heights;

controlling said working fluid supplying and discharging means according to a first duty ratio as a function of said deviations of said actual vehicle body heights, so as to maintain said deviations of said actual vehicle body heights within predetermined ranges; and at the completion of height deviation maintenance control, controlling said working fluid supplying and discharging means in reverse order according to a second duty ratio.

2. A system for vehicle roll control according to claim 1, further comprising:

vehicle speed detecting means for detecting the road speed of the vehicle; and steering angle detecting means for detecting the steering angle of the vehicle;

wherein said computing and control means controls said working fluid supplying and discharging means according to said first duty ratio only when the vehicle speed as detected by said vehicle speed detecting means and the absolute value of said steering angle as detected by said steering angle detecting means are equal to or exceed predetermined values.

3. A system for vehicle roll control according to claim 2, wherein said computing and control means controls said working fluid supplying and discharging means at said second duty ratio for a predetermined time period.

4. A system for vehicle roll control according to claim 3, wherein said computing and control means controls said working fluid supplying and discharging means according to a third duty ratio which is less than said first duty ratio when the absolute values of said deviations of said actual vehicle body heights from said standard vehicle body heights are less than a first predetermined value, so as to reduce said deviations of said actual vehicle body heights from said standard vehicle body heights.

5. A system for vehicle roll control according to claim 4, wherein said computing and control means does not control said working fluid supplying and discharging means at said third duty ratio when the absolute values of said deviations of said actual vehicle body heights from said standard vehicle body heights are less than a second predetermined value which is less than said first predetermined value.

6. A system for vehicle roll control according to claim 3, wherein said computing and control means terminates control of said working fluid supplying and discharging means when the absolute value of steering angle as detected by said steering angle detecting means is equal to or exceeds a second predetermined value and is decreasing.

7. A system for vehicle roll control according to claim 2, wherein said computing and control means controls said working fluid supplying and discharging means at said second duty ratio according to an instantaneous rate of vehicle body height.

8. A system for vehicle roll control according to claim 7, wherein said computing and control means terminates control of said working fluid supplying and discharging means at said second duty ratio when the rates of change of said actual vehicle body heights have fallen below predetermined values.

9. A system for vehicle roll control according to claim 7, wherein said computing and control means controls said working fluid supplying and discharging means at a third duty ratio which is less than said first duty ratio when the absolute values of said deviations of said actual vehicle body heights from said standard vehicle body heights are less than a first predetermined value, so as to reduce said deviations of said actual vehicle body heights from said standard vehicle body heights.

10. A system for vehicle roll control according to claim 9, wherein said computing and control means does not control said working fluid supplying and discharging means at said third duty ratio when the absolute values of said deviations of said actual vehicle body heights from said standard vehicle body heights are less than a second predetermined value which is less than said first predetermined value.

11. A system for vehicle roll control according to claim 7, wherein said computing and control means terminates control of said working fluid supplying and discharging means when the absolute value of said steering angle as detected by said steering angle detecting means is equal to or exceeds a second predetermined value and is decreasing.

12. A system for vehicle roll control according to claim 2, wherein said computing and control means controls said working fluid supplying and discharging means at said second duty ratio according to an instantaneous deviation in vehicle loading.

13. A system for vehicle roll control according to claim 12, wherein said computing and control means begins control of said working fluid supplying and discharging means at said first duty ratio when the absolute values of said deviations of said actual vehicle body heights from said standard vehicle body heights are equal to or exceed a first predetermined value, and terminates control of said working fluid supplying and discharging means at said first duty ratio when said deviations of said actual vehicle body heights from said standard vehicle body heights are less than a second predetermined value which is less than said first predetermined value.

14. A system for vehicle roll control according to claim 13, wherein said computing and control means starts control of said working fluid supplying and discharging means at said second duty ratio when the absolute value of the deviation in vehicle loading is not greater than said second predetermined value.

15. A system for vehicle roll control according to claim 13, wherein said computing and control means controls said working fluid supplying and discharging means at a third duty ratio which is smaller than said second duty ratio, and reduces said deviations of said actual vehicle body heights from said standard vehicle body heights, when the absolute value of the deviation in vehicle loading is less than said first predetermined value.

16. A system for vehicle roll control according to claim 15, wherein said computing and control means does not control said working fluid supplying and discharging means at said third duty ratio when the absolute value of said deviations of said actual vehicle body heights from said standard vehicle body heights are less than a second predetermined value which is smaller than said first predetermined value.

17. A system for vehicle roll control according to claim 12, wherein said computing and control means terminates control of said working fluid supplying and discharging means at said second duty ratio when the absolute value of the deviation in vehicle loading is not greater than the sum of a predetermined value and a load deviation determined from the vehicle speed and the vehicle steering angle.

18. A system for vehicle roll control according to claim 12, wherein said computing and control means terminates control of said working fluid supplying and discharging means, based upon the deviations of said actual vehicle body heights from said standard vehicle body heights and the deviation in vehicle loading as calculated up to that point, when the absolute value of said steering angle as detected by said steering angle detecting means is equal to or exceeds a second predetermined value and is decreasing.

19. A system for vehicle roll control according to claim 12, further comprising means for detecting vehicle loading by detecting the pressure in each said pressure chamber of said actuator assemblies as fluctuations corresponding to support loads on the corresponding vehicle wheels.

20. A system for vehicle roll control according to claim 1, further comprising:
   steering angle detecting means for detecting the steering angle of the vehicle;
   wherein said computing and control means controls said working fluid supplying and discharging means according to said first duty ratio only when said steering angle as detected by said steering angle detecting means is equal to or exceeds a predetermined value and is decreasing.

21. A system for vehicle roll control according to claim 20, wherein said computing and control means controls said working fluid supplying and discharging means at said second duty ratio for a predetermined time period.

22. A system for vehicle roll control according to claim 21, wherein said computing and control means does not control said working fluid supplying and discharging means at said first duty ratio or at said second duty ratio when the absolute values of said deviations of said actual vehicle body heights from said standard vehicle body heights are less than a first predetermined value.

23. A system for vehicle roll control according to claim 20, wherein said computing and control means controls said working fluid supplying and discharging means at said second duty ratio according to an instantaneous rate of change of vehicle body height.

24. A system for vehicle roll control according to claim 23, wherein said computing and control means terminates control of said working fluid supplying and discharging means when the rate of change of said steering angle as detected by said steering angle detecting means has dropped below a predetermined value.

25. A system for vehicle roll control according to claim 23, wherein said computing and control means does not control said working fluid supplying and discharging means at said first duty ratio or at said second duty ratio when the deviations of said actual vehicle body heights from said standard vehicle body heights are less than a first predetermined value.

26. A system for vehicle roll control according to claim 20, wherein said computing and control means controls said working fluid supplying and discharging means at said second duty ratio according to an instantaneous deviation in vehicle loading.

27. A system for vehicle roll control according to claim 26, wherein said computing and control means terminates control of said working fluid supplying and discharging means at said second duty ratio when the absolute value of the deviation in vehicle loading is not greater than a predetermined value.

28. A system for vehicle roll control according to claim 26, wherein said computing and control means does not control said working fluid supplying and discharging means at said first duty ratio or at said second duty ratio when the absolute values of said deviations of said actual vehicle body heights from said standard vehicle body heights are less than a first predetermined value.

29. A system for vehicle roll control according to claim 26, further comprising means for detecting vehicle loading by detecting the pressure in each said pressure chamber of said actuator assemblies as fluctuations corresponding to support loads on the corresponding vehicle wheels.

* * * * *